(12) United States Patent
Miyazawa et al.

(10) Patent No.: US 7,693,015 B2
(45) Date of Patent: Apr. 6, 2010

(54) OPTICAL INFORMATION RECORDING DEVICE, OPTICAL INFORMATION RECORDING METHOD, AND SIGNAL PROCESSING CIRCUIT

(75) Inventors: Fuyuki Miyazawa, Gunma (JP); Yoshikazu Sato, Gunma (JP); Isao Matsuda, Gunma (JP); Tetsuharu Kubo, Gunma (JP); Katsuhiro Oyama, Gunma (JP); Hiroya Kakimoto, Gunma (JP)

(73) Assignee: Taiyo Yuden, Co., Ltd., Tokyo (JP)

( * ) Notice: Subject to any disclaimer, the term of this patent is extended or adjusted under 35 U.S.C. 154(b) by 1174 days.

(21) Appl. No.: 11/283,265

(22) Filed: Nov. 18, 2005

(65) Prior Publication Data

US 2006/0140084 A1 Jun. 29, 2006

(30) Foreign Application Priority Data

Nov. 18, 2004 (JP) .............................. 2004-334928
Dec. 20, 2004 (JP) .............................. 2004-367802

(51) Int. Cl.
G11B 7/0045 (2006.01)
G11B 7/00 (2006.01)

(52) U.S. Cl. ................................. 369/47.53; 369/59.12

(58) Field of Classification Search ..... 369/47.5–47.53, 369/59.1–59.12, 116, 53.25–53.27, 53.31, 369/53.33–53.36

See application file for complete search history.

(56) References Cited

U.S. PATENT DOCUMENTS

| 6,510,116 B1* | 1/2003 | Miyagawa et al. | 369/59.12 |
| 2003/0067857 A1* | 4/2003 | Shirota et al. | 369/59.12 |
| 2004/0047255 A1* | 3/2004 | Sasaki et al. | 369/47.53 |
| 2004/0240105 A1* | 12/2004 | Narumi et al. | 360/99.08 |

FOREIGN PATENT DOCUMENTS

| JP | 51-109851 | 9/1976 |
| JP | 53-50707 | 5/1978 |
| JP | 1-287825 | 11/1989 |
| JP | 4-137224 | 5/1992 |
| JP | 5-143999 | 6/1993 |
| JP | 5-144001 | 6/1993 |
| JP | 7-129956 | 5/1995 |
| JP | 7-235056 | 9/1995 |

(Continued)

Primary Examiner—Andrea L Wellington
Assistant Examiner—Nathan Danielsen
(74) Attorney, Agent, or Firm—Knobbe Martens Olson & Bear LLP

(57) ABSTRACT

It is an object of the present invention to improve a margin to meet good recording quality by conducting a realtime correction of a recording condition of a medium with different recording characteristics for inner and outer circumferences. To accomplish the object, control factors for power and a pulse width are independently detected and corrected using an mT pulse having a length of m'T as a pulse for power control and an nT pulse having a length of n'T as a pulse for pulse width control; more specifically, power correction for mT pulse and pulse width correction for nT pulse are conducted in realtime, wherein a recording pulse stream including the mT pulse and nT pulse is irradiated onto a medium by a recording laser beam as well as pits and spaces formed by irradiation of the recording pulse stream are reproduced by a reproducing laser beam to detect the effects of power and pulse width variations independently.

10 Claims, 46 Drawing Sheets

FOREIGN PATENT DOCUMENTS

| | | |
|---|---|---|
| JP | 9-147361 | 6/1997 |
| JP | 2002-117544 | 4/2002 |
| JP | 2003-30837 | 1/2003 |
| JP | 2004-110995 | 4/2004 |
| JP | 2004-220044 | 8/2004 |
| WO | WO 96/24130 | 8/1996 |
| WO | WO 99/30316 | 6/1999 |

* cited by examiner

FIG. 1
(a) Configuration of a recording pulse
(b) Entire flow for determining a recording condition
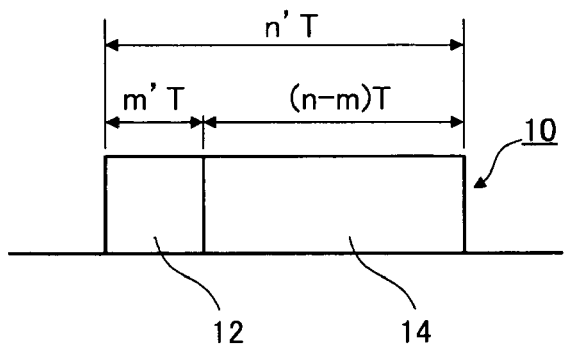
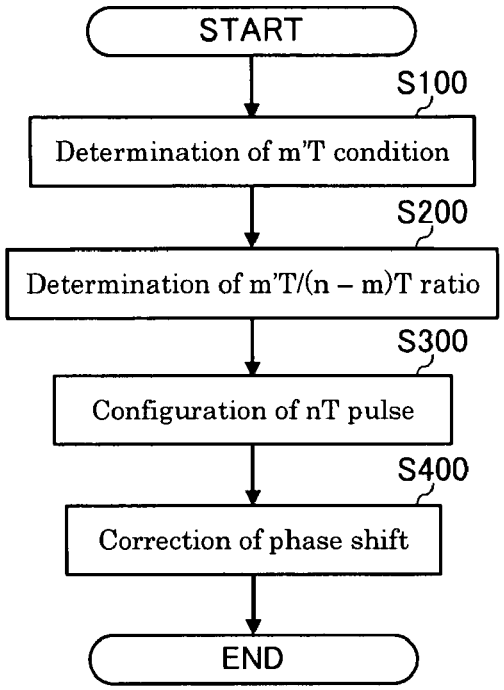
FIG. 2
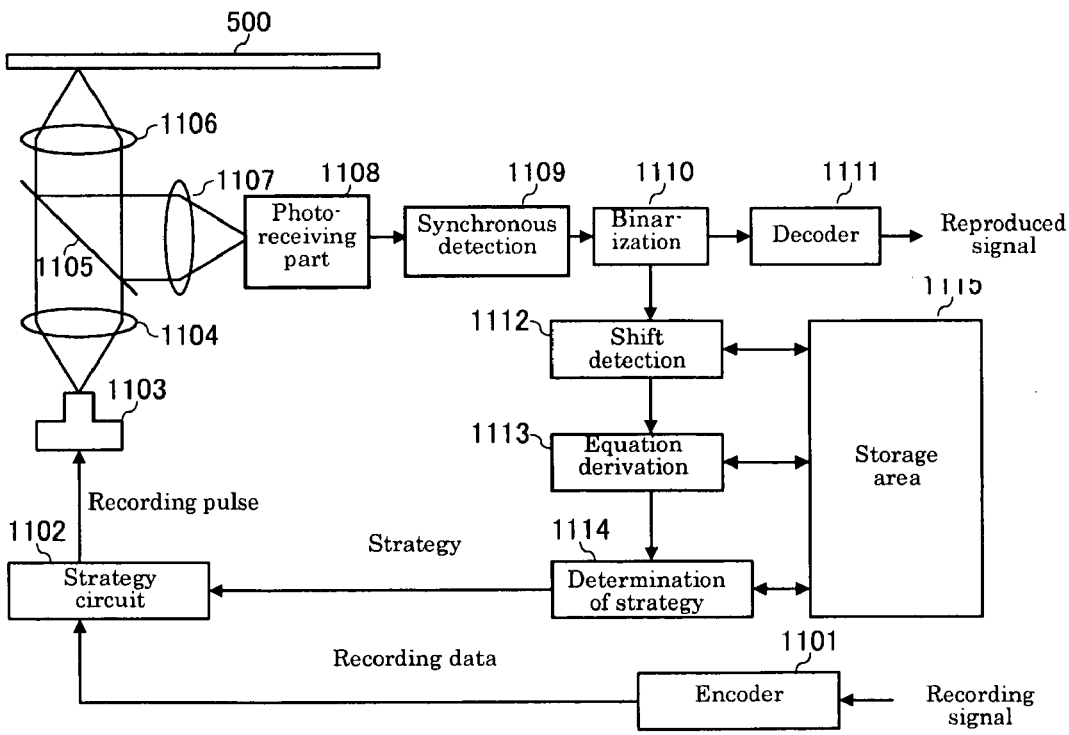

FIG. 9
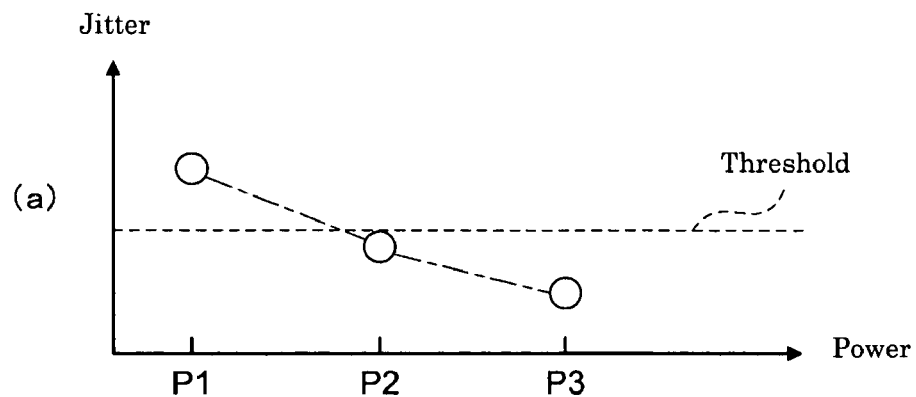
(a)
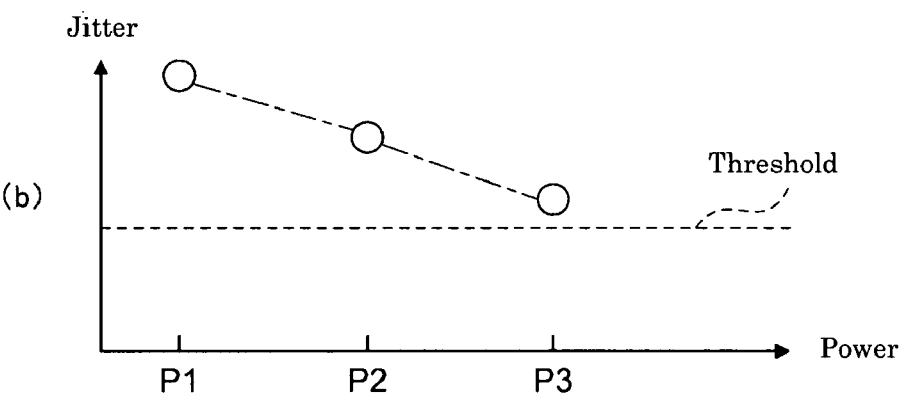
(b)
FIG. 10
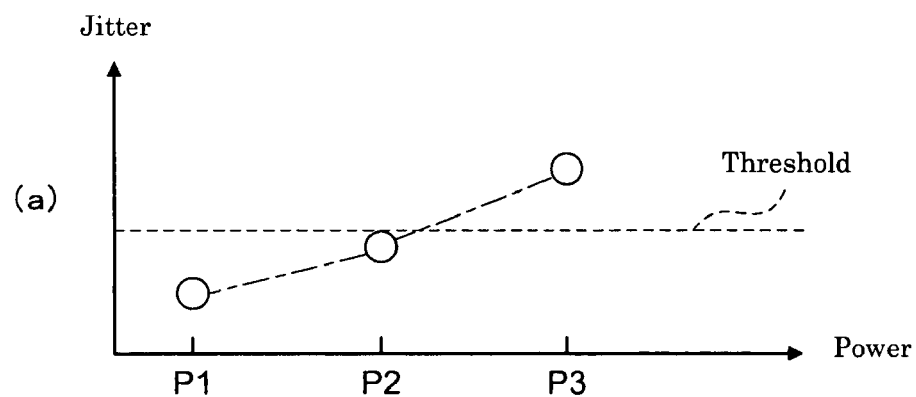
(a)
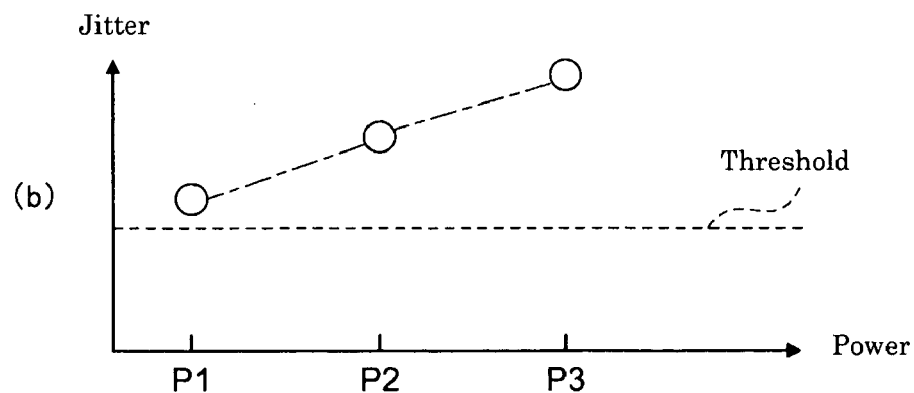
(b)

FIG. 13

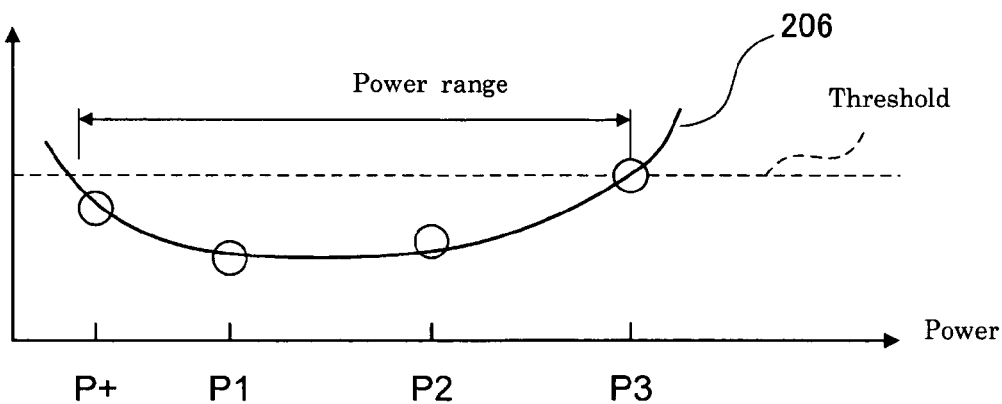

FIG. 14

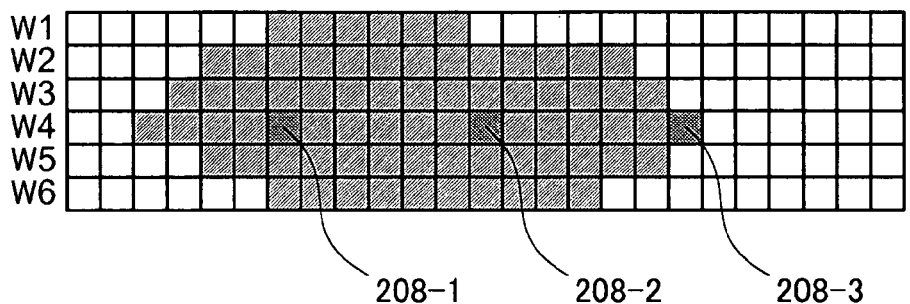

| Pattern | Shape | Relation with threshold | Prediction of recording characteristics | Pulse width |
|---|---|---|---|---|
| 1 | Given | Max. jitter ≤ threshold | Same sensitivity | ±0.2T |
| 2 | Concave | Min. jitter ≤ threshold | Same sensitivity | ±0.1T |
| 3 | Concave | Min. jitter > threshold | Same sensitivity and large difference in feature | ±0.2T |
| 4 | Downward-sloping | Min. jitter ≤ threshold | Slightly lower sensitivity | +0.1T, +0.2T |
| 5 | Downward-sloping | Min. jitter > threshold | Significantly lower sensitivity | +0.2T, +0.4T |
| 6 | Upward-sloping | Min. jitter ≤ threshold | Slightly lower sensitivity | -0.1T, -0.2T |
| 7 | Upward-sloping | Min. jitter > threshold | Significantly higher sensitivity | -0.2T, -0.4T |
| 8 | Convex | Max. jitter > threshold | NG | ±0.2T |

FIG. 21

| No | Polarity | Count result |
|---|---|---|
| 1 | Pit | 5 |
| 2 | Land | 6 |
| 3 | Pit | 9 |
| 4 | Land | 8 |
| 5 | Pit | 13 |
| 6 | Land | 8 |
| . | . | . |
| . | . | . |
| . | . | . |

(a) Pit histogram (b) Land histogram (a) Pit histogram (b) Land histogram (a) Pit length threshold

| DATA | Count |
|---|---|
| 2T-3T | 2 |
| 3T-4T | 9 |
| 4T-5T | 18 |
| 5T-6T | 26 |
| 6T-7T | 35 |
| . | . |
| . | . |
| . | . |
| 14T-15T | 100 |

(b) Land length threshold

| DATA | Count |
|---|---|
| 2T-3T | 2 |
| 3T-4T | 10 |
| 4T-5T | 18 |
| 5T-6T | 26 |
| 6T-7T | 35 |
| . | . |
| . | . |
| . | . |
| 14T-15T | 100 |

FIG. 26
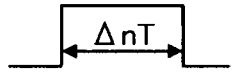
| Search pattern | LxT threshold | | PyT threshold | | LzT threshold | |
|---|---|---|---|---|---|---|
| | min | max | min | max | min | max |
| ≥L6 − P3 − ≥L6 | 26 | 100 | 2 | 9 | 26 | 100 |
| ≥L6 − P4 − ≥L6 | 26 | 100 | 9 | 18 | 26 | 100 |
| ≥L6 − P5 − ≥L6 | 26 | 100 | 18 | 26 | 26 | 100 |
| ≥L6 − P6 − ≥L6 | 26 | 100 | 26 | 35 | 26 | 100 |
| ... | ... | ... | ... | ... | ... | ... |
FIG. 27
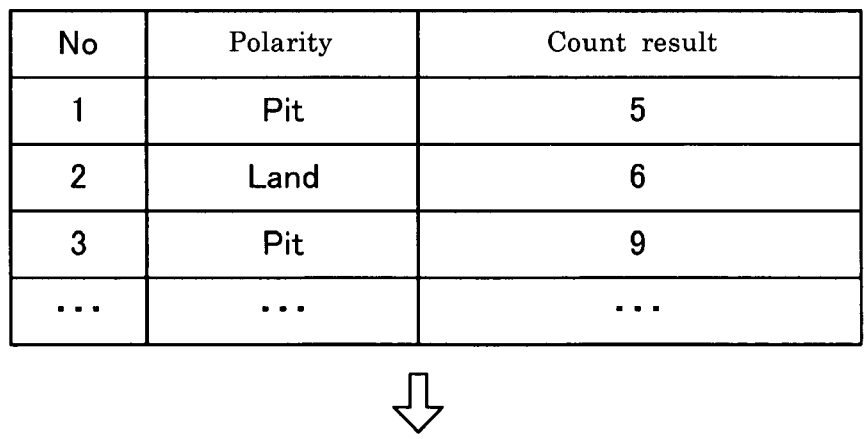
| No | Polarity | Count result |
|---|---|---|
| 1 | Pit | 5 |
| 2 | Land | 6 |
| 3 | Pit | 9 |
| ... | ... | ... |
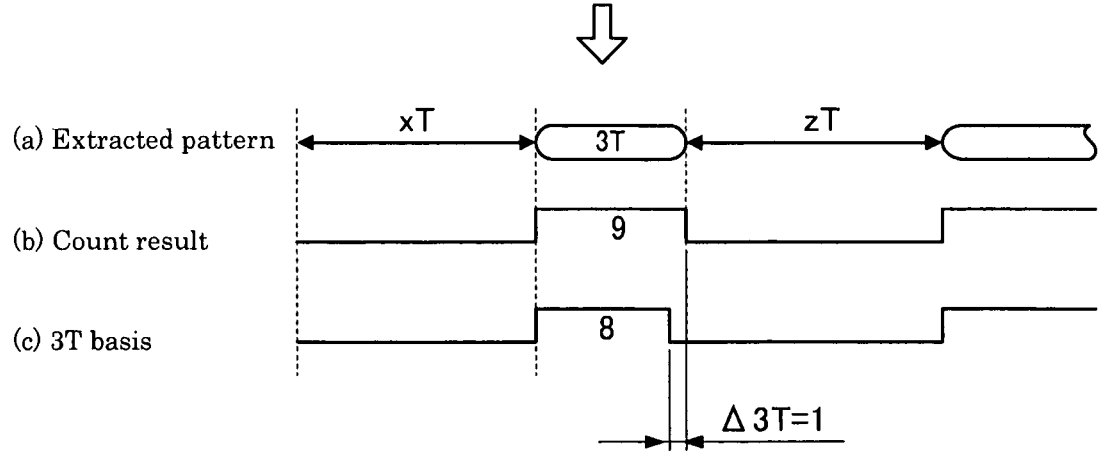

| Control element | Pit to be corrected | | | | | | | | | |
|---|---|---|---|---|---|---|---|---|---|---|
| | 3T | 4T | 5T | 6T | 7T | 8T | 9T | 10T | 11T | 14T |
| PWD | PW3 | PW4 | PW5 | PW6 | PW7 | PW8 | PW9 | PW10 | PW11 | PW14 |
| Tmp | Tm3 | Tm4 | Tm5 | Tm6 | Tm7 | Tm8 | Tm9 | Tm10 | Tm11 | Tm14 |

FIG. 38
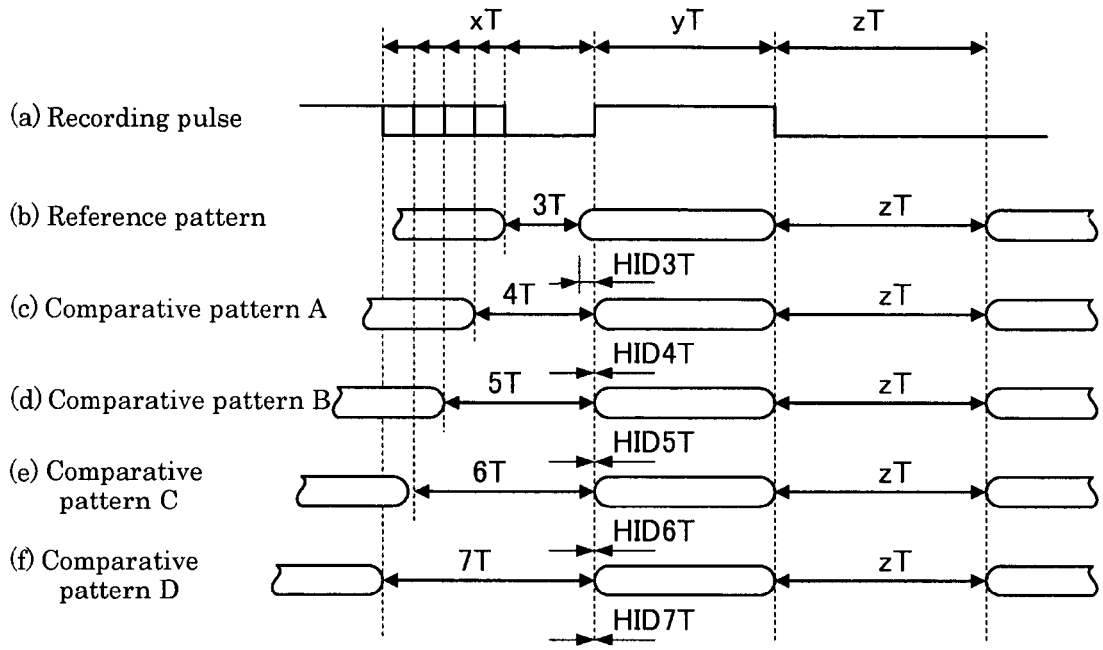
FIG. 39
(a) Phase shift detection on front side of pit
FPS
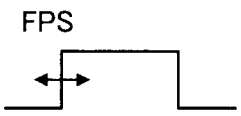
| Search pattern | PxT threshold | | LyT threshold | | PzT threshold | |
|---|---|---|---|---|---|---|
| | min | max | min | max | min | max |
| ≥P6 − L4 − P3 | 26 | 100 | 10 | 18 | 2 | 9 |
| ≥P6 − L4 − P4 | 26 | 100 | 10 | 18 | 9 | 18 |
| ≥P6 − L4 − P5 | 26 | 100 | 10 | 18 | 18 | 26 |
| ≥P6 − L4 − P6 | 26 | 100 | 10 | 18 | 26 | 35 |
| ... | ... | ... | ... | ... | ... | ... |
(b) Phase shift detection on rear side of pit
RPS
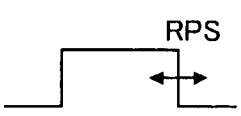
| Search pattern | PxT threshold | | LyT threshold | | PzT threshold | |
|---|---|---|---|---|---|---|
| | min | max | min | max | min | max |
| P3 − L4 − ≥P6 | 2 | 9 | 10 | 18 | 26 | 100 |
| P4 − L4 − ≥P6 | 9 | 18 | 10 | 18 | 26 | 100 |
| P5 − L4 − ≥P6 | 18 | 26 | 10 | 18 | 26 | 100 |
| P6 − L4 − ≥P6 | 26 | 35 | 10 | 18 | 26 | 100 |
| ... | ... | ... | ... | ... | ... | ... |

| Search pattern | LxT threshold | | PyT threshold | | LzT threshold | |
|---|---|---|---|---|---|---|
| | min | max | min | max | min | max |
| L3 − P4 − ≥L6 | 2 | 9 | 10 | 18 | 26 | 100 |
| L4 − P4 − ≥L6 | 9 | 18 | 10 | 18 | 26 | 100 |
| L5 − P4 − ≥L6 | 18 | 26 | 10 | 18 | 26 | 100 |
| L6 − P4 − ≥L6 | 26 | 35 | 10 | 18 | 26 | 100 |
| ... | ... | ... | ... | ... | ... | ... |

| No | Polarity | Count result |
|---|---|---|
| 1 | Pit | 5 |
| 2 | Land | 6 |
| 3 | Pit | 9 |
| ... | ... | ... |

Ttopr, Tlast determination flow

FIG. 46
(a) Ttop correction amount
| Land before pit | Pit to be corrected | | | | | | | | | |
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |
(b) Tlast correction amount
| Land after pit | Pit to be corrected | | | | | | | | | |
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |
FIG. 47
(a) Recording data
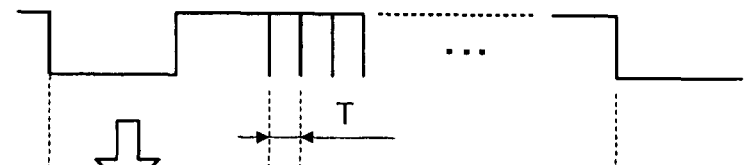
(b) Correction pulse 3T 
(c) Correction pulse 4T 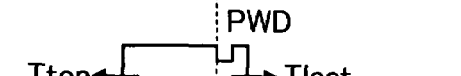
(d) Correction pulse 5T 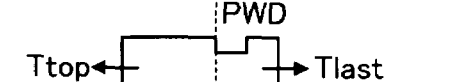
(e) Correction pulse 6T 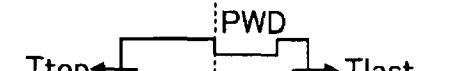
(f) Correction pulse 14T 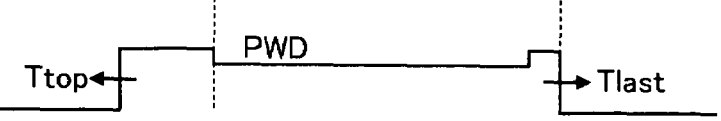

| Flag | Data |
|---|---|
| ... | ... |
|  | P3 |
|  | L5 |
|  | P4 |
|  | L4 |
|  | P8 |
|  | L7 |
|  | P3 |
|  | L5 |
| O | P14 |
| ... | ... |

Recording order

Constant output area of 14T

| Detection Item | Detection pattern | RF length | ΔTpp |
|---|---|---|---|
| Front-side phase shift | 3T | a01 | b01 |
| | 4T | a02 | b02 |
| | 5T | a03 | b03 |
| | 6T | a04 | b04 |
| | 7T | a05 | b05 |
| Rear-side phase shift | 3T | a06 | b06 |
| | 4T | a07 | b07 |
| | 5T | a08 | b08 |
| | 6T | a09 | b09 |
| | 7T | a10 | b10 |
| Heat interference | 3T | a11 | b11 |
| | 4T | a12 | b12 |
| | 5T | a13 | b13 |
| | 6T | a14 | b14 |
| | 7T | a15 | b15 |

FIG. 78

| Detection Item | Detection pattern | ΔTpp | Inner circumferential difference |
|---|---|---|---|
| Front-side phase shift | 3T | c01 | d01 |
| | 4T | c02 | d02 |
| | 5T | c03 | d03 |
| | 6T | c04 | d04 |
| | 7T | c05 | d05 |
| Rear-side phase shift | 3T | c06 | d06 |
| | 4T | c07 | d07 |
| | 5T | c08 | d08 |
| | 6T | c09 | d09 |
| | 7T | c10 | d10 |
| Heat interference | 3T | c11 | d11 |
| | 4T | c12 | d12 |
| | 5T | c13 | d13 |
| | 6T | c14 | d14 |
| | 7T | c15 | d15 |

OPTICAL INFORMATION RECORDING DEVICE, OPTICAL INFORMATION RECORDING METHOD, AND SIGNAL PROCESSING CIRCUIT

FIELD OF THE INVENTION

The present invention relates to a device and a method for optical recording and a signal processing circuit, and more particularly, to a device and a method for optical recording and a signal processing circuit that are effective for optimizing a recording condition for a medium that has different recording characteristics for its inner and outer circumferences.

BACKGROUND OF THE INVENTION

For recording onto optical information recording media such as CD-R or DVD-R (hereinafter referred to as "media" or a "medium"), the compatibility between a medium to be recorded on and a device to be use for recording (hereinafter referred to as a "drive") depends on each combination of them. This may be caused by the medium side factor wherein the optimum recording condition is varied by the difference in a recording material comprising the medium or the film formation variation during production, or by the drive side factor wherein the optimum recording condition is varied by the difference in a pickup device and/or a semiconductor laser comprising the drive or assembly variation during production. In fact, a suitable recording condition exists for each combination of a medium and a drive due to the combination of those factors.

Accordingly, in a conventional method, ID information on a medium type identifiable by a drive is stored in the medium as well as a recording condition prepared for each medium type is stored in the drive. When recording is actually performed, the ID information stored in the medium is read from the medium loaded to the drive, and a recording condition related to the ID information is used.

However, in the conventional method, suitable recording conditions can be selected for pre-verified known media, but prepared recording conditions may not be adequate to accommodate unknown media that are not pre-verified. Further, depending on the changes in the recording environment such as a recording speed, disturbance, and change over time, the prepared recording conditions may not be adequate even for known media.

A method contemplated to accommodate such an unknown medium is described in the following literatures:
Patent Document 1: Japanese Unexamined Patent Publication No. 2003-30837, and
Patent Document 2: Japanese Unexamined Patent Publication No. 2004-110995

As described in the paragraph [0020] of the Patent Document 1 as " . . . a phase error relative to a channel clock is detected for every recording pattern. A recording compensation parameter adjustment section 12 optimizes an emission waveform rule on the basis of the detection result at the phase error detection section 11, " a method of detecting a phase error by comparing with a channel clock and of correcting the phase error is disclosed.

Also, the paragraph [0024] of the document describes that "Next, a test pattern for determining an emission waveform rule is recorded. The area wherein the test pattern is recorded is reproduced, and the relationship between a prepared emission waveform rule and a phase error amount is examined. In other words, the phase error amount in the combination of the length of each mark and the length of each space immediately before the mark is measured. An emission waveform rule wherein the phase error amount becomes zero is estimated from the measured phase error amount, whereby a desired emission waveform rule is determined . . . ", disclosing a method for measuring a phase error amount for every combination of a mark and a space, and then estimating an emission waveform rule wherein the phase error amount becomes zero (see FIGS. 8 and 12).

The method disclosed in the Patent Document 1 is effective for optimizing a strategy because a correction is made based on a phase error of a recording pattern.

However, because the method disclosed in the Patent Document 1 involves, as conventional methods, a fine adjustment of a prepared strategy stored in a drive, it is difficult to provide a favorable recording quality for media to which prepared strategies are not applicable.

Also, the paragraph [0045] of the Patent Document 2 describes that " . . . a top pulse corresponds to a 3T period and a non-multipulse corresponds to a 8T period are generated integrally (consecutively) . . . " and the paragraph [0046] of the document describes that " . . . the laser power for a write pulse is adjusted in two levels, and when the ratio between a laser power (a height value of the top pulse) Ph and a laser power (a height value of the non-multipulse) Pm is optimum, an optimum power can be obtained . . . ", suggesting the effectiveness of optimizing the Ph/Pm ratio.

However, in the method disclosed in the Patent Document 2, as described in the paragraph [0067] of the document, the initial values of Ph and Pm are temporarily set based on values stored in a drive or a medium, and then the Ph/Pm ratio is calculated. Accordingly, as in the case of the Patent Document 1, it is difficult to provide favorable recording quality for media to which the temporarily set values are not applicable.

Further, recording information onto an optical information recording medium such as an optical disk is performed by modulating recording data by EFM (Eight to Fourteen Modulation) method or 8-16 modulation method; forming recording pulses based on the modulated signal; controlling the intensity and irradiation timing of a laser beam based on the recording pulses; and forming recording pits on the optical disk.

Since the formation of recording pits involves using the heat generated by laser beam irradiation, the recording pulses require some configuration in consideration of the heat accumulation effect and heat interference. Thus, in conventional methods, recording onto an optical disk has been performed by setting various parameters, which configure the recording pulses, for each kind of optical disks in the form of strategy, and then selecting one of those strategies that is the most suitable for the recording environment of the disk.

This strategy depends, for instance, not only on variation between optical information recording devices such as variation in spot diameter or in mechanical accuracy depending on a pickup device, but also on the manufacturer, type and recording speed of a optical disk used for recording/reproducing. Consequently, setting an optimum strategy improves recording quality.

For this reason, a method has been proposed, wherein a strategy for each of optical disk types produced by different manufacturers is determined and pre-stored in a memory, and when recording information onto an optical disk, information of the optical disk type is read from the optical disk, and retrieve the optimum strategy that corresponds to the optical disk type from the memory, followed by using it.

However, although the above-mentioned method enables optimum recording for optical disk types produced by different manufacturers that are pre-stored in the memory, it cannot provide optimum recording onto a medium of which a manufacturer and a type are not pre-stored in the memory. In addition, optimum recording may not also be provided even for the optical disk types pre-stored in the memory when a recording speed is varied.

Consequently, as described in the following Patent Documents 3 to 6, a number of methods are suggested, wherein various optical disks can be supported by performing a test recording for each recording, whereby an optimum strategy may be determined:

Patent Document 3: Japanese Unexamined Patent Publication No. 1993-144001,

Patent Document 4: Japanese Unexamined Patent Publication No. 1992-137224,

Patent Document 5: Japanese Unexamined Patent Publication No. 1993-143999, and

Patent Document 6: Japanese Unexamined Patent Publication No. 1995-235056

However, since the methods disclosed in the Patent Documents 3 to 6 require test recording before information recording is started, a strategy cannot be corrected at the same time as recording, making it difficult to accommodate the case where the optimum condition is varied for inner and outer circumferences of an optical disk to be used.

Since an optical disk has slightly different recording characteristics for its inner and outer circumferences and a recording device may have different recording speeds for the inner and outer circumferences, a technique that involves adjusting laser power to reduce the difference between the inner and outer circumferences is disclosed in the following Patent Document 7 as a method to solve the problem of the variation in recording quality for inner and outer circumferences:

Patent Document 7: Japanese Unexamined Patent Publication No. 1978-050707.

The Patent Document 7 discloses a method wherein the optimization of a laser power is automatically performed by detecting the change in light intensity of an auxiliary beam, which is called OPC (Optimum Power Control).

The OPC described above is called Running OPC that adjusts the power in real time. Since correction parameters can be determined based on statistical indicators such as asymmetry values, real time correction that performs adjustments at the same time as recording becomes possible. However, when correcting a pulse width and/or pulse phase condition, because detecting the shift amount between a recording pulse and the corresponding pit formed on an optical disk is required, the conventional OPC may not be used.

Accordingly, the realtime adjustment of pulse conditions requires a technology to detect the positions and lengths of pits and spaces at the same time as recording. As one of the approaches to meet this requirement, the following Patent Document 8 discloses a technology that reproduces positions approximately same as the recording positions:

Patent Document 8: Japanese Unexamined Patent Publication No. 1976-109851.

However, although this method is applicable to optical magnetic recording, it is difficult to apply to optical recoding without the use of magnetism. That is, the laser power is not modulated in optical magnetic recording because modulating magnetism yields information recording. However, in optical recording, modulating laser power yields information recording, and the effects of the modulation arise when reproducing.

As the solution for the above problem, methods disclosed in the following patents documents are known:

Patent Document 9: Japanese Unexamined Patent Publication No. 1989-287825,

Patent Document 10: Japanese Unexamined Patent Publication No. 1995-129956,

Patent Document 11: Japanese Unexamined Patent Publication No. 2004-220044, and

Patent Document 12: Japanese Unexamined Patent Publication No. 1997-147361.

The Patent Document 9 discloses a technology wherein separate laser beams are irradiated at non-recording area and recording area respectively, and a reproduction signal is retrieved from the separated signals by dividing them. According to this method, the distortion in a reproduction signal waveform due to the light intensity modulation of a laser beam during recording information can be corrected.

The Patent Document 10 discloses a technology of obtaining a reproduction signal by offsetting a modulated power with the opposite phase clock of a laser power appropriately amplified by AGC (Auto Gain Control).

The Patent Document 11 discloses a technology that offsets the distortion in a reproduction signal associated with the waveform variation in recording pulses by generating a signal that corresponds to the waveform variation in recording pulses using a delay inversion equivalent circuit.

Each of the methods disclosed in Patent Documents 9 to 11 is a technology that offsets modulated components by operations, and the offset is theoretically available. However, there remain various problems in practical applications in terms of accuracy of the offset and operation speed.

The Patent Document 12 discloses a technology that detects the distortion in recoding state in realtime by inputting delayed pulses generated by delaying pulses used for recording into a phase comparator along with reproduction pulses using a gate signal generated by inverting a modulated signal.

However, since the method disclosed in the Patent Document 12 involves the reproduction of pits while the recording pulse is off, when the power of a sub beam is low, it is difficult to obtain satisfactory quality of a reproduction signal. Especially in a configuration wherein a reproduction sub beam is branched from a main beam for recording, it is difficult to allocate adequate power to the sub beam when branching ratio is 20:1 or 30:1.

The branching ratio described in the Patent Document 12 is 8:1, but since the branching ratio tends to be larger as recording speed increases, and further, since beam power while recording pulse is off is normally 1 mW and below, the intensity of reflected light from a recording surface that is detectable while recording pulse is off becomes significantly small. When the light intensity becomes smaller, a favorable detection signal may not be obtained because noises such as a circuit noise or a media noise disturbs the detection of the signal.

On the other hand, the integral detection method that uses integration value of a reproduction RF signal, the amplitude detection method that uses 1 st derivative value of an RF signal, or the peak detection method that uses 2nd derivative value of an RF signal is known as a method of detecting pits and space lengths recorded on a optical disk.

However, in an optical recording device wherein reproduction is performed using a laser beam having a relatively shorter wavelength, since reflected beams from a spot and a pit in an optical medium recorded at lower density are not interfered by each other, it is difficult to detect length information by the integral detection method of an RF signal.

In the method that uses 1st derivative value of an RF signal, when recording power changes as recording speed varies, a signal binarized at the same slice level provides two different length for a pit and a space respectively that should have the same length. As a solution for this problem, a method that involves changing a slice level according to a recording speed may be effective, but setting an appropriate slice level for each recording speed is not easy.

As the peak detection method that uses 2nd derivative values of an RF signal, for instance, the method disclosed in the following patent document is known:

Patent Document 13: International Publication No. WO96/24130.

The method disclosed in the Patent Document 13 suggests that differentiating the difference signal (i.e. a tangential push-pull signal) from a photodetector that is divided into two areas by a parting line that is optically vertical to a rotational direction of an optical medium generates a signal equivalent to a 2nd derivative value of an RF signal, whereby edge positions of pits can be detected.

However, when the method disclosed in the Patent Document 13 is used to detect pits and spaces recorded on a high-density type optical disk, such as a DVD-class medium, errors in the derivative value of a tangential push-pull signal for shorter pits and spaces such as 3T or 4T that are likely to be interfered may arise, resulting in detecting values different from the actual pits and spaces lengths.

On the other hand, the following Patent Document 14 discloses a method for improving the above-mentioned Running OPC:

Patent Document 14: Japanese Unexamined Patent Publication No. 2002-117544.

The Patent Document 14 discloses a method of detecting an optimum power using certain pit/land pattern, but since the pit/land pattern described in the document cannot distinguish an adjustment parameter for a power from that for a pulse width, a margin sufficient to meet good recording quality may not be ensured, resulting in the difficulty in accommodation of high-speed recording.

It is therefore the object of the present invention to provide a method to optimize recording conditions for various media that have different recording characteristics for their inner and outer circumferences.

SUMMARY OF THE INVENTION

In order to accomplish the above object, a first aspect of the invention is characterized by an optical information recording device for forming pits and/or spaces on an optical recording medium by irradiating a laser beam based on a recording pulse stream having a first recording pulse comprised of a top pulse alone and a second recording pulse comprised of the top pulse and a succeeding pulse, the optical information recording device comprising: means for reproducing pits and/or spaces formed on the optical recording medium; means for varying power of the first recording pulse based on a reproduction result by the reproduction means; and means for varying a width of the second recording pulse based on a reproduction result by the reproduction means.

As described above, using a top pulse as a power control factor and a succeeding pulse as a pulse width control factor enables the control factors for the power and pulse width to be independent each other, resulting in the increase of a margin to meet good recording quality.

It is preferable to set a top pulse based on a shortest pit that has the highest appearance rate and is difficult to be recorded. For instance, when a pit stream having 3T to 11T is defined just like in CD-R, or when a pit stream having 3T to 11T, and 14T is defined just like in DVD-R, it is preferable to adapt a top pulse to correspond to a 3T pit.

Further, a succeeding pulse may be either a non-multipulse or a multipulse, and it is preferable that a recording pulse is optimized by using a power ratio between a top pulse and a succeeding pulse in the case of a non-multipulse, whereas in the case of a multipulse, it is preferable that a recording pulse is optimized by adjusting a duty for each of a plurality of divided pulses that configure a succeeding pulse.

A top pulse condition and a succeeding pulse condition may be defined by any combination of pulse power, pulse width, and duty, and preferably, a recording pulse is optimized by adjusting a ratio between a top pulse and a seceding pulse.

According to the present invention, determining a top pulse condition prior to the determination of a succeeding pulse condition enables to realize more stable recording quality. That is, the front side of a recording pulse has more influence on recording quality than the rear side, and especially when a 3T pulse that has the highest appearance rate is set as a top pulse, the influence becomes apparent.

Accordingly, the present invention employs a method in which preliminarily determining a top pulse condition assumed to be an optimum enables to find a top pulse condition closer to the optimum, and then a succeeding pulse condition is determined. On the contrary, in the method wherein a ratio between a top pulse and a succeeding pulse is optimized first as disclosed in the above-mentioned Patent Document 2, an optimum solution for a top pulse may not be obtained, resulting in the decrease of accommodation capability for unknown media.

In addition, a procedure for determining a top pulse condition and a succeeding pulse condition may be repeated several times in order to improve accuracy.

More preferably, a recording pulse stream is configured with an mT pulse and an nT pulse, wherein the mT pulse has a length of m'T which is the shortest pulse length found in the recording pulse stream, and the nT pulse has a length of n'T which is defined by the following equation:

$$n'T = m'T + (n-m)T,$$

where T represents a cycle of a clock signal, m' a clock count of the shortest pulse, n' a clock count of the pulse, mT a data length of the shortest pit, and nT data length of a pit longer than the shortest pit.

Further, the mT pulse is defined as a top pulse, and the (n−m)T pulse is defined as a succeeding pulse that follows the top pulse, and a pulse comprised of these pulses successively is defined as an nT pulse. Because the mT pulse is the shortest pulse, which is most difficult to be recorded, the determination of the mT pulse condition has a priority over determining other pulse conditions.

The mT pulse has a length defined as m'T and is obtained by varying the data length mT of the shortest pit. This is a result of determining an optimum recording pulse length in consideration of a shift length from a reference length when the shortest pit is recorded, and the nT pulse is also affected by the m'T, resulting in having a length of n'T.

For instance, in the case of recording data having the shortest length 3T with a 2T recording pulse, since a data length is mT=3T and a pulse length is m'T=2T, a recording pulse n'T used for recording 5T data is expressed as 2T+(5−3)T=4T.

A second aspect of the invention is characterized by an optical information recording device for forming pits and/or spaces on an optical recording medium by irradiating a laser beam based on a recording pulse stream having a first recording pulse comprised of a top pulse alone and a second recording pulse comprised of the top pulse and a succeeding pulse, the optical information recording device comprising: means for detecting a shift length from a reference length by reproducing the pits and/or spaces formed on the optical recording medium; means for determining power of the first recording pulse based on the shift length; and means for determining a width of the second recording pulse based on the shift length.

As described above, by detecting the influence of power on recording quality using a shift length, a relationship between neighboring pit and space is clarified, and therefore power can be adjusted more precisely.

A third aspect of the invention is characterized by an optical information recording device for forming pits and/or spaces on an optical recording medium by irradiating a laser beam based on a recording pulse stream having a first recording pulse comprised of a top pulse alone and a second recording pulse comprised of the top pulse and a succeeding pulse, the optical information recording device comprising: means for determining reference recording conditions of the first and the second recording pulses by reproducing pits and/or spaces formed on a test area of the optical recording medium; means for detecting a shift length from a reference length by reproducing pits and/or spaces formed on a recording area of the optical recording medium; means for setting a width of the first recording pulse to the same condition as the reference recording condition as well as adjusting power of the first recording pulse based on the shift length; and means for setting power of the second recording pulse to the same condition as that of the first recording pulse as well as adjusting a width of the second recording pulse based on the shift length.

As described above, by independently detecting and adjusting influences of power and pulse width variations on recording quality based on a shift length from a reference length, a margin to meet good recording quality can be improved.

A fourth aspect of the invention is characterized by an optical information recording device for forming pits and/or spaces on an optical recording medium by pulse irradiation of a recording laser beam as well as detecting the pits and/or spaces by irradiating a reproduction laser beam, the optical information recording device comprising: means for determining reference recording conditions of a first recording pulse comprised of a top pulse alone and a second recording pulse comprised of the top pulse and a succeeding pulse by reproducing pits and/or spaces formed on a test area of the optical recording medium; means for detecting a shift length from a reference length by reproducing pits and/or spaces, which are formed on a recording area of the optical recording medium by the recording laser beam, with the reproduction laser beam; means for setting a width of the first recording pulse to the same condition as the reference recording condition as well as adjusting power of the first recording pulse based on the shift length; and means for setting power of the second recording pulse to the same condition as that of the first recording pulse as well as adjusting a width of the second recording pulse based on the shift length.

As described above, since the realtime detection of a shift length is enabled by detecting pits, which are formed by a recording laser beam, with a reproduction laser beam, a realtime power correction based on a shift length becomes available, resulting in an improved accommodation capability for media that have different recording qualities for their inner and outer circumferences.

A fifth aspect of the invention is characterized by an optical information recording device for forming pits and/or spaces on an optical recording medium by irradiating a laser beam based on a recording pulse stream having a first recording pulse comprised of a top pulse alone and a second recording pulse comprised of the top pulse and a succeeding pulse, the optical information recording device comprising: means for irradiating a recording pulse stream having the two first recording pulses arranged with an interval corresponding to a width of the second recording pulse therebetween on the optical recording medium; means for obtaining a pit and/or space signal corresponding to the interval between the two first recording pulses by reproducing the pits and/or spaces formed by irradiating the recording pulse stream; means for detecting a pit length and/or a space length corresponding to the first recording pulse based on the pit and/or space signal corresponding to the interval between the two first recording pulses; and means for adjusting power of the first recording pulse based on the pit length and/or the space length corresponding to the detected first recording pulse.

As described above, by detecting a pit or space length formed by the first recording pulse using a signal corresponding to the width of the second recording pulse, even in the case of a 3T signal that has a small eye-pattern opening and is difficult to be detected, setting the width of the first recording pulse and the interval corresponding to the second recording pulse to 3T and 6T respectively enables the length of a 3T pit or space corresponding to the 3T signal to be predicted from a large 6T signal because the 6T signal is affected by 3T signals lying on both sides of the 6T signal.

A sixth aspect of the invention is characterized by an optical information recording device the fifth aspect of the invention comprising: means for irradiating a first recording pulse stream having the two first recording pulses followed by an interval corresponding to a width of the first recording pulse; means for irradiating a second recoding pulse stream having the two first recording pulses followed by an interval having a length longer than the width of the first recording pulse; means for comparing a signal obtained by reproducing pits and spaces formed by irradiating the first recording pulse stream with that formed by irradiating the second recording pulse stream; and means for determining whether or not the reproduction result is correct based on the comparison result.

As described above, by comparing a reproduction result of the first recording pulse stream followed by the shorter interval with that of the second recording pulse stream followed by the longer interval, a distortion that may arise when a succeeding interval is shorter can be detected. As a result, an error due to the distortion can be avoided.

A seventh aspect of the invention is characterized by an optical information recording device for forming pits and/or spaces on an optical recording medium by pulse irradiation of a recording laser beam as well as detecting the pits and/or spaces by irradiating a reproduction laser beam, the optical information recording device comprising: means for determining recording conditions of a first recording pulse and a second recording pulse that is longer than the first recording pulse by reproducing pits and/or spaces formed on a test area of the optical recording medium; means for irradiating a recording pulse stream having the two first recording pulses arranged with an interval corresponding to a width of the second recording pulse therebetween onto a recording area of the optical recording medium using the recording laser beam; means for obtaining a pit and/or space signal that corresponds to the interval between the two first recording pulses by reproducing pits and/or spaces formed by irradiating the recording pulse stream using the reproduction laser beam;

means for detecting a pit length and/or a space length corresponding to the first recording pulse based on the pit and/or space signal corresponding to the interval between the two first recording pulses; means for adjusting power of the first recording pulse based on the detected pit length and/or the detected space length corresponding to the first recording pulse; means for irradiating a first recording pulse stream having the two first recording pulses followed by an interval corresponding to a width of the first recording pulse; means for irradiating a second recoding pulse stream having the two first recording pulses followed by an interval having a length longer than the width of the first recording pulse; and means for comparing a signal obtained by reproducing pits and paces formed by irradiating the first recording pulse stream with that formed by irradiating the second recording pulse stream.

Since such a configuration enables an accurate and real-time detection of the effect of the first recording pulse that has a small signal amount, a large margin to meet good recording quality can be ensured even for media with different recording qualities for their inner and outer circumferences.

An eighth aspect of the invention is characterized by an optical information recording method for forming pits and/or spaces on an optical recording medium by irradiating a laser beam based on a recording pulse stream having a first recording pulse comprised of a top pulse alone and a second recording pulse comprised of the top pulse and a succeeding pulse, the optical information recording method comprising the steps of: reproducing pits and/or spaces formed on the optical recording medium; varying power of the first recording pulse based on a reproduction result by the reproduction step; and varying a width of the second recording pulse based on a reproduction result by the reproduction step.

A ninth aspect of the invention is characterized by an optical information recording method for forming pits and/or spaces on an optical recording medium by irradiating a laser beam based on a recording pulse stream having a first recording pulse comprised of a top pulse alone and a second recording pulse comprised of the top pulse and a succeeding pulse, the method comprising the steps of: irradiating a recording pulse stream having the two first recording pulses arranged with an interval corresponding to a width of the second recording pulse therebetween on the optical recording medium; obtaining a pit and/or space signal corresponding to the interval between the two first recording pulses by reproducing pits and/or spaces formed by irradiating the recording pulse stream; detecting a pit length and/or a space length corresponding to the first recording pulse based on the pit and/or space signal corresponding to the interval between the two first recording pulses; and adjusting power of the first recording pulse based on the detected pit length and/or the detected space length corresponding to the first recording pulse.

A tenth aspect of the invention is characterized by a signal processing circuit incorporated into an optical information recording device for forming pits and/or spaces on an optical recording medium by irradiating laser beam based on a recording pulse stream having a first recording pulse comprised of a top pulse alone and a second recording pulse comprised of the top pulse and a succeeding pulse, the signal processing circuit comprising: means for reproducing pits and/or spaces formed on the optical recording medium; means for varying power of the first recording pulse based on a reproduction result by the reproduction means; and means for varying a width of the second recording pulse based on a reproduction result by the reproduction means.

An eleventh aspect of the invention is characterized by a signal processing circuit incorporated into an optical information recording device for forming pits and/or spaces on an optical recording medium by irradiating a laser beam based on a recording pulse stream having a first recording pulse comprised of a top pulse alone and a second recording pulse comprised of the top pulse and a succeeding pulse, the signal processing circuit comprising: means for irradiating a recording pulse stream having the two first recording pulses arranged with an interval corresponding to a width of the second recording pulse therebetween on the optical recording medium; means for obtaining a pit and/or space signal corresponding to the interval between the two first recording pulses by reproducing pits and/or spaces formed by irradiating the recording pulse stream; means for detecting a pit length and/or a space length corresponding to the first recording pulse based on the pit and/or space signal corresponding to the interval between the two first recording pulses; and means for adjusting power of the first recording pulse based on the detected pit length and/or the space length corresponding to the first recording pulse.

A twelfth aspect of the invention is characterized by an optical recording device for forming pits and/or spaces onto an optical recording medium by pulse irradiation of a laser beam, the optical recording device comprising: means for obtaining a 2nd derivative value of a signal obtained as a result of reproducing pits and/or spaces formed on a test area of the optical recording medium; means for obtaining a 2nd derivative value of a signal obtained as a result of reproducing pits and/or spaces formed on a recording area of the optical recording medium; and means for comparing the 2nd derivative value obtained in the test area with that obtained in the recording area.

As the 2nd derivative value, either a 2nd derivative value of a reproduced RF signal or a 1st derivative value of a tangential push-pull signal may be used.

As described above, by comparing a 2nd derivative value obtained in the test area with that obtained in the recording area, an accurate shift length can be detected for a 3T or 4T signal that is easily interfered when a medium has a high recording density.

A thirteenth aspect of the invention is characterized by an optical information recording device for forming pits and/or spaces on an optical recording medium by pulse irradiation of a recording laser beam as well as detecting the pits and/or spaces by irradiating a reproduction laser beam, the optical information recording device comprising: means for obtaining a 2nd derivative value of a signal obtained as a result of reproducing pits and/or spaces formed on a test area of the optical recording medium; means for obtaining a 2nd derivative value of a signal obtained as a result of reproducing pits and/or spaces, which are formed on a recording area of the optical recording medium by the recording laser beam, with the reproduction laser beam; and means for comparing the 2nd derivative value obtained in the test area with that obtained in the recording area.

As described above, a realtime correction of a shift length using a 2nd derivative value is enabled by detecting pits, which are formed by a recording laser beam, with a reproduction laser beam. As a result, accommodation capability for a medium with different recording qualities of its inner and outer circumferences is improved.

A fourteenth aspect of the invention is characterized by an optical information recording device for forming various types of pits and spaces with different lengths onto an optical recording medium by pulse irradiation of a laser beam, the optical information recording medium comprising: means for obtaining a 2nd derivative value for each of various types of pit signals with different lengths obtained as a result of reproducing pits and spaces formed on a test area of the optical information recording medium; means for obtaining a 2nd derivative value for each of various types of pit signals with different lengths obtained as a result of reproducing pits and spaces formed on a recording area of the optical information recording medium; and means for comparing the 2nd derivative value for each pit length obtained in the test area with that obtained in the recording area.

As described above, since obtaining a 2nd derivative value for each of the pit lengths and comparing a value obtained in a test area with that obtained in a recording area enable the effect of a shift length on each pit length and space length to be detected, an accurate correction corresponding to each length is enabled. In addition, in the case of DVD for example, the pit length may be selected from 3T, 4T, 5T, 6T, 7T, 8T, 9T, 10T, 11T, or 14T.

A fifteenth aspect of the invention is characterized by an optical information recording device for forming various types of pits and spaces with different lengths onto an optical recording medium by pulse irradiation of a laser beam, the optical information recording device comprising: means for obtaining a 2nd derivative value for each of various types of space signals with different lengths obtained as a result of reproducing pits and spaces formed on a test area of the optical information recording medium; means for obtaining a 2nd derivative value for each of various types of space signals with different lengths obtained as a result of reproducing pits and spaces formed on a recording area of the optical information recording medium; and means for comparing the 2nd derivative value for each space length obtained in the test area with that obtained in the recording area.

As described above, since obtaining the 2nd derivative value for each of the space lengths and comparing the value obtained in the test area with that obtained in the recording area enable the effect of a shift length on each pit length and space length to be detected, an accurate correction corresponding to each length is enabled. In addition, in the case of DVD for example, the space length may be selected from 3T, 4T, 5T, 6T, 7T, 8T, 9T, 10T, 11T, or 14T.

A sixteenth aspect of the invention is characterized by an optical recording device for forming pits and/or spaces onto an optical recording medium by pulse irradiation of a laser beam, the optical recording device comprising: means for rotating the optical recording medium; means for obtaining a difference between any two of signals obtained from at least two photo-receiving areas of a photodetector that is sequentially divided in respect to a rotational direction of the optical medium; means for differentiating the difference; means for obtaining the derivative value in a test area provided on the optical recording medium; means for obtaining the derivative value in a recording area provided on the optical recording medium; and means for comparing the derivative value obtained in the test area with that obtained in the recording area.

As described, the difference between the signals obtained from two photo-receiving areas into which a photodetector is divided in respect to the rotational direction, i.e., a tangential push-pull signal may be used.

A seventeenth aspect of the invention is characterized by an optical information recording device for forming pits and/or spaces on an optical recording medium by pulse irradiation of a recording laser beam as well as detecting the pits and/or spaces by irradiating a reproduction laser beam, the optical information recording device comprising: means for rotating the optical recording medium; means for obtaining a difference between any two of signals obtained from at least two photo-receiving areas of a photodetector that is sequentially divided in respect to a rotational direction of the optical medium; means for differentiating the difference; means for obtaining the derivative value in a test area provided on the optical recording medium; means for obtaining the derivative value in a recording area provided on the optical recording medium using the reproduction laser beam; and means for comparing the derivative value obtained in the test area with that obtained in the recording area.

An eighteenth aspect of the invention is characterized by an optical recording method for forming pits and/or spaces onto an optical recording medium by pulse irradiation of a laser beam, the optical recording method comprising the steps of: obtaining a 2nd derivative value of a signal obtained as a result of reproducing pits and/or spaces formed on a test area of the optical recording medium; obtaining a 2nd derivative value of a signal obtained as a result of reproducing pits and/or spaces formed on a recording area of the optical recording medium; and comparing the 2nd derivative value obtained in the test area with that obtained in the recording area.

A nineteenth aspect of the invention is characterized by a signal processing circuit incorporated in an optical recording device for forming pits and/or spaces onto an optical recording medium by pulse irradiation of a laser beam, the signal processing circuit comprising: means for obtaining a 2nd derivative value of a signal obtained as a result of reproducing pits and/or spaces formed on a test area of the optical recording medium; means for obtaining a 2nd derivative value of a signal obtained as a result of reproducing pits and/or spaces formed on a recording area of the optical recording medium; and means for comparing the 2nd derivative value obtained in the test area with that obtained in the recording area.

As described above, since the realtime optimization of a recording condition for a medium with different characteristics for its inner and outer circumferences is enabled, the present invention can increase a margin to meet good recording quality.

BRIEF DESCRIPTION OF DRAWINGS

FIG. 1 is a schematic diagram showing the configuration of a recording pulse and the entire flow of determining a recording condition according to the present invention.

FIG. 2 is a block diagram showing the internal configuration of a drive of the present invention.

FIG. 9 is a schematic diagram showing an example wherein a downward-sloping pattern is obtained as a result of examining recording quality in the step S120 in FIG. 3.

FIG. 10 is a schematic diagram showing an example wherein an upward-sloping pattern is obtained as a result of examining recording quality in the step S120 in FIG. 3.

FIG. 13 is a schematic diagram showing an example of determining a test area as conducted in the step S122 for the case wherein an upward-sloping pattern is obtained at the step S120 in FIG. 3.

FIG. 14 is a diagram showing an example wherein the step S120 in FIG. 3 is conducted with eight patterns.

FIG. 21 is a schematic diagram showing an image of storing the count results shown in FIG. 20.

FIG. 26 is a schematic diagram showing a table configuration for searching a specific pattern used for the detection of a shift length due to a pit balance.

FIG. 27 is a schematic diagram showing a specific example of a case wherein a shift length is detected by a count result comparison.

FIG. 38 is a schematic diagram showing an example of a recording pattern for detecting a shift length of each pit due to heat interference.

FIG. 39 is a schematic diagram showing a table configuration for searching a specific pattern used in the detection of front-side or backside phase shift length.

FIG. 46 is a schematic diagram showing a table configuration for storing correction amounts Ttop and Tlast.

FIG. 47 is a schematic diagram showing an example of a corrected single pulse.

FIG. 77 is a schematic diagram showing an example of test recording to obtain the derivative value of a tangential push-pull signal in a test area.

FIG. 78 is a schematic diagram showing an example of test recording to obtain the derivative value of a tangential push-pull signal in a recording area.

DETAILED DESCRIPTION OF CERTAIN EMBODIMENTS

Figure 3:
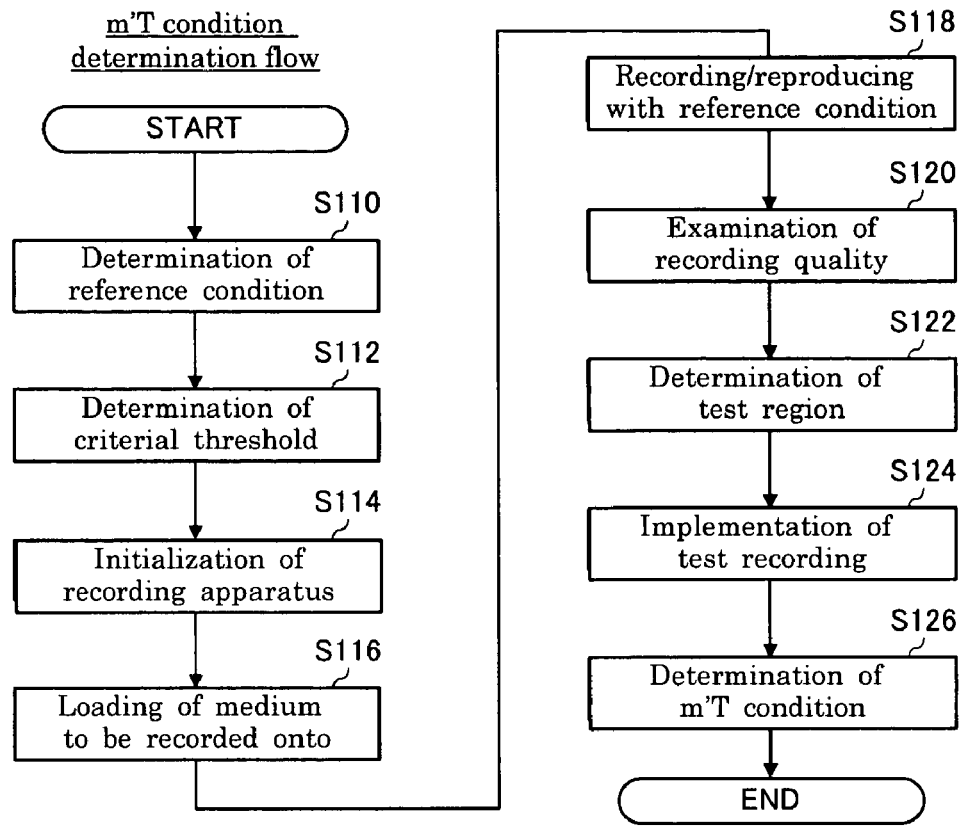
FIG. 3 is a flowchart showing a detailed execution procedure of the determination flow of a condition for m'T shown in FIG. 1.

The optical information recording device of the present invention will hereinafter be described in detail with reference to accompanying drawings. The present invention may be modified from time to time and shall not be limited to the embodiments described herein.

FIG. 1 is a schematic diagram showing the configuration of a recording pulse and the entire flow of determining a recording condition according to the present invention. As shown in FIG. 1(a), a recording pulse 10 of the present invention is comprised of a top pulse 12 arranged at the front edge of the recording pulse and a succeeding pulse 14 following the top pulse.

Assuming that the recording pulse 10 has a length of n'T, the top pulse 12 has a length of m'T, and the succeeding pulse 14 has a length of (n−m)T, m and n take the values of m=3 and n=3 to 11 or 14 respectively in this embodiment, where T is a unit time defined by an optical disk system, and its frequency is determined by a clock signal.

A condition of the recording pulse 10 is determined by conducting the flow shown in FIG. 1(b). The flow is conducted with test recording under the condition of loading a medium (hereinafter referred to as a "medium" or a "disk") into an optical information recording device (hereinafter referred to as a "recording device" or a "drive").

As shown in FIG. 1(b), to determine a condition for the recording pulse 10, a pulse condition for a pulse length of m'T is determined first (step S100), and then using the condition for the pulse length of m'T, m'T/(n−m)T, which is a ratio of the pulse condition for the pulse length of m'T to that of (n−m)T, is obtained (step S200). Then, nT pulse is configured according to the ratio (step S300), and finally a condition for a recording pulse having n'T is determined by correcting a phase shift (step S400).

FIG. 2 is a block diagram showing the internal configuration of a drive of the present invention. As shown in FIG. 2, the drive 100 records/reproduces information onto/from a medium 500 using a laser beam emitted from a laser oscillator 1103.

When recording information onto the medium 500, a recording signal corresponding to the information desired to be recorded is encoded by an encoder 1101 using EFM method, and the obtained encoded data are transmitted to a strategy circuit 1102.

The strategy circuit 1102 is configured with various setting parameters for a certain strategy. The circuit controls the intensity and pulse width of a laser beam emitted from the laser oscillator 1103 by varying a recording pulse it sends to the laser oscillator 1103, therefore obtaining a desired recording state.

The recording pulse generated in the strategy circuit 1102 is transmitted to the laser oscillator 1103, where an output laser beam is controlled according to the recording pulse, and the controlled laser beam is irradiated via the lens 1104, half mirror 1105, and lens 1106 to the medium 500 that is rotating at a constant linear velocity or at a constant rotational speed.

Consequently, a recording pattern comprised of a pit/land train corresponding to the desired recording data is recorded onto the medium 500.

In contrast, when reproducing the information recorded on the medium 500, a homogeneous reproduction laser beam emitted from the laser oscillator 1103 is irradiated via the lens 1104, half mirror 1105, and lens 1106 to the medium 500 that is rotating at a constant linear velocity or at a constant rotational speed.

The reproduction laser beam has lower intensity than the recording laser beam emitted from the oscillator 1103 upon recording, and the reflected light of the reproduction laser beam from the medium 500 is received at a photo-receiving part 1108 via the lens 1106, half mirror 1105, and lens 1107 and transformed into an electrical signal.

An electrical signal output from the photo-receiving part 1108 corresponds to the recording pattern comprised of the pits and lands recorded on the medium 500. A synchronizing signal detection circuit 1109 generates a clock signal with a certain cycle based on a wobble component included in the electrical signal output from the photo-receiving part 1108. Subsequently, the electrical signal is binarized in a binarization circuit 1110, decoded in a decoder 1111, and output as a reproduction signal.

As described, since the recording quality of a recording system comprised of a drive and a medium is affected by the variation between optical information recording devices and by the variation between optical information recording media, absorbing such influence with the strategy enables the recording quality to be improved. In addition, as the medium, various media including dye type media represented by CD-R or DVD-R, and phase-change media represented by CD-RW or DVD-RW may be applied.

The determination flow for a recording pulse condition as shown in FIG. 1(*b*), which is conducted by the above-described drive, is hereinafter described in detail.

Determination of mT Condition

FIG. 3 is a flowchart showing a detailed execution procedure of the determination flow of a condition for mT shown in FIG. 1. As shown in FIG. 3, the drive 100 conducts steps S110 to S114 to configure an initial setting, steps S116 to S122 to determine a condition of test recording, a step S124 to conduct test recording under the determined condition, and a step S126 to determine a condition for mT pulse based on the result of the test recording. The details of each step are described below.

Determination of Reference Condition

In the step S110 in FIG. 3, test recording of any typical medium is conducted while varying the recording speed, whereby one pulse width and three power values are obtained as a reference condition. As the three power values, based on the result of the test recording, a power value corresponding to a minimum jitter value and two other power values before and after the power value are preferably used. As the two other power values, it is preferable to use values around a threshold that provides a criterion for determining whether or not the jitter is acceptable. The reference condition obtained in this step is later used for the verification of recording quality.

Determination of Criterial Threshold

As described later in detail, since the present invention is intended to define a region below a jitter threshold as a range of test recording condition (hereinafter referred to as "test area"), a criterial threshold should be determined. As the threshold value, a standard value for each drive or medium type may be prepared, but the threshold that indicates a minimum limit of acceptable jitter is varied depending on optical components comprising the pickup shown in FIG. 2 or on the other elements as well as on the recording speed for a medium.

Consequently, it is recommended to set up a more accurate test area by obtaining such threshold for each combination of a drive and a medium to provide a more accurate criterion.

However, since setting the threshold for each combination of a drive and a medium causes the number of recording steps to be increased, the threshold suitable for each drive may be stored in a storage area 1115 upon manufacturing of drives, assuming that the variation in a drive is a main cause of the variation of threshold.

Figure 4:
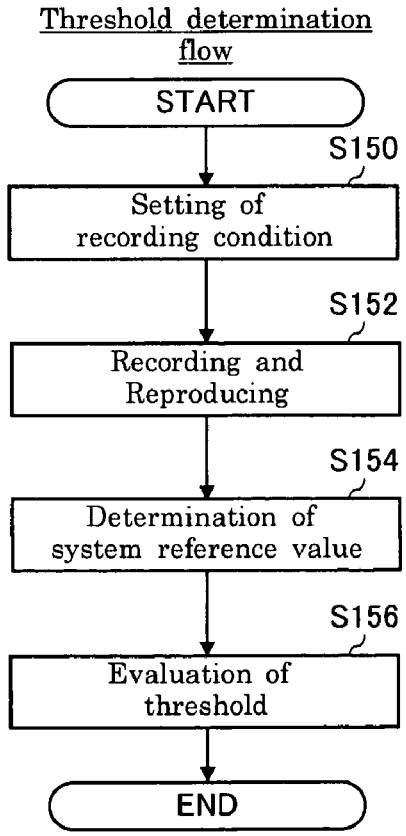
FIG. 4 is a flowchart showing the details of a determination step for a threshold shown in FIG. 3.

FIG. 4 is a flowchart showing the details of a determination step for a threshold shown in FIG. 3. As shown in FIG. 4, the threshold is determined in such a way that recording/reproducing under a predetermined recording condition is conducted, then a preliminary threshold based on the recording/reproducing result is determined, and the value ensuring a certain margin to the preliminary threshold as a threshold used for determining a test area is set. Hereinafter, each step is sequentially described.

First, a recording condition is defined by conducting a step S150, wherein certain patterns of necessary conditions for recording/reproducing including pulse width, power, recording/reproduction speed, and recording address are prepared. After those recording conditions are defined in a drive, a reference medium is loaded into the drive. As the reference medium, among those various media, it is preferable to select one that has typical characteristics.

Next, by conducting a recording/reproducing step S152 to the reference medium loaded under the recording conditions defined by the above-described step S150, recording/reproduction characteristic values for each of the recording conditions, such as jitter values, are obtained. In this step, a value that indicates recording quality is selected as the characteristic value.

Subsequently, a system reference value is determined by conducting a step S154, wherein an optimum value, such as a minimum jitter value, is obtained from the recording/reproducing characteristic values obtained in the above-described step S152. Consequently, a jitter value considered to be closer to the optimum value for the drive is set as a reference value. In addition, instead of the optimum jitter value, a mean of two values at which a predetermined threshold intersects with an approximated curve for the jitter values, that is, a mean value of a power margin may be used as the reference value.

Finally, a step S156 wherein a threshold is calculated by multiplying the system reference value obtained in the above-described step S154 by predetermined coefficient α (preferably α>1), is conducted. This enables the determination under the condition where the system reference value has the predetermined margin. Specifically, the calculation of the threshold is conducted by multiplying the system reference value by α, where the coefficient a preferably be a value around 1.5. In addition, the coefficient □ may be a suitable value corresponding to a type of drive or medium, for instance, a value approximate to the system reference value such as α=0.8 to 1.2 or a larger value such as α=2.0 to 3.0 is applicable.

Figure 5:
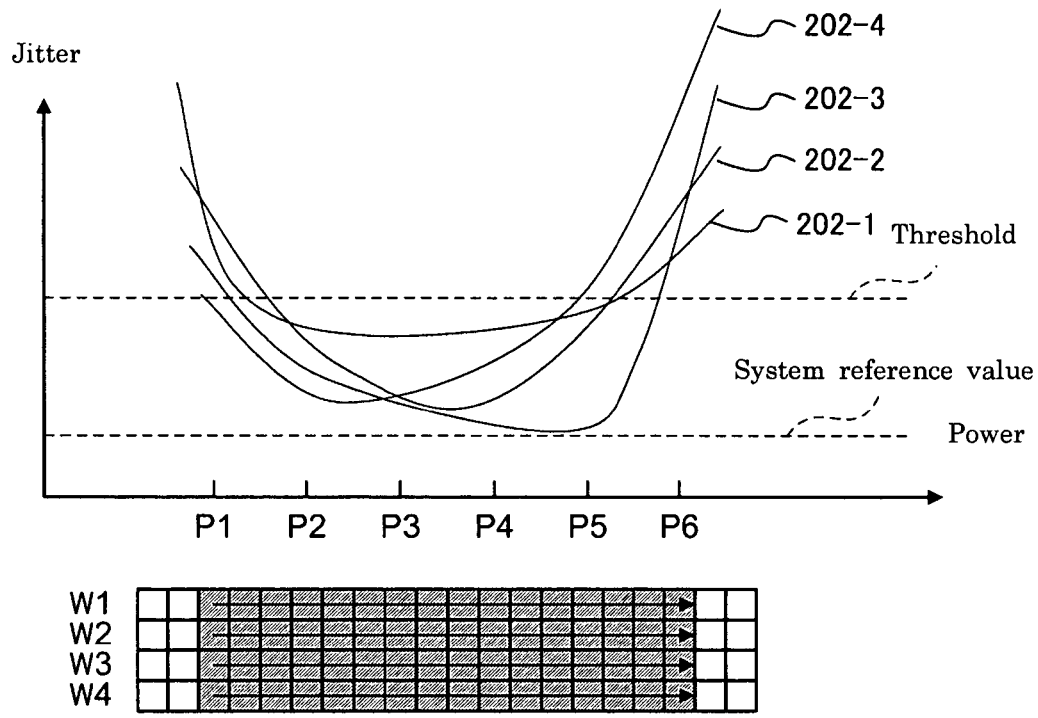
FIG. 5 is a schematic diagram showing an example of the flow shown in FIG. 4.

FIG. 5 is a schematic diagram showing an example of the flow shown in FIG. 4. The example shown in FIG. 5 exemplifies a case where reproduction characteristics 202-1 to 202-4 are obtained respectively by applying power P1 to P6 for each pulse width W1 to W4 while using a jitter value as a characteristic value that indicates recording quality. In the example, a pulse width W1 to W4 and power P1 to P6 are set as the recording conditions, and an extreme value of the recording characteristic 102-3 that exhibits a minimum jitter value is set as the system reference value. The threshold may be obtained by multiplying the system reference value by, for instance, 1.5. In addition, the arrows in the matrix table of the figure indicate the direction of changing a test condition and are hereinafter used as the same meaning.

Figure 6:
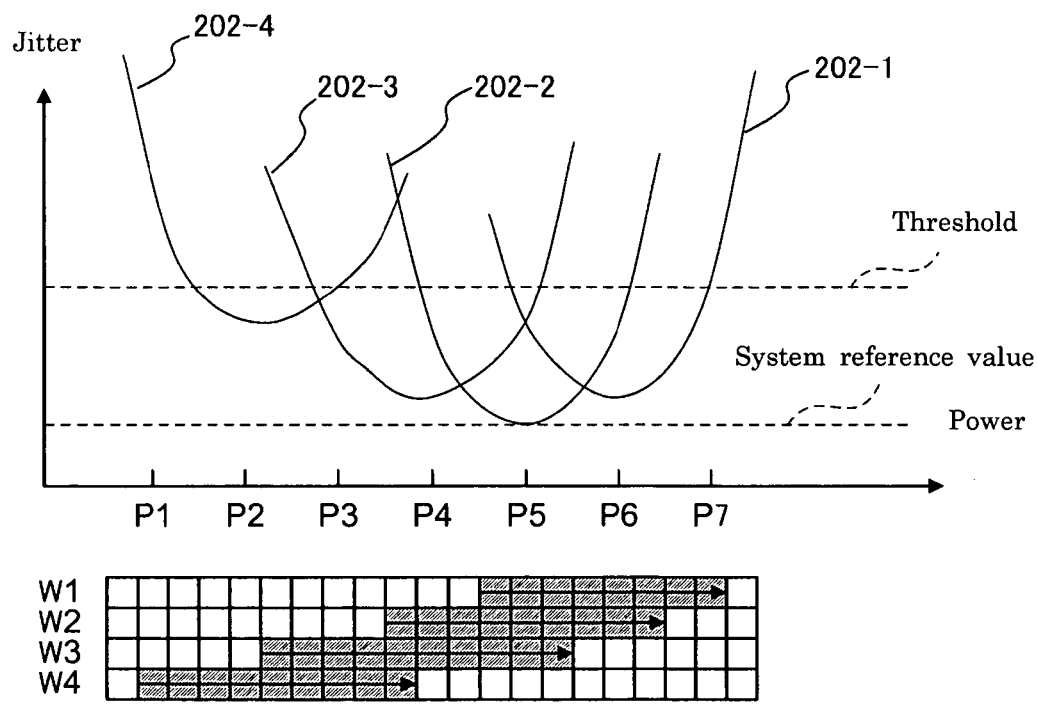
FIG. 6 is a schematic diagram showing an example of the flow shown in FIG. 4.

FIG. 6 is a schematic diagram showing an example of the flow shown in FIG. 4. The example shown in FIG. 6 illustrates a case where reproduction characteristics 202-1 to 202-4 are obtained by applying power P1 to P6 for each pulse width W1 to W4 while using a jitter value as a characteristic value that indicates recording quality. In the example, an extremal value of the reproduction characteristic 202-2 that exhibits a minimum jitter value is the system reference value. The threshold may be obtained by multiplying the system reference value by, for instance, 1.5. As described, a threshold can be determined for each pulse width by changing a power condition.

Figure 7:
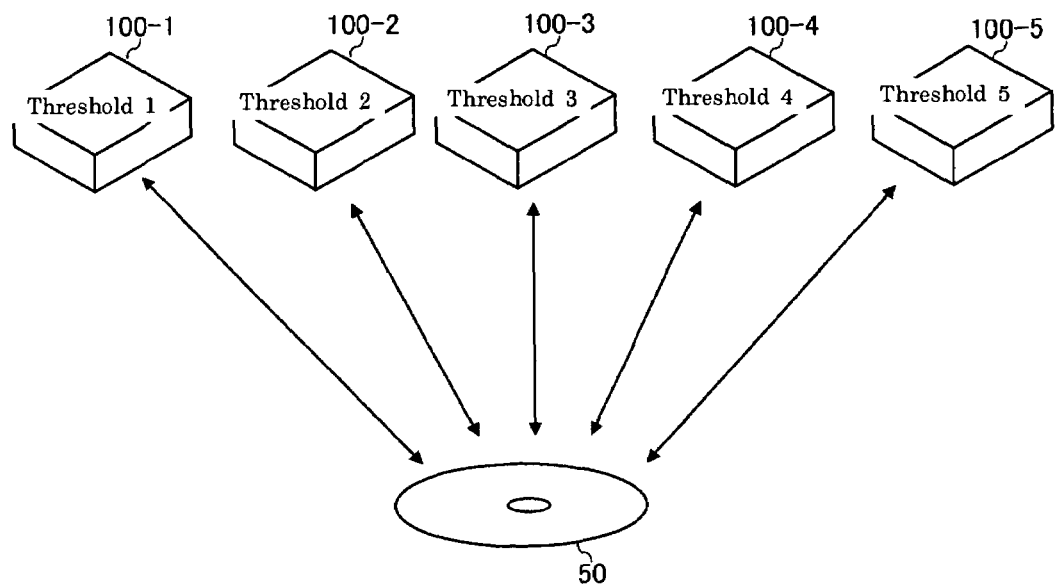
FIG. 7 is a schematic diagram showing an example of a case wherein a threshold is calculated for each drive.

FIG. 7 is a schematic diagram showing an example of a case wherein a threshold is calculated for each drive. If setting a threshold corresponding to the variation of the drive is desired, as shown in the diagram, a common reference medium 500 is recorded/reproduced in each of the drives 100-1 to 100-5, and thresholds 1 to 5 unique to the respective drives are stored.

In addition, when simplified procedure for setting of a threshold is desired, an average of thresholds 1 to 5, which are obtained by recording/reproducing a common reference medium with several typical derives, is calculated, and the average threshold may be used as a threshold for other drives. The drives used for obtaining the average threshold described above may have an identical or similar design. Further, the average threshold can be used for those drives as a threshold. In addition, an obtained average threshold can be used as a general threshold for drives having an identical or similar design to be manufactured. Also, multiple drives having variations each other are meaningfully prepared, and then an average of thresholds obtained for the drives may be used as the average threshold.

Initial Setting of Recording Device

In a storing step S114, the reference condition and reference threshold obtained in the steps S110 and S112 of FIG. 3 respectively are stored in a recording area 1115 of the drive 100. This step S114 is preferably conducted upon manufacturing of the derive 100.

Load of Medium for Recording

Subsequently, a step S116 is conducted to load a medium 50, onto which information is to be recorded, into the drive 100 wherein the initial setting is completed in the step S114.

Recording/Reproduction Using Reference Condition

Next, a step S118 is conducted to record information onto the medium 500 loaded in the step S116 under the condition set in the step S114. Specifically, three jitter values are obtained by recording/reproducing the medium with one pulse width defined as the reference condition and at three different power values. By plotting those three jitter values against the power, the tendency of the recording characteristic corresponding to the combination of the drive 100 and the medium 500 becomes apparent.

Detection of Recording Quality

Figure 8:
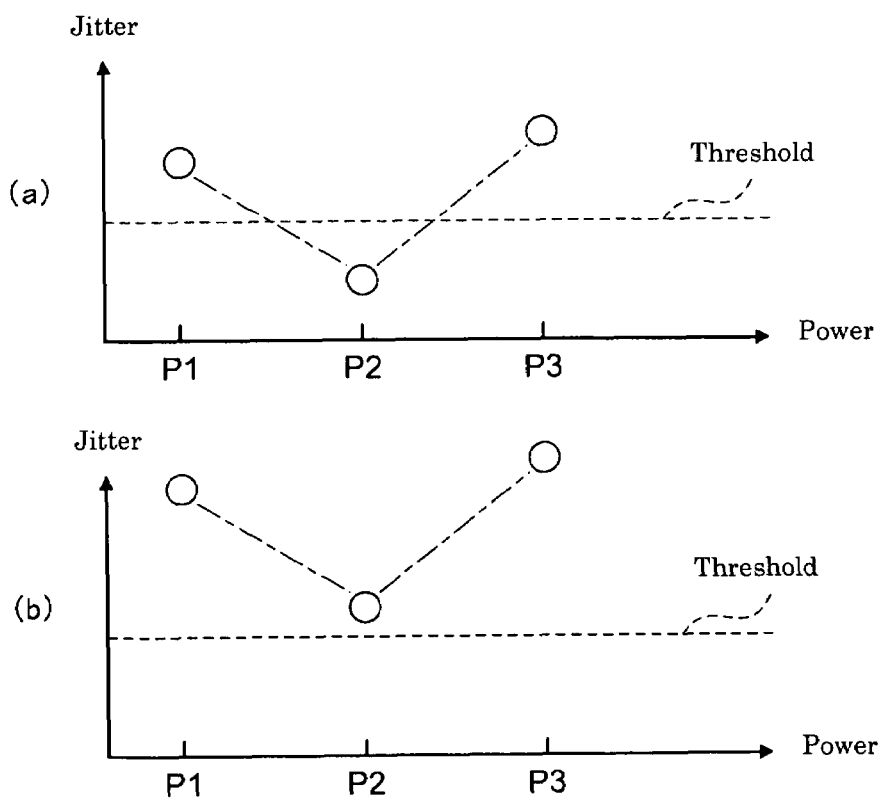
FIG. 8 is a schematic diagram showing an example wherein a concave pattern is obtained as a result of examining recording quality in the step S120 of FIG. 3.

FIG. 8 is a schematic diagram showing an example wherein a concave pattern is obtained as a result of examining recording quality in the step S120 of FIG. 3. As shown in FIG. 8, the examination of the recording quality is conducted using jitter values and thresholds for each of the reference conditions obtained in the above-described steps. The figure exemplifies a case wherein power values P1, P2, and P3 are used respectively as the reference conditions, and a virtual line connecting the jitter values obtained at each power value forms a concave pattern. Such a concave pattern means that the reference medium used in the step S110 and the medium for recording loaded in the step S116 have the same sensitivity and similar recording qualities.

FIG. 8($a$) shows an example wherein the minimum value of the concave pattern is equal to or less than the threshold, and FIG. 8($b$) an example wherein the minimum value of the concave pattern is more than the threshold. In either pattern, the reference medium and the medium for recording are considered to have the same sensitivity. In such a case where the reference medium and the medium for recording have the same sensitivity, as described below, a condition used for test recording is defined in a plane region of (power)×(pulse width) centered on the reference condition.

In comparison between FIGS. 8($a$) and 8($b$), the difference between the reproduction value and the reproduction reference value obtained at each of the recording points P1, P2, P3, i.e., the difference between the jitter value and the jitter threshold is varied, and the obtained reproduction value in FIG. 8($a$) is closer to the reproduction reference value than that in FIG. 8($b$).

This suggests that the detection of the optimum condition is easier in the case of FIG. 8($a$) than in the case of FIG. 8($b$). Accordingly, when the recording characteristic shown in FIG. 8($a$) is obtained, compared to the case of FIG. 8($b$), a smaller number of testings can be defined, and the configuration allows more suitable solution to be found with a smaller number of testings.

That is, an optimum condition is closer to the reference value when the difference between the reproduction value and the reproduction reference value is smaller, whereas an optimum condition is further from the reference value when the difference between the reproduction value and the reproduction reference value is larger. Thus, when a smaller number of testings is desired, it is preferable to change the number of testings depending on the difference between the reproduction value and the reproduction reference value.

FIG. 9 is a schematic diagram showing an example wherein a downward-sloping pattern is obtained as a result of examining recording quality in the step S120 in FIG. 3. In the example shown in FIG. 9, a downward-sloping pattern wherein the jitter value decreases as the power increases from P1 to P3 is obtained. Such a downward-sloping pattern means that the medium for recording has lower sensitivity than the reference medium.

FIG. 9($a$) shows an example wherein the minimum value of the downward-sloping pattern is equal to or less than the threshold, and FIG. 9($b$) an example wherein the minimum value of the downward-sloping pattern is more than the threshold. In either pattern, the medium for recording is considered to have lower sensitivity than the reference medium. In such a case where the medium for recording has lower sensitivity than the reference medium, as described below, test recording is conducted under the condition of shifting the test area, which is defined by a plane region of (power)×(pulse width) centered on a reference condition, in the direction of a region with higher power and wider pulse width.

Also, when a downward-sloping pattern in FIG. 9 is obtained, recording at a power higher than P3 enables to reconfirm the recording characteristic since the minimum jitter value is considered to be present on the higher-power side. In such a case, although the number of testings is increased by 1, accuracy in examining the recording quality can be improved. In addition, in the case that a downward-sloping pattern is obtained, just as in the case of concave pattern, the number of testings may be changed depending on the difference between the reproduction value and the reproduction reference value.

Further, when a downward-sloping pattern in FIG. 9 is obtained, an optimum solution is considered to be further from the reference condition than in the case of concave pattern in FIG. 8. Consequently, it is preferable to define a larger number of testings in the case of FIG. 9 compared to the concave pattern.

FIG. 10 is a schematic diagram showing an example wherein an upward-sloping pattern is obtained as a result of examining recording quality in the step S120 in FIG. 3. In the example in FIG. 10, an upward-sloping pattern wherein the jitter value increases as the power increases from P1 to P3 is obtained. Such an upward-sloping pattern means that the medium for recording has higher sensitivity than the reference medium.

FIG. 10(a) shows an example wherein the minimum value of the upward-sloping pattern is equal to or less than the threshold, and FIG. 10(b) an example wherein the minimum value of the upward-sloping pattern is more than the threshold. In either pattern, the medium for recording is considered to have higher sensitivity than the reference medium. In such a case where the medium for recording has higher sensitivity than the reference medium, as described below, test recording is conducted under the condition of shifting the test area, which is defined by a plane region of (power)×(pulse width) centered on a reference condition, in the direction of a region with lower power and narrower pulse width.

Also, when an upward-sloping pattern as shown in FIG. 10 is obtained, since the minimum jitter value is considered to be present on the lower-power side, the recording characteristic can be reconfirmed by recording at a power lower than P1. In such a case, although the number of testings is increased by 1, accuracy in examining the recording quality can be improved. In addition, in the case that a downward-sloping pattern is obtained, just as in the case of concave pattern, the number of testings may be changed depending on the difference between the reproduction value and the reproduction reference value.

Further, when an upward-sloping pattern as shown in FIG. 10 is obtained, an optimum solution is considered to be further from the reference condition than the case of concave pattern shown in FIG. 8. Consequently, it is preferable to define a larger number of testings in the case of FIG. 10 compared to the concave pattern.

Determination of Test Area

Figure 11:
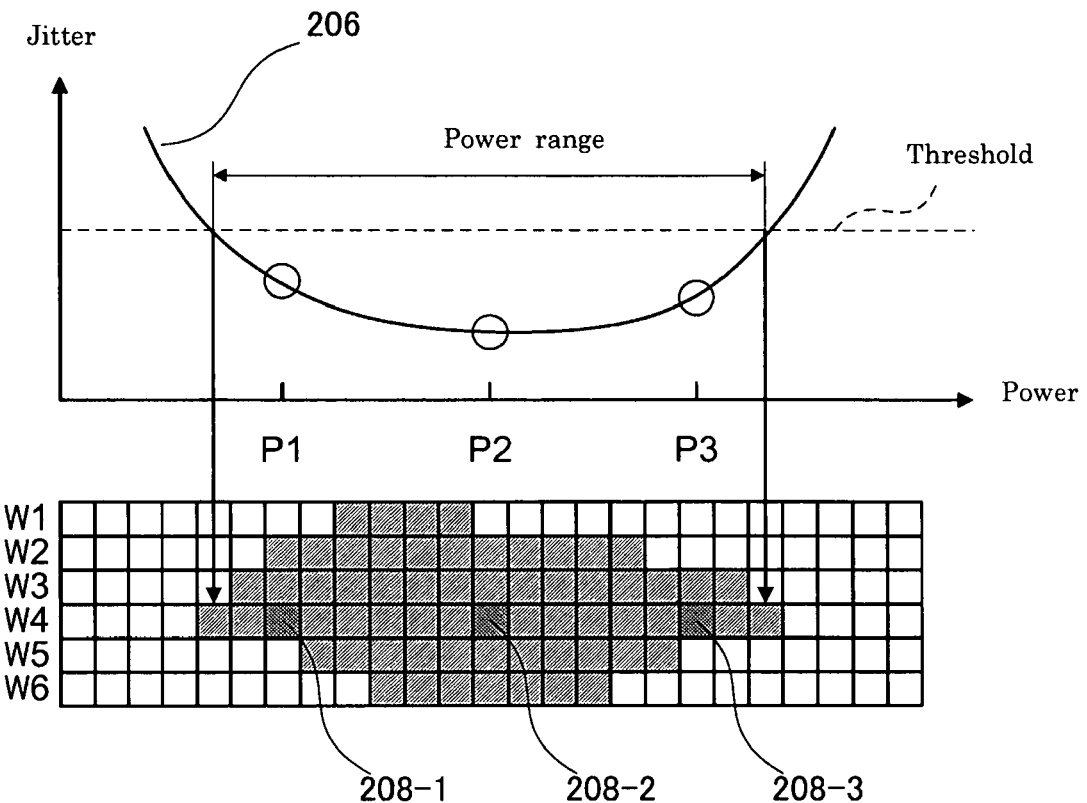
FIG. 11 is a schematic diagram showing an example of determining a test area as conducted in the step S122 for the case wherein a concave pattern is obtained in the step S120 in FIG. 3.

FIG. 11 is a schematic diagram showing an example of determining a test area as conducted in the step S122 for the case wherein a concave pattern is obtained in the step S120 in FIG. 3. As shown in FIG. 11, when a concave pattern is obtained, the power range between two intersections of an approximated curve 206, which represents jitter values obtained at P1 to P3 respectively, and a threshold is defined as a range of changing power used for test recording. Note that, in the present invention, a range of power used for actual test recording is defined as a "power range," and a range of power with which the jitter value becomes equal to or less than threshold is defined as a "power margin."

Since the approximated curve 206 varies for each pulse width, recording is conducted for each pulse width at power values of P1 to P3, and the intersections of the resulting approximated curve 206 for jitter values with the threshold are obtained. For instance, if the pulse width used as the reference condition is W4, recording is conducted for each of the pulse widths W1 to W6 centered on W4 to find the intersections. As shown in the matrix image of the figure, the power range that is equal to or less than the threshold is obtained for each of the pulse widths, resulting in the test area indicated by the hatched area of the image. In the image, 208-1, 208-2, and 208-3 show the cases wherein the recording is conducted respectively at three power values of P1 to P3, which are used as the reference conditions, for the pulse width W4. The determined test area is defined as a plane region of (power)×(pulse width) centered on the reference condition.

As described, since the area where the jitter value is equal to or less than the threshold is intensively tested to enable to find the power range for each of the pulse widths, more suitable condition can be found with a smaller number of testings.

Also, the number of testings can be reduced by setting larger steps for power variation when a wider power margin is obtained, or by setting smaller steps for power variation when a narrower power margin is obtained. For instance, when a margin of 10 mW is obtained, testings with 2 mW step may be run five times assuming that the optimum value can be obtained even by rough testings, and when a margin of 1 mW is obtained, testings with 1 mW step may be run ten times considering that more precise testings are required.

Figure 12:
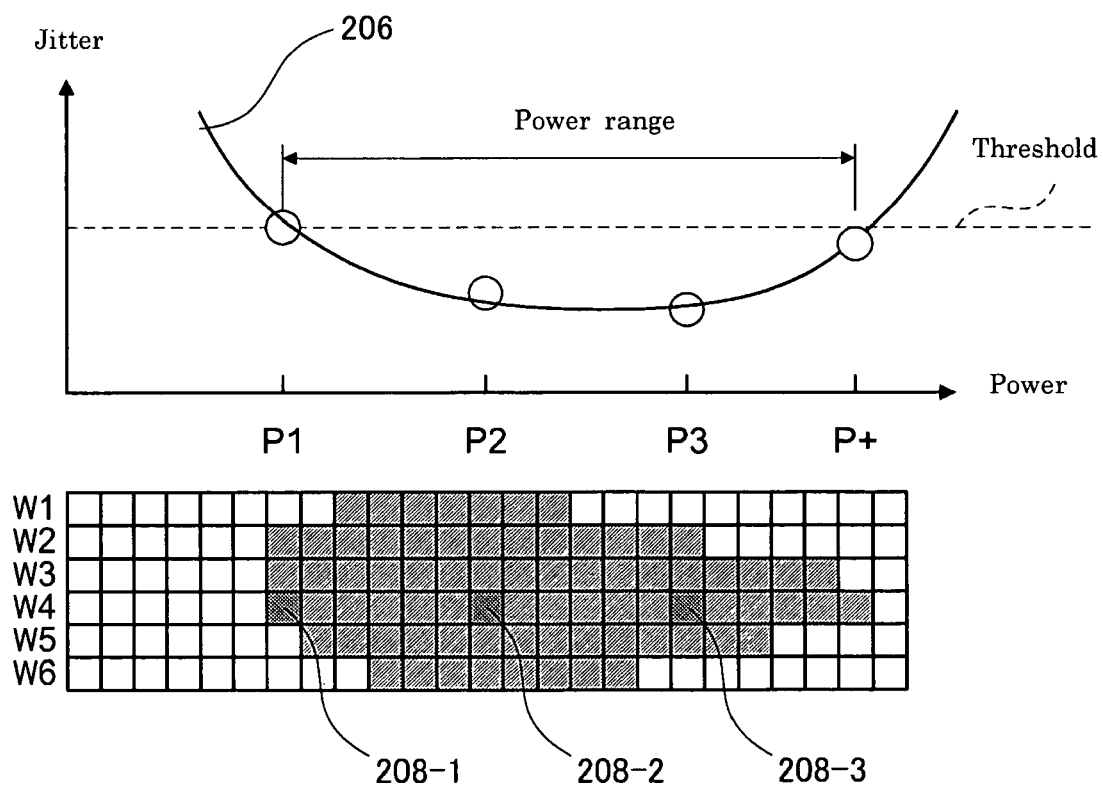
FIG. 12 is a schematic diagram showing an example of determining a test area as conducted in the step S122 for the case wherein a downward-sloping pattern is obtained in the step S120 in FIG. 3.

FIG. 12 is a schematic diagram showing an example of determining a test area as conducted in the step S122 for the case wherein a downward-sloping pattern is obtained in the step S120 in FIG. 3. As shown in FIG. 12, when a downward-sloping pattern is obtained, the optimum condition is considered to be present on a higher-power side. Accordingly, additional recording is conducted with a power value of P+ (>P3), and a range between two intersections of an approximated curve 206, which represents jitter values obtained at P1 to P3 and P+ respectively, with threshold is defined as a power range. By conducting this procedure for each pulse width W1 to W6, the test area shown by the matrix image of the figure is obtained.

The test area determined by the above-described procedure is just as a plane region of (power)×(pulse width) centered on a reference condition 208-1, 208-2, and 208-3 shifted to the higher-power side. The pulse widths W1 to W6 used in the case of the concave pattern are also used in this example, but since the medium for recording tends to have lower sensitivity in the downward-sloping pattern, a power range may be shifted to a region with a wider pulse width.

FIG. 13 is a schematic diagram showing an example of determining a test area as conducted in the step S122 for the case wherein an upward-sloping pattern is obtained at the step S120 in FIG. 3. As shown in FIG. 12, when an upward-sloping pattern is obtained, the optimum condition is considered to be present on a lower-power side. Accordingly, additional recording is conducted with a power value of P+ (<P1), and a range between two intersections of an approximated curve 206, which represents jitter values obtained at P+ and P1 to P3 respectively, with a threshold is defined as a power range. By conducting this procedure for each pulse width W1 to W6, the test area shown by the matrix image of the figure is obtained.

The test area determined by the above-described procedure is just as a plane region of (power)×(pulse width) centered on a reference condition 208-1, 208-2, and 208-3 shifted to the lower-power side. The pulse widths W1 to W6 used in the case of the concave pattern are also used in this example, but since the medium for recording tends to have higher sensitivity in the upward-sloping pattern, the power range may be shifted to a region with a narrower pulse width.

Since the above-described method involves examining recording quality for each pulse width and determining the number of testings for each pulse width based on the examination result, reduction in the number of testings can be expected. The examination of recording quality described hereinabove is an example wherein the jitter variation during recording under the reference condition is patterned, and more preferably, it is recommended that the following eight patterns be used.

FIG. 14 is a diagram showing an example wherein the step S120 in FIG. 3 is conducted with eight patterns. As shown in FIG. 14, a pattern 1 is applied to any patterns including the concave, upward-sloping, and downward-sloping patterns when the maximum jitter value is equal to or less than the threshold. When this pattern is obtained, the medium for recording is considered to have comparable sensitivity to the reference medium as well as a wider margin in which jitter values are equal to or less than the threshold can be obtained, and therefore the power condition is extended to both lower- and higher-power sides. In other words, additional recording is conducted on both lower- and higher-power sides in the pattern 1 because values approximate to the threshold are not obtained.

Subsequently, a curve approximation is conducted to the jitter characteristics obtained as a result of the above-described additional recording, and the interval between the large and small values at which the approximated curve intersects with the jitter threshold is set as a reference power range.

Further, when the pattern 1 is obtained, the pulse width area with a reference value ±0.2T is defined as a test area, and upon test recording, the optimum recording condition is detected while varying the pulse width within the test area by 0.2T at one time. In addition, T represents a unit time of a recording pit.

Assuming that a pulse width to be a reference value is a pulse condition 1 and the two extended points are pulse conditions 2 and 3 respectively, the pulse conditions 2 and 3 of the pattern 1 are the pulse widths obtained by extending the pulse condition 1 by ±0.2T. Along with this variation in the pulse width condition, the power range used as a test condition should be slightly modified.

That is, when the pulse width is varied by 0.1T, the power range for the pulse width is set as (the reference power range)×(1−0.05×1) mW, and when the pulse width is varied by 0.2T, the power range for the pulse width is set as (the reference power range)×(1−0.05×2) mW. Further, when the pulse width is varied by −0.1T, the power range for the pulse width is set as (the reference power range)×(1−0.05×(−1)) mW.

Accordingly, the test conditions for the case of the pattern 1 are comprised of the following three sets.
(1) A reference pulse width and a reference power range
(2) A reference pulse width−0.2T and (a reference power range)×(1−0.05×(−2)) mW
(3) A reference pulse width+0.2T and (a reference power range)×(1−0.05×(+2)) mW In the present invention, the reference condition provided in the above (1) is not necessarily used for the actual test recording.

A pattern 2 is the case in which a concave pattern is obtained, and is applied when the minimum jitter value is equal to or less than the threshold. When this pattern is obtained, the medium for recording is considered to have the same sensitivity as the reference medium, and (a reference value ±0.1T) is selected as a pulse width condition. Subsequently, a power range is defined for each pulse condition by the same procedure as in the pattern 1 case. Consequently, the test conditions for the case of the pattern 2 are comprised of the following three sets.
(1) A reference pulse width and a reference power range
(2) A reference pulse width−0.1T and (a reference power range)×(1−0.05×(−1)) mW
(3) A reference pulse width+0.1T and (a reference power range)×(1−0.05×(+1)) mW A pattern 3 is the case in which a concave pattern is obtained, and is applied when the minimum jitter value is more than the threshold. When this pattern is obtained, the medium for recording is considered to have the same sensitivity as the reference medium and large difference each other, and (a reference value ±0.2T) is selected as a pulse width condition, followed by defining a power range for each pulse condition by the same procedure as in the case of pattern 1. Consequently, the test conditions for the case of pattern 3 are comprised of the following three sets.
(1) A reference pulse width and a reference power range
(2) A reference pulse width−0.2T and (a reference power range)×(1−0.05×(−2)) mW
(3) A reference pulse width+0.2T and (a reference power range)×(1−0.05×(+2)) mW A pattern 4 is the case in which a downward-sloping pattern is obtained, and is applied when the minimum jitter value is equal to or less than the threshold. When this pattern is obtained, the medium for recording is considered to have slightly lower sensitivity than the reference medium, and three pulse width conditions: a reference value, +0.1T, and +0.2T, are selected. Subsequently, a power range for each pulse condition is defined by the same procedure as in the case of pattern 1. Consequently, the test conditions for the case of pattern 4 are comprised of the following three sets.
(1) A reference pulse width and a reference power range
(2) A reference pulse width+0.1T and (a reference power range)×(1−0.05×(+1)) mW
(3) A reference pulse width+0.2T and (a reference power range)×(1−0.05×(+2)) mW A pattern 5 is the case in which a downward-sloping pattern is obtained, and it is applied when the minimum jitter value is more than the threshold. When this pattern is obtained, the medium for recording is considered to have significantly lower sensitivity than the reference medium, and three pulse width conditions: a reference value, +0.2T, and +0.4T, are selected. Subsequently, a power range for each pulse condition is defined by the same procedure as in the case pattern 1. Consequently, the test conditions for the case of pattern 5 are comprised of the following three sets.
(1) A reference pulse width and a reference power range
(2) A reference pulse width+0.2T and (a reference power range)×(1−0.05×(+2)) mW
(3) A reference pulse width+0.4T and (a reference power range)×(1−0.05×(+4)) mW A pattern 6 is the case in which an upward-sloping pattern is obtained, and is applied when the minimum jitter value is equal to or less than the threshold. When this pattern is obtained, the medium for recording is considered to have slightly higher sensitivity than the reference medium, and three pulse width conditions: a reference value, −0.1T, and −0.2T, are selected. Subsequently, a power range for each pulse condition is defined by the same procedure as in the case of pattern 1. Consequently, the test conditions for the case of pattern 6 are comprised of the following three sets.

(1) A reference pulse width and a reference power range
(2) A reference pulse width−0.1T and (a reference power range)×(1−0.05×(−1)) mW
(3) A reference pulse width−0.2T and (a reference power range)×(1−0.05×(−2)) mW A pattern 7 is the case in which an upward-sloping pattern is obtained, and is applied when the minimum jitter value is more than the threshold. When this pattern is obtained, the medium for recording is considered to have significantly higher sensitivity than the reference medium, and three pulse width conditions: a reference value, −0.2T, and −0.4T, are selected. Subsequently, a power range for each pulse condition is defined by the same procedure as in the case of pattern 1. Consequently, the test conditions for the case of pattern 7 are comprised of the following three sets.
(1) A reference pulse width and a reference power range
(2) A reference pulse width−0.2T and (a reference power range)×(1−0.05×(−2)) mW
(3) A reference pulse width−0.4T and (a reference power range)×(1−0.05×(−4)) mW A pattern 8 is the case in which a convex pattern is obtained, and is applied when the minimum jitter is more than the threshold. When this pattern is obtained, it is considered as error pattern and (a reference value ±0.2T) is selected as a pulse width condition. Subsequently, a power range for each pulse condition is defined by the same procedure as in the case of pattern 1. Consequently, the test conditions for the case of pattern 8 are comprised of the following three sets.
(1) A reference pulse width and a reference power range
(2) A reference pulse width−0.2T and (a reference power range)×(1−0.05×(−2)) mW
(3) A reference pulse width+0.2T and (a reference power range)×(1−0.05×(+2)) mW In addition, when any pattern other than the pattern 2 that is closest to the reference medium is detected among the above-described 8 patterns, the jitter may be further detected by again reproducing the recording result, from which the pattern is obtained, in order to confirm that the pattern is not due to a reproduction error. When a characteristic other than the pattern 2 is again obtained by the additional reproduction, the recording condition may be added or extended according to the conditions shown in FIG. 14.

When the pattern 8 is obtained as a result of checking the reproduction error as described above, recording is conducted again with the reference pulse width before conducting additional recording and pulse width extension since a recording error may exist. When the pattern 8 is again obtained as a result of reproducing the recording, an extension of pulse condition, i.e., the extension of the pulse conditions 2 and 3 is conducted instead of conducting an additional recording, i.e., a power extension to measure the margin for the pulse condition 1. A power extension corresponding to the extension of the pulse conditions 2 and 3 can be conducted by the aforementioned procedure.

That is, when pattern 8 is obtained, a reference power range of extension cannot be determined since a margin cannot be ensured with the pulse condition 1. Accordingly, the initial power condition range is set as a reference power range.

Determination of Test Area: Determination of Power Range by Approximation Method Further to the above-described procedure that enables to determine the test area in which the optimum solution can be obtained by the smallest possible number of testings, the determination method of a power range, which is important for the determination of the test area, should be described below.

Since it is one object of the present invention to improve the accuracy of finding the optimum solution with the smallest possible number of testings, the test conditions are concentrated in the area equal to or less than the threshold as described above. Based on the idea, a power range used for test recording may be obtained from larger and smaller power values that indicate a margin for a threshold. The "margin for a threshold" means a range where a characteristic value equal to or less than the threshold can be obtained, and "larger and smaller power values" means two values on lower- and higher-power sides respectively that define a range of the margin.

Considering the time reduction in test recording for each type of media and the efficient use of a test area in a medium such as write-once medium having a limited test recording area, the smallest possible number of recording points is preferably required. However, since a power range obtained in this procedure is an important parameter to be a criterion of the optimum recording condition, the highest possible accuracy is much more required rather than the smallest possible number of the testings.

Obtaining more accurate power range means more intensive testings in the selected area, and accordingly contributes to the reduction of the number of testings. For instance, when conducting test recording once for every 0.1 mW, the test recording is conducted 10 times for the power range of 1 mW and 20 times for the power range of 2 mW, and thus, narrowing the power range can contribute to the reduction of the number of testings.

In consideration of the recording quality of the recording/reproduction signal that shows a variation like a quadratic curve having an extremal value as an optimum point against the variation in recording power, the present invention proposes a method in which a desired margin amount is obtained by approximating a characteristic curve using several recording points. Such approximating method enables a power range to be obtained precisely and easily using several recording points and the number of testings to be reduced.

Figure 15:
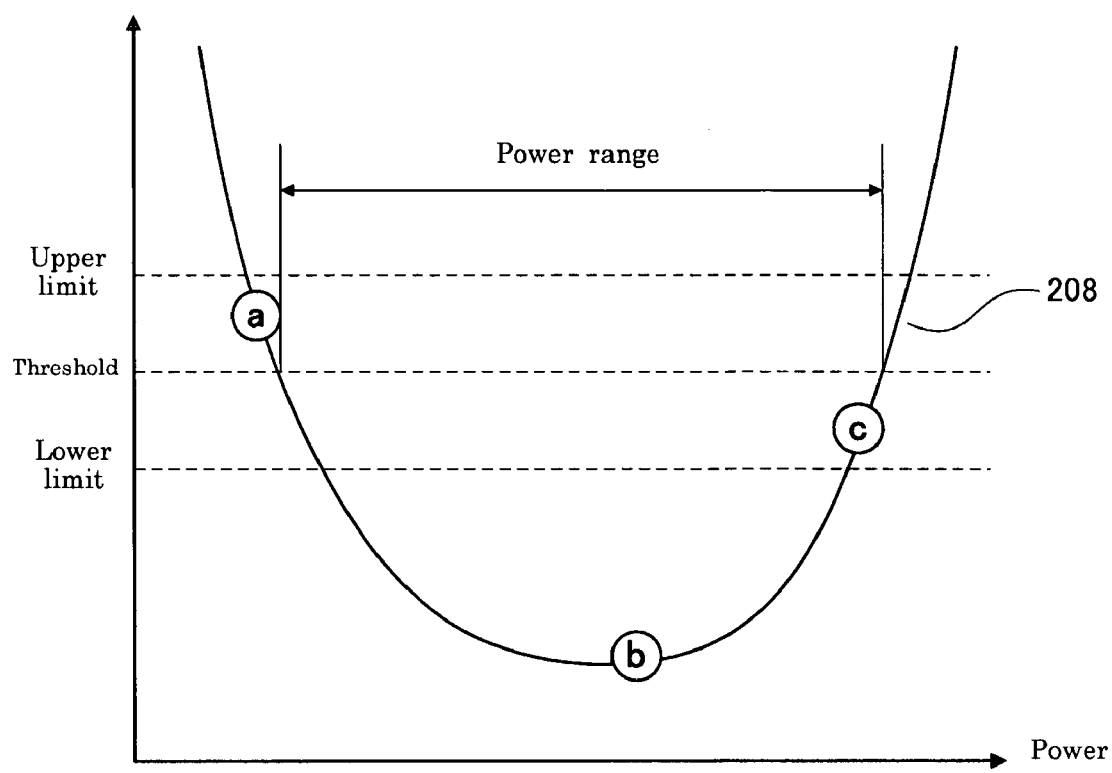
FIG. 15 is a schematic diagram showing a method of obtaining the power range used for the step S122 in FIG. 3 by curve approximation.

FIG. 15 is a schematic diagram showing a method of obtaining the power range used for the step S122 in FIG. 3 by curve approximation. As shown in FIG. 15, an approximation is conducted by first selecting points a, b, and c, wherein the points a and c are on a lower- and higher-power sides respectively, at which the jitter values criterial for recording characteristic are in a vicinity of a threshold, and the point b is located between the points a and b, at which the jitter value is smaller than that at the point a, point b, or the threshold. Accordingly, the relation between the points a, b, and c is expressed as below.

$$a>b, c>b, \text{ and threshold}>b$$

As shown in FIG. 15, the "vicinity of a threshold" is defined as a range between upper and lower limits that are away from the threshold by certain amount. Preferably, the upper limit value is set to 40% more than the threshold, and the lower value to 5% less than the threshold. Subsequently, the values at the points a, b, and c are approximated with a quadratic function, and the difference between larger and smaller points, at which the quadratic function and the threshold intersects, is defined as a power range. In addition, a range defined as the vicinity of a threshold can be modified accordingly in consideration of the interval between recording points, such as −5% to +40% or −10% to +30%.

Figure 16:
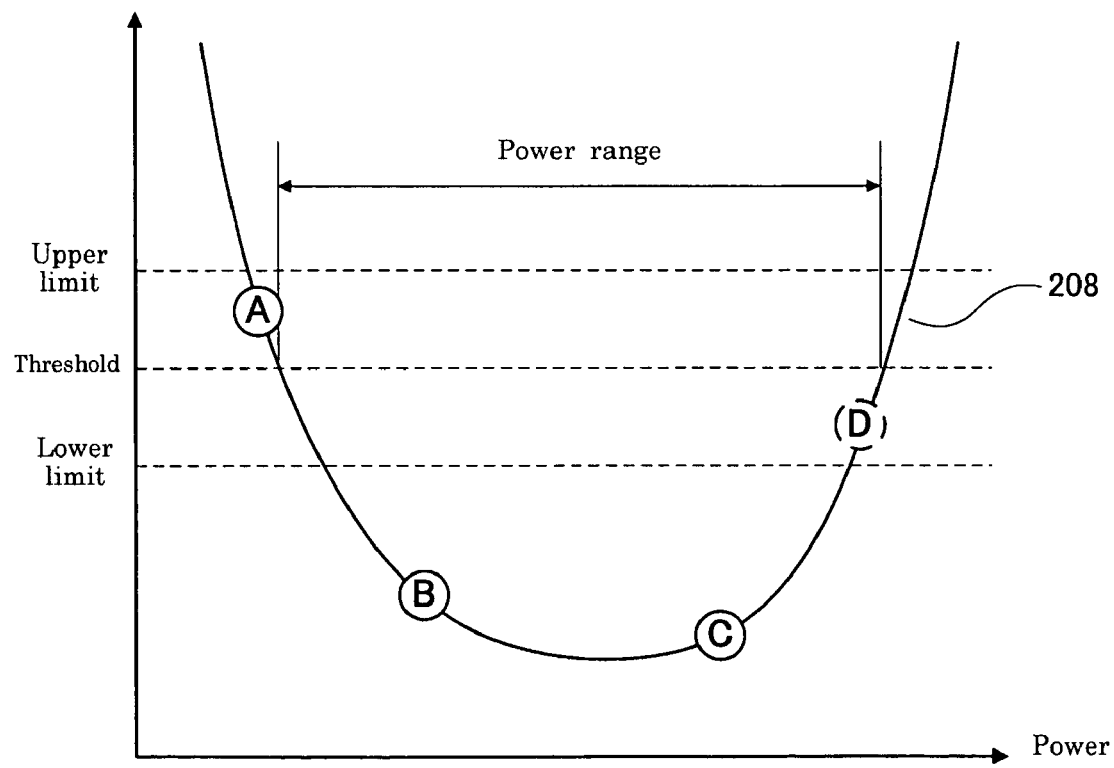
FIG. 16 is a schematic diagram showing another example of the method for obtaining a power range used for step S122 in FIG. 3 by curve approximation.

FIG. 16 is a schematic diagram showing another example of a method for obtaining a power range used for step S122 in FIG. 3 by curve approximation. As shown in FIG. 16, when only the conditions of A, B, and C are not sufficient to satisfy the above-described relationship of "a>b, c>b, and threshold >b," it is preferable to obtain another value in the vicinity of a threshold by adding a point D on the higher-power side.

Further, when a relationship of B>C exists as shown in the figure, it is preferable to obtain an approximation expression with the three points A, C, and D without the use of B.

Since the relationship between the three recording points and the threshold is "A>C, D>C, and threshold >C" that is suitable for drawing an approximation curve, a highly accurate approximated curve can be obtained by using the three points. In addition, the additional recording condition for the point D may be determined according to the relationship of the recording points A, B, and C prior to the additional recording, i.e., A>B and B>C, and a threshold.

Also, contrary to FIG. 16, recording can be conducted under a power condition lower than at the point A when a value in the vicinity of a threshold does not exist on a lower-power side. Depending on the relation between recording points and a threshold, one or more recording condition may be added.

In addition, a power range used for an additional recording condition may have a constant variation to a predetermined power step, or a power condition may be set after preliminary obtaining the relation between a jitter variation and a power variation.

In case that appropriate recording points for finding a power range are not obtained even by adding a recording condition as described above, recording points may be changed by further adding a recording condition with the aforementioned procedure.

In case of a medium with a limited test recording area such as a write-once medium, or in case of avoiding a significant amount of testing time, the number of the above-described additional recording conditions may have an upper limit. Also, a recording power may have an upper limit in order to prevent the recording power from exceeding a specified maximum laser output due to the additional recording conditions.

Further, a power range is obtained by the three-point approximation in the above-described example, but it may also be determined in such a way that two points closest to a threshold are first selected, and then the difference between the two power values corresponding respectively to those two points are obtained.

Another method of selecting two points in the vicinity of a threshold may be configured wherein recording is repeated with power variations until larger and smaller points that are respectively located on higher and lower sides of the threshold are obtained, and two points that are closest to the threshold among all the recorded points or two points that are located on either side of the threshold are selected. The detail of the method is described below.

Determination of Test Area: Determination of Power Range by Sampling

Figure 17:
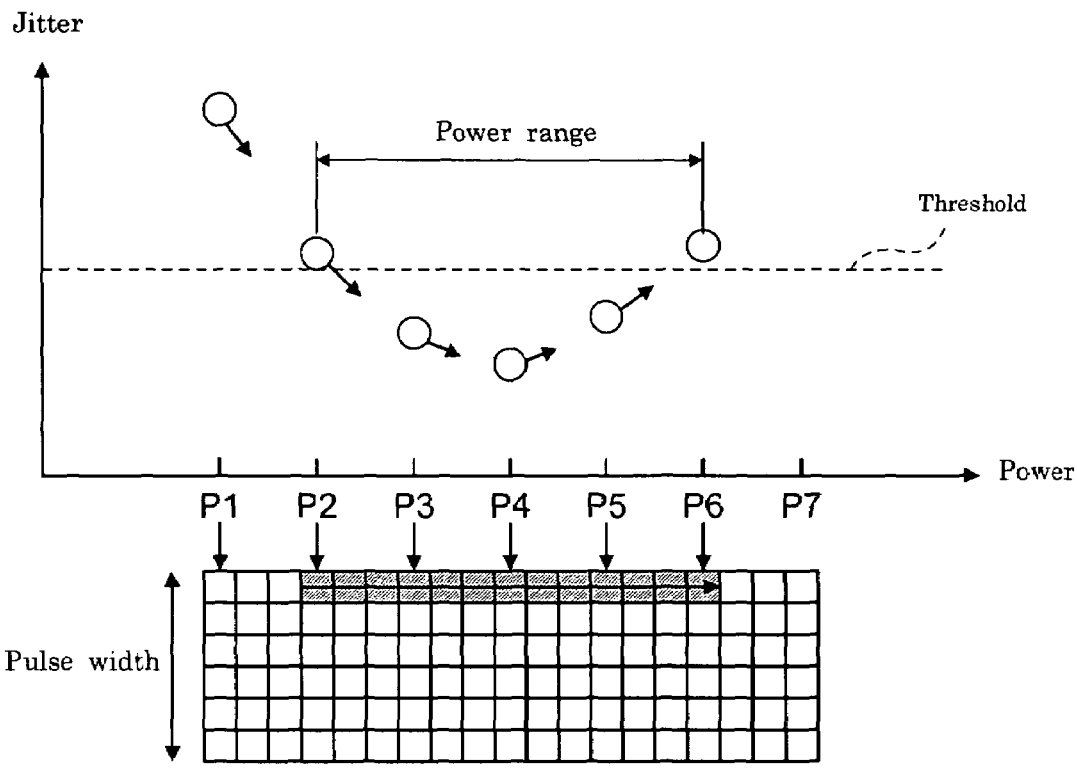
FIG. 17 is a schematic diagram showing an example of obtaining a power range used for the step S122 in FIG. 3 by sampling.

FIG. 17 is a schematic diagram showing an example of obtaining a power range used for the step S122 in FIG. 3 by sampling. As shown in FIG. 17, instead of approximating the three points as described above, a power range is obtained on the basis of larger and smaller power values that are close to a threshold and obtained by gradually varying a power.

Specifically, as shown in FIG. 7, recording/reproduction is repeated while varying the recording power from P1 to P2, P3, . . . up to power P6 at which a value more than the threshold is obtained. A matrix image of this step shows that the power is varied from P1 to P6, but the power range is between P2 on the lower-power side and P6 on the higher-power side that are both closest to the threshold. In this way, a power range may be determined by selecting two points respectively located on either side of a threshold.

A method of selecting the two points, higher and lower, closest to a threshold involves selecting and using one of the followings as appropriate.

1) A method of selecting higher and lower points that define a power margin, that is, selecting two points that are in a power area, wherein a reproduction reference value is satisfied, and both closest to a reproduction reference value.
2) Selecting two points closest to a reproduction reference value that are slightly outside of a power margin.
3) Selecting two points that are on either side of a reproduction reference value on a lower-power side.
4) Selecting two points that are on either side of a reproduction reference value on a higher-power side.
5) Selecting two points that are on either side of a reproduction reference value on the lower- and higher-power sides respectively and which are both close to a reproduction reference value.

Also, approximating recording characteristics using two points selected by one of the above-described methods allows two points at which the approximated curve intersects with a reproduction reference value to be selected.

Determination of m'T/(n−m)T Ratio

Figure 18:
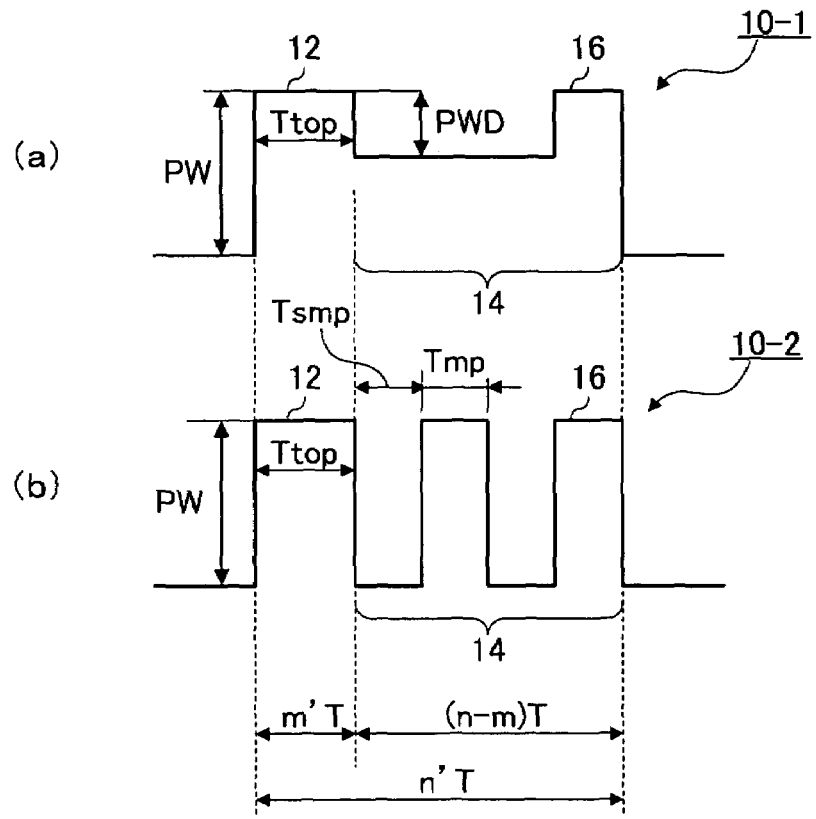
FIG. 18 is a schematic diagram showing an example of a test recording pulse that is used for the determination of a ratio in the step S200 in FIG. 1(b).

FIG. 18 is a schematic diagram showing an example of a test recording pulse that is used for the determination of a ratio in the step S200 in FIG. 1(b). FIG. 18(a) is an example of a case using a single pulse comprised of a single pulse pattern, and FIG. 18(b) a multipulse comprised of a plurality of pulse patterns. As shown in the figure, a single pulse 10-1 and multipulse 10-2 are comprised of a top pulse 12 located at the front of a recording pulse and a succeeding pulse 14 that follows the top pulse, wherein the succeeding pulse 14 has a rear-end pulse 14 at the end of the recording pulse.

An energy amount of the entire recording pulse is defined by the height of a main power PW, and an initial energy amount supplied to the initial position of a recording pit is defined by the length of a top pulse width Ttop. The main power PW preferably has the highest value in the recording pulse 10-1 or 10-2, and the top pulse width Ttop has a width that corresponds to the shortest recording pit having a length of 3T. Since the recording pit with the shortest width has the highest appearance rate and significantly affects recording quality, an optimum condition for the power PW and the pulse width Ttop of the top pulse 12 is first determined by conducting the above-described determination flow of m'T condition.

Subsequently, a determination flow of m'T/(n−m)T ratio is conducted to determine a condition of the succeeding pulse 14. As a succeeding pulse condition in the case of the single pulse 10-1, as shown FIG. 18(a), a lower-power area where the power is lower than the main power PW by PWD is defined in the lower-power area whereby a recording pit is prevented from forming a tear drop shape. Similarly, in the case of the multipulse 10-2, as shown in FIG. 18(b), defining an intermediate pulse width Tmp located between the front top pulse 12 and the rear-end pulse 14 or a duty ratio between Tmp and Tsmp prevents a recording pit from forming a tear drop shape. The determination of the succeeding pulse condition is conducted on the basis of the top pulse condition.

Figure 19:
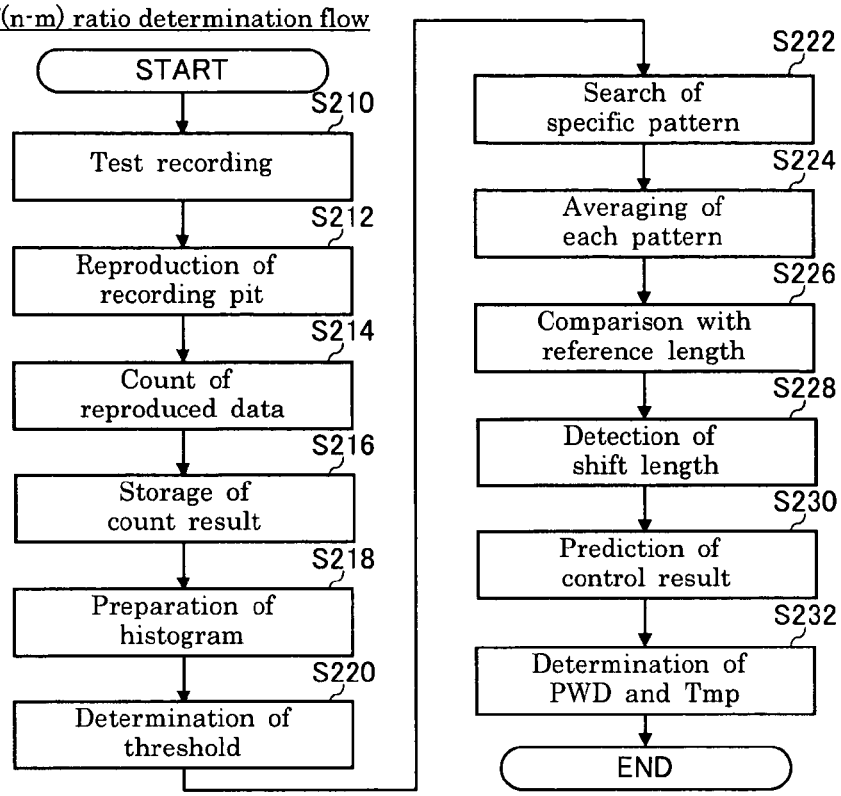
FIG. 19 is a flowchart showing a procedure of the determination flow of a ratio in the step S200 in FIG. 1(b).

FIG. 19 is a flowchart showing a procedure of the determination flow of a ratio in the step S200 in FIG. 1(b). As shown in FIG. 19, the drive shown in FIG. 2 conducts a test recording to the medium 500 with a plurality of recording patterns obtained by varying the condition of (n–m)T in order to set various parameters for a recording strategy to be implemented by the strategy circuit 1102 (step S210). In this step, an mT pulse condition is fixed to the value obtained in the above-described determination flow of m'T condition. Then, a recording pattern obtained by the test recording is reproduced (step S212), and a binarized reproduction signal obtained through a binarization circuit 1110 is counted in a recording shift detection part 1112 using a counter synchronized with a predetermined clock (step S214). Subsequently, lengths of pit and land included in the binarized reproduction signal are stored in a recording area 1115 as count data (step S216).

Then, the recording shift detection part 1112 generates a histogram showing an appearance rate of each count value using the count data stored in the recording area 1115 (step S218) and a threshold for count data that provides a criterion for a pit or land length (step S220).

Subsequently, the recording shift detection part 1112 searches various types of specific patterns including a specific pit/land pattern from the count data stored in the recording area 1115 on the basis of the threshold (step S222), and average lengths of respective pits and respective lands comprising the specific patterns are evaluated by averaging the count results for the pits, which are considered to have the same pit length included in the specific patterns, as well as by averaging the count results for the lands considered to have the same land length (step S224).

Subsequently, the recording shift detection part 1112 sets one of the extracted specific patterns to an extracted pattern, and compares the length of an intended recording pit included in the extracted pattern with a reference length (step S226) to detect a shift length of the pit relative to a recording pulse (step S228). Then, an equation derivation part 1113 derives an equation for determining an optimum strategy based on the shift length detected by the recording shift detection part 112. A strategy determination part 1114 predicts a control result of various parameters by using the equation derived by the equation derivation part 1113 (step S230), and according to the prediction, PWD or Tmp shown in FIG. 18 is determined and then set to the strategy circuit 1102 (step S232).

Figure 20:
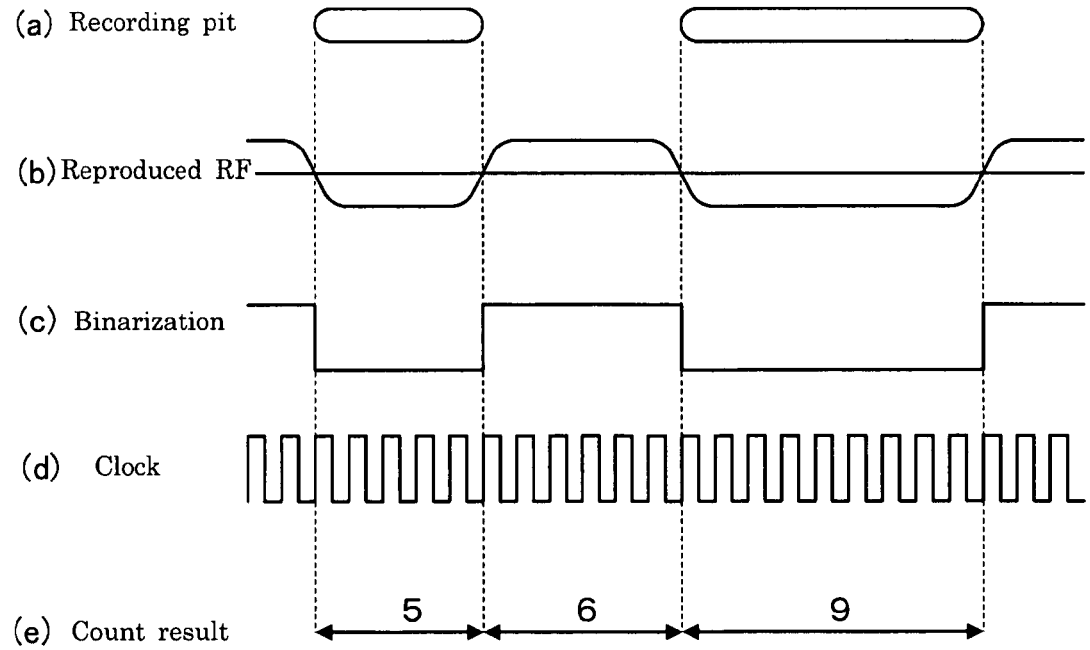
FIG. 20 is a schematic diagram showing an operation concept from the test recording step to the step of counting reproduction data shown in FIG. 19.

FIG. 20 is a schematic diagram showing an operation concept from the step of test recording to the step of counting reproduction data shown in FIG. 19. As shown in FIG. 20, a test recording forms recording pits as shown in FIG. 20(a) onto an optical disk. Then, when the recording pits are reproduced, as shown in FIG. 20(b), a reproduction RF signal corresponding to the recording pits is obtained. By binarizing the reproduction RF signal, a binarized reproduction signal shown in FIG. 20(c) is obtained, and by counting a length of each pulse having either polarity shown in the binarized signal with a clock signal as shown in the diagram (d), a count result shown in FIG. 20(e) is obtained.

FIG. 21 is a schematic diagram showing an image of storing the count results shown in FIG. 20. As shown in FIG. 21, the counting result for each pulse having either polarity obtained by counting the binarized signal using the clock signal is stored in a table provided in the storage area 1115 in time-series order. The table shown in FIG. 21 is stored along with addresses that enable later searching.

Figure 22:
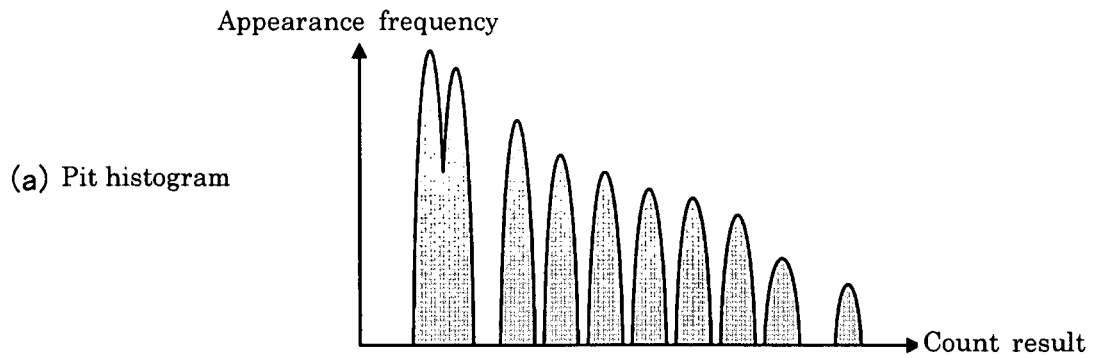
FIG. 22 is a schematic diagram showing an image of creating a histogram shown in FIG. 19.

FIG. 22 is a schematic diagram showing an image of creating a histogram shown in FIG. 19. As shown in FIG. 22, a histogram is obtained by graphing appearance rates for the respective count values, and by creating separate histograms for pits and lands respectively, two different types of histograms, that is, a pit histogram showing a count tendency of pits (FIG. 22(a)) and a land histogram showing that of lands (FIG. 22(b)) can be obtained. Thus, since each unit length nT (n=3, 4, 5, . . . 14) based on the reference clock is inevitably determined in optical disks, peaks showing the distribution of appearance rates for respective unit lengths nT are obtained.

Figure 23:
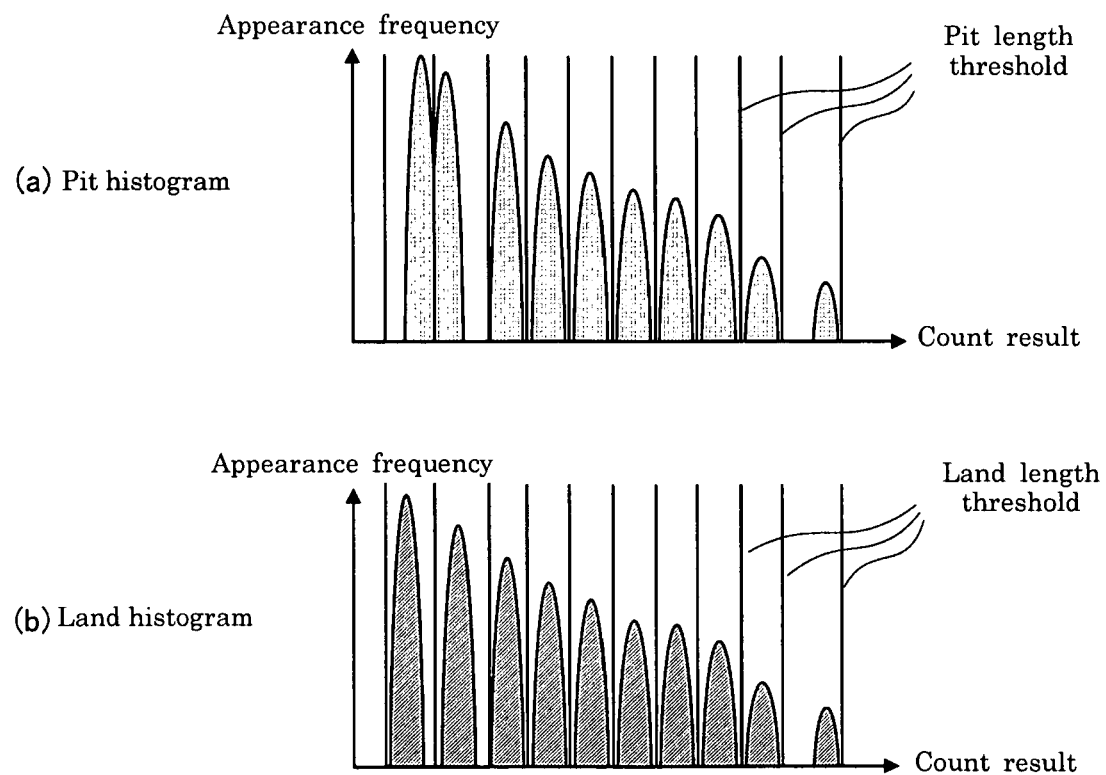
FIG. 23 is a schematic diagram showing an image of determination of a threshold shown in FIG. 19.

FIG. 23 is a schematic diagram showing an image of determination of a threshold shown in FIG. 19. As shown in FIG. 23, since each valley portion formed between two adjacent peaks in the pit histogram can be used as a criterial threshold for each of unit lengths nT, a pit length threshold that provides a criterion for each of pit lengths and a land threshold that provides a criterion for each of land lengths are defined regarding the pit histogram and land histogram respectively.

Figures 24, 25:
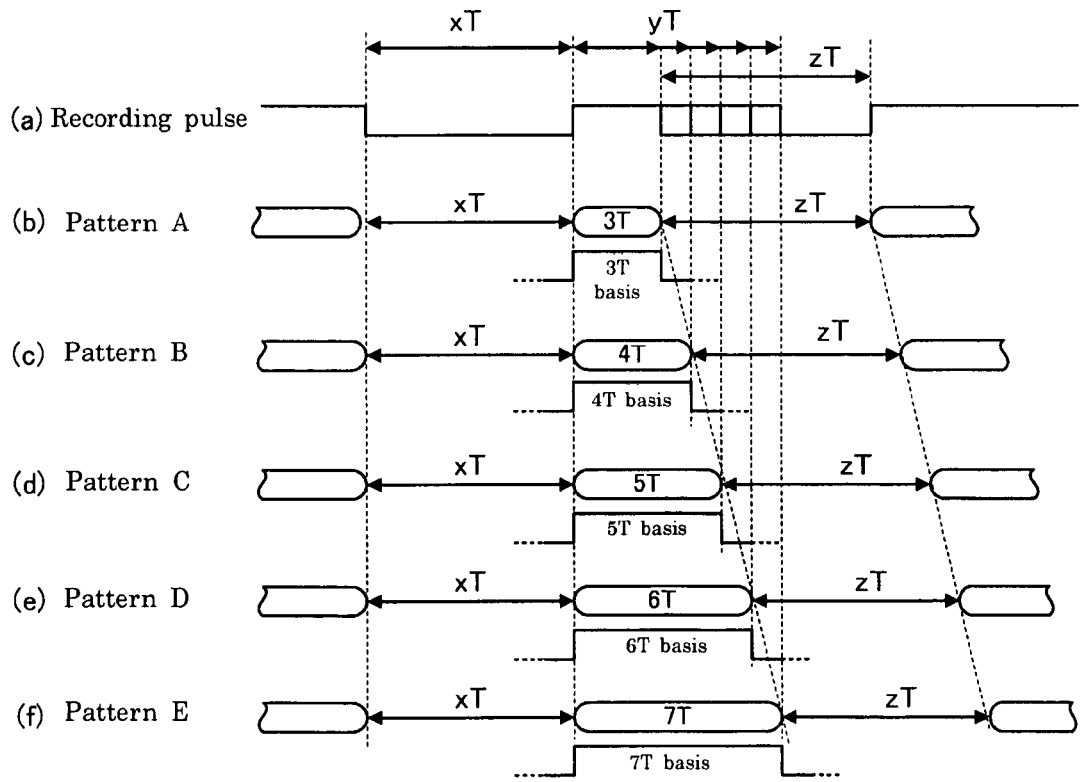
FIG. 24 is a schematic diagram showing an example of thresholds obtained by the method shown in FIG. 23.
FIG. 25 is a diagram showing an example of a recording pattern for detecting a shift length due to a pit balance.

FIG. 24 is a schematic diagram showing an example of thresholds obtained by the method shown in FIG. 23. Each pit length threshold is defined for each boundary between two adjacent pit lengths as shown in FIG. 24(a), and each land length threshold for each boundary between two adjacent land lengths as shown in FIG. 24(b). An example in FIG. 24(a) shows that a threshold provided at a boundary between 2T and 3T is "count value=2", between 3T and 4T is "count value=9" and a threshold is set up to the boundary between 14T and 15T. An example in FIG. 24(b) shows that a threshold provided at a boundary between 2T and 3T is "count value=2" and between 3T and 4T is "count value=10". Likewise, a threshold is set up to the boundary between 14T and 15T.

Next, each of the steps, from the step of searching a specific pattern (step S222) to the step of detecting a shift length (step S228), shown in FIG. 19 is described below in details. The steps are conducted in the recording shift detecting part 112, based on the principle for detecting various types of shifts.

FIG. 25 is a diagram showing an example of a recording pattern for detecting a shift length due to a pit balance, where the "pit balance" means the balance between the above-described top and succeeding pulses. As shown in FIG. 25, in order to detect a shift length due to a pit balance, a test recording should be conducted using the recording pulse shown in FIG. 25(a). The recording pulse includes a pattern comprised of a land LxT, pit PyT, and land LzT successively and is generated by, while fixing the lengths of fixed lands LyT and LzT, varying the pit length of a variable pit PyT from 3T to 7T as shown in FIGS. 25(b) to (f). Although not shown in the figure, the length of variable pit PyT is varied up to 14T.

When the length of each variable pit PyT in a recording pattern is measured, it should corresponds to the ideal pit length under the ideal recording condition.

However, if the length of the variable pit PyT is shifted from the predetermined ideal length, since the lengths of the land LxT and LzT are fixed, the shift length of each variable pit PyT, P3T, P4T, . . . or P14T, from the predetermined length corresponds to the shift length relative to each unit length 3T, 4T, . . . or 14T of the recording pulse generated with a strategy during recording.

Thus, a test recording is conducted with a certain strategy, and based on the reproduction pattern of the test recording using the recording pulse, a shift length of each pit from the reference length can be detected by comparing the recording result of the variable pit PyT with a reference length of each pit as shown in FIGS. 25(b) to (f).

FIG. 26 is a schematic diagram showing a table configuration for searching a specific pattern used for the detection of a shift length due to a pit balance. In the detection of a shift length due to a pit balance, data stored in the storage area 1115 shown in FIG. 2 is searched based on a threshold range for the land LxT, pit PyT, or land LzT defined for each specific pattern (step S222 in FIG. 19), and a data stream that satisfies the threshold range is extracted.

Subsequently, the count results for each of the land LxT, pit PyT, and land LzT are sorted and then averaged (step S224 in FIG. 19). A pattern comparison shown in FIG. 25 using the averages of the count results enables a front-side phase shift length for each pit length to be obtained.

FIG. 27 is a schematic diagram showing a specific example of a case wherein a shift length is detected by a count result comparison. As shown in FIG. 27, when detecting a shift by a comparison with an ideal reference length, a specific pattern shown in FIG. 27(a) is searched in and extracted from the data group stored in the storage area, and then a count result for the specific pattern and a count value for a reference length are compared as shown in FIGS. 27(b) and 27(c). In the example shown in the figure, a 3T pit is used as a reference length for the comparison. Thus, the count result of "9" for the specific pattern shown in FIG. 27(c) and that of "8" for the reference length shown in FIG. 27(d) are compared each other to obtain the difference, resulting in the shift length of "1" for the 3T pit.

Figure 28:
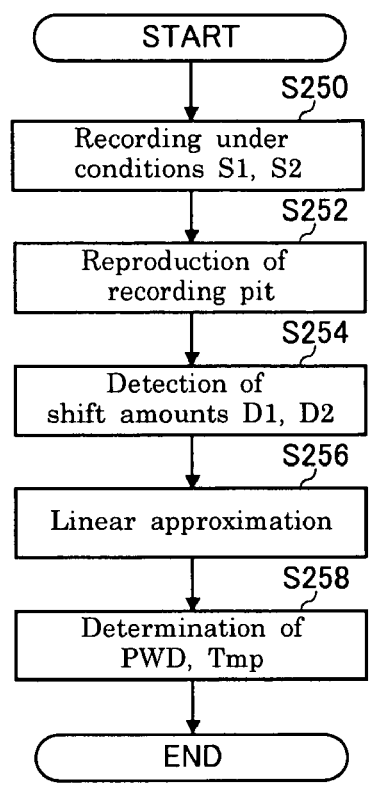
FIG. 28 is a flowchart showing an example of executing the prediction of a control amount shown in FIG. 19.

FIG. 28 is a flowchart showing an example of executing the prediction of a control amount shown in FIG. 19. As shown in FIG. 28, a control amount is predicted by conducting a procedure of a test recording under two or more types of recording conditions including S1 and S2 (step S250); reproducing the recording pits obtained by the test recording (step S252); comparing the obtained reproduction patterns in order to find a shift length D1 under the condition of S1 and a shift length D2 under the condition of S2 (step S254); then linearly approximating the relationship between (S1, D1) and (S2, D2) (step S256); and finally determining an optimum correction amount using the approximated line (step S258).

The shift lengths D1 and D2 detected as described above vary depending on various setting parameters of a strategy, and it has been clarified as a result of analysis that the shift lengths D1 and D2 vary almost linearly.

Thus, the shift lengths in the respective test recording detected in the recording shift detection part 1112 can be understood as a linear variation that is approximated based on a least-square method.

In the drive of the present invention, when the test recording is repeated twice for instance, an optimum strategy can be determined by using the linear relationship between various setting parameters of the strategy and the detected shift lengths D1 and D2. In addition, the present invention allows a curve approximation to be used instead of linear approximation.

Specifically, a typical parameter to be varied with changing the recording condition from S1 to S2 is PWD in a single pulse case or Tmp in a multipulse case. Varying the parameter with changing the recording condition from S1 to S2 enables shift lengths to be detected as D1 and D2 respectively. Then, a linear approximation is conducted with those two sets, and using the approximated line, a correction amount to cancel the shift lengths is obtained.

Figure 29:
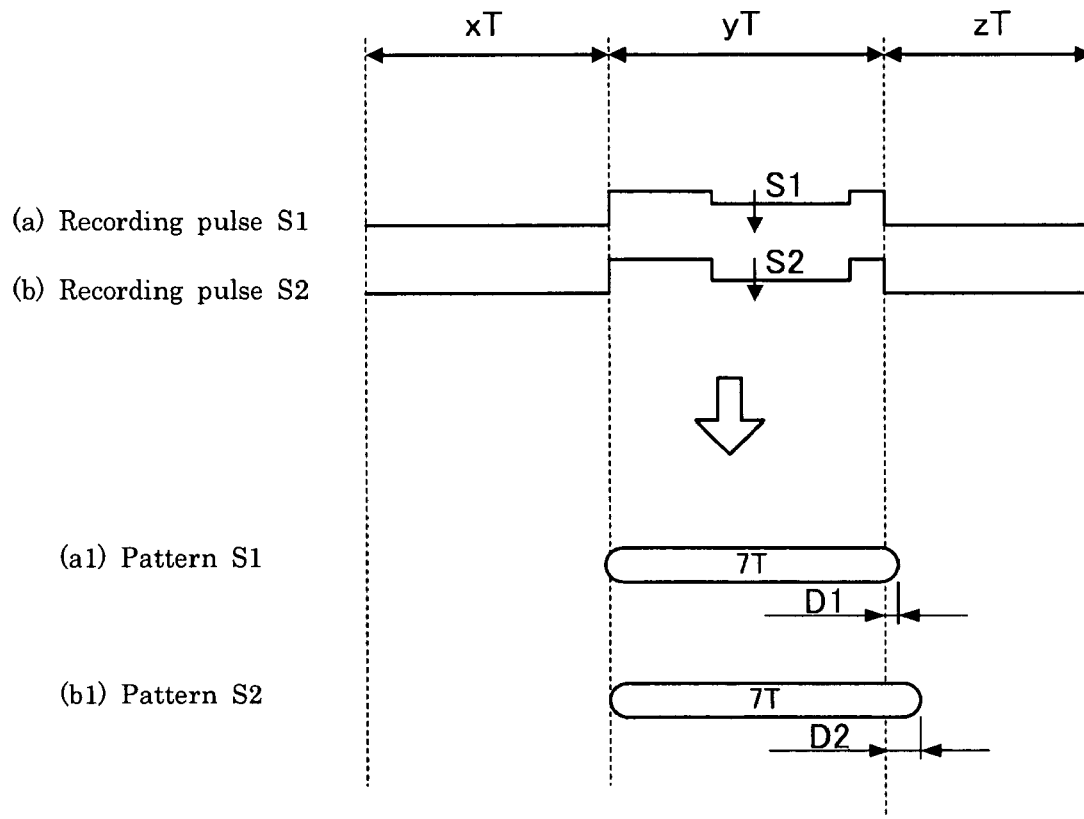
FIG. 29 is a schematic diagram showing a relation between recording conditions (S1 and S2) and shift lengths (D1 and D2) in the case of varying PWD to determine correction amount.

FIG. 29 is a schematic diagram showing a relation between recording conditions (S1 and S2) and shift lengths (D1 and D2) in the case of varying PWD to determine a correction amount. A recording pulse shown in FIG. 29(a) is a recording pulse S1 obtained by varying PWD by the amount of S1, and FIG. 29(b) is a recording pulse S2 obtained by varying PWD by the amount of S2, and the two recording pulses are used for test recording.

As a result, a pattern S1 shown in FIG. 29(a1) is obtained corresponding to a recording pulse shown in FIG. 29(a), and a pattern S2 shown in FIG. 29(b1) is obtained corresponding to a recording pulse shown in FIG. 29(b). A shift length D1 is caused in response to the control amount S1 in the pattern S1, and a shift length D2 is caused in response to the control amount S2 in the pattern S2.

When the shift lengths D1 and D2 respectively corresponding to the control amounts S1 and S2 are obtained, a shift length caused by applying a control amount to any of the parameters becomes predictable. Accordingly, a prediction of a control amount and determination of a correction value are conducted using the above relationship between a control amount applied to a parameter and a shift length caused thereby.

Figure 30:
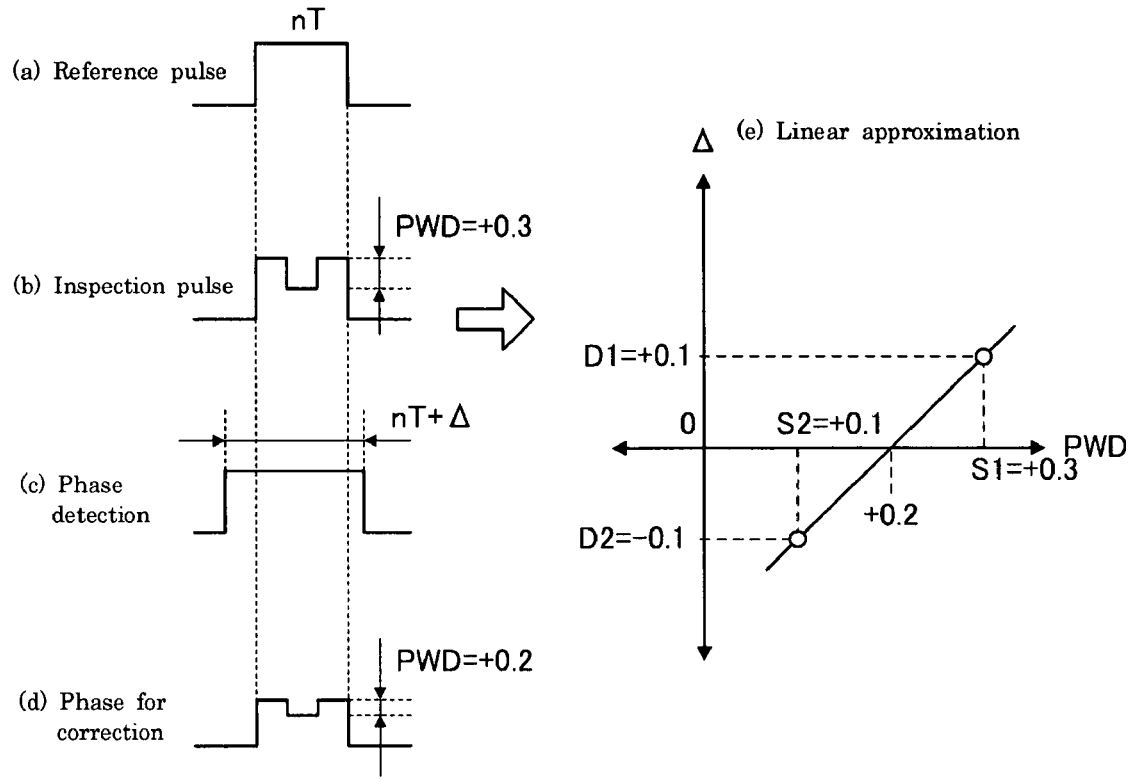
FIG. 30 is a schematic diagram showing an example of correcting a shift length using a linear approximation in the case of a single pulse.

FIG. 30 is a schematic diagram showing an example of correcting a shift length using a linear approximation in the case of a single pulse. A determination of a correction amount PWD corresponding to the shift length involves, when a reference waveform nT is adapted to have a reference pulse length (FIG. 30(a)), conducting a test recording with a waveform that lacks the center of the pulse by the amount of PWD (FIG. 30(b)) and detecting a shift length Δ of an obtained reproduction signal (FIG. 30(c)).

In the example shown in FIG. 30, varying the amount PWD from S1=+0.3 to S2=+0.1 results in respective shift lengths Δ as D1=+0.1 and D2=−0.2. Then, using the obtained (S1, D1) and (S2, D2), the relationship between the control amount PWD and the resulting shift length Δ is linearly approximated as shown in FIG. 30(e), and the approximated line is used to find the correction amount PWD=+0.2as an optimum correction amount, with which a shift length is canceled. In this procedure, a top pulse condition is fixed.

As described, a linear or curve approximation can be applied to the relationship between the variation of a strategy from S1 to S2 and the variation of a shift from D1 to D2 when at least two sets are obtained for the variations, and the approximated line (curve) enables to find an optimum correction amount with which a shift length becomes zero.

Specifically, obtaining several shift lengths D in such a way that a strategy S is varied; then several sets of the strategy S and the corresponding shift length D are substituted into a general expression of "D=a·S+b"; and finally simultaneous equations obtained by the substitution are solved enables the constants a and b in the expression to be determined, resulting in the determination of a strategy S for an ideal shift length. Applying the strategy S to the strategy circuit 1102 shown in FIG. 1 enables a recording pulse to be optimally corrected.

For instance, assuming that the recording shift detection part 1112 shown in FIG. 2 detects a shift length as D1 from a reproduction pattern of a test recording using a strategy S1 and that as D2 using the other strategy S2, the following simultaneous equations are obtained:

$$D1 = a \cdot S1 + b, \text{ and}$$

$$D2 = a \cdot S2 + b.$$

From the above equations, the constants a and b are deduced, whereby the following relationship between S and D is obtained:

$$S = (D - b)/a.$$

Substituting an output shift length D for improving recording quality, for instance, an output shift length for correcting an initial output shift length arising in an equalizer or the like, into the above relationship enables an optimum strategy S to be determined.

Figure 31:
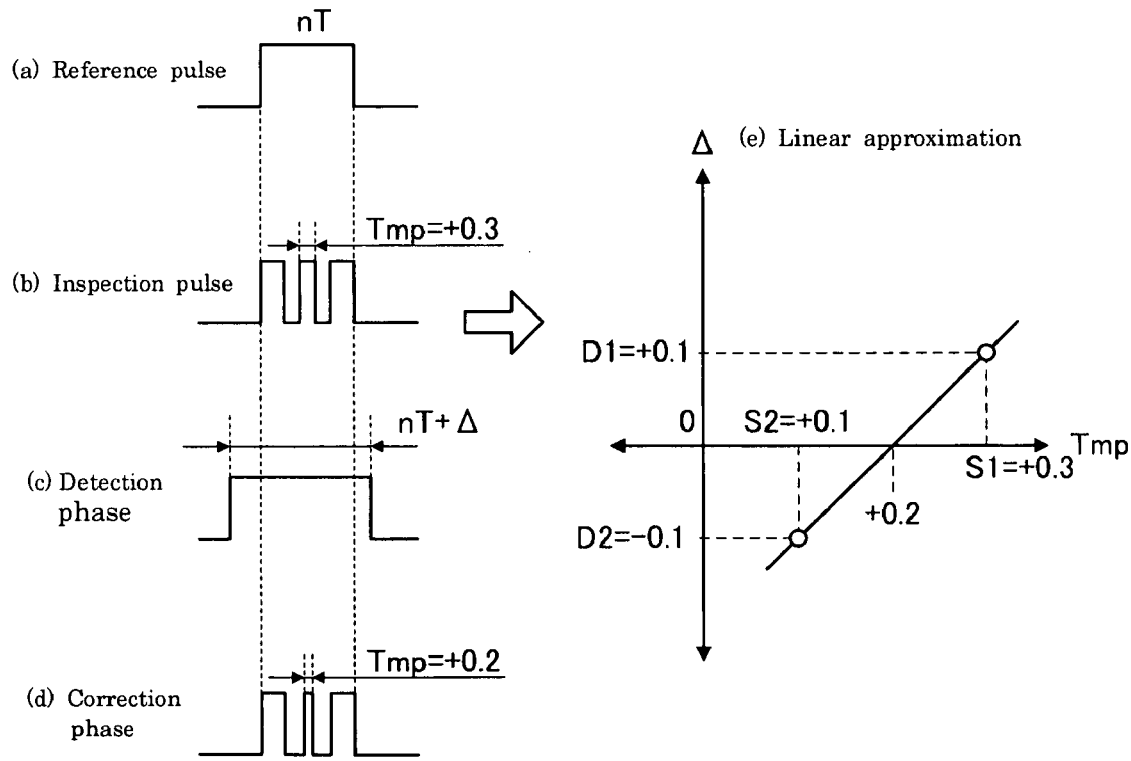
FIG. 31 is a schematic diagram showing an example of correcting a shift length using a linear approximation in case of a multipulse.

FIG. 31 is a schematic diagram showing an example of correcting a shift length using a linear approximation in case of a multipulse. The determination of a correction amount Tmp corresponding to the shift length involves, when a reference waveform nT is adapted to have a reference pulse length (FIG. 31(a)), conducting a test recording with a waveform with an intermediate pulse length of Tmp (FIG. 30(b)) and detecting a shift length Δ of an obtained reproduction signal (FIG. 30(c)). In this procedure, a top pulse condition should be kept constant.

In the example shown in FIG. 31, varying the correction amount Tmp from S1=+0.3 to S2=+0.1 results in respective shift lengths Δ as D1=+0.1 and D2=−0.2. Then, using the obtained (S1, D1) and (S2, D2), the relationship between the control amount Tmp and the resulting shift length Δ is linearly approximated as shown in FIG. 31(e), and the approximated line is used to find the correction amount Tmp=+0.2 as an optimum correction amount, with which a shift length is canceled.

Figures 32, 33:
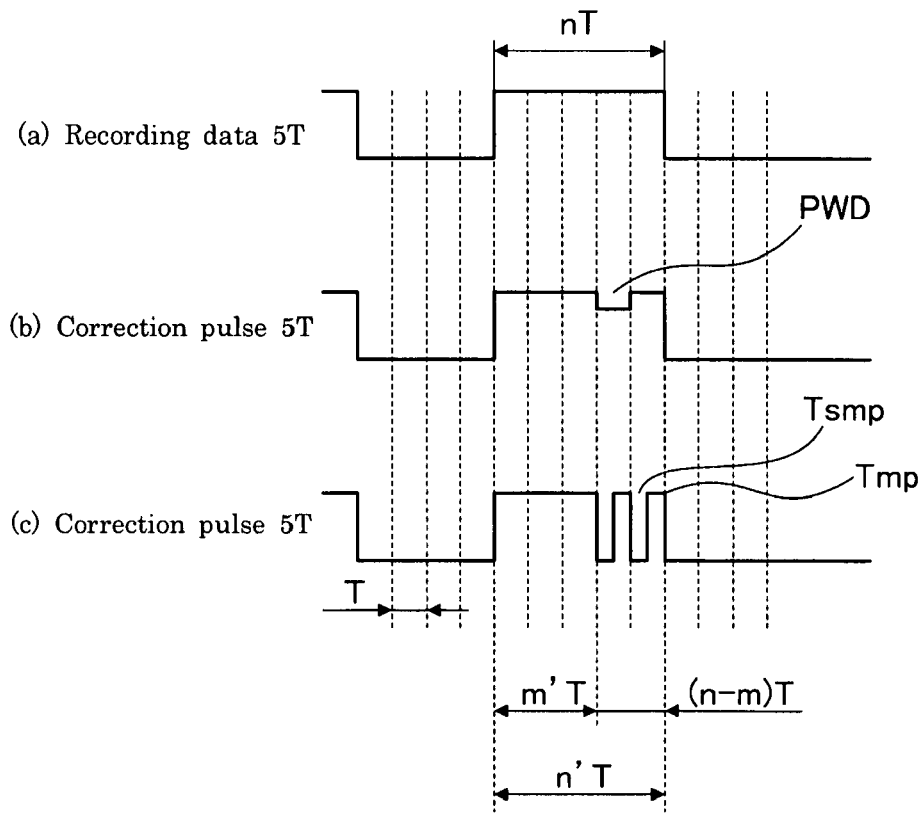
FIG. 32 is a schematic diagram showing a table configuration for storing two types of correction amounts PWD and Tmp.
FIG. 33 is a schematic diagram showing a concept of an nT pulse configuration conducted in the step S300 in FIG. 1.

FIG. 32 is a schematic diagram showing a table configuration for storing two types of correction amounts PWD and Tmp. As shown in FIG. 32, the correction amounts PWD and Tmp are defined for each of the pit lengths to be corrected. For instance, in the case of correcting a 3T pit, a correction amount PWD is stored into a region indicated as "PW3," and a correction amount Tmp into a region indicated as "Tm3" in the figure. Likewise, both of the correction amounts are stored up to 14T pit.

FIG. 33 is a schematic diagram showing a concept of an nT pulse configuration conducted in the step S300 in FIG. 1. As shown in FIG. 33(a), in the case of forming an nT pulse having 5T pit for instance, a recording datum is output as a pulse signal having a length of nT that corresponds to the length of 5 cycles of the clock signal. As shown in FIG. 33(b) or FIG. 33(c), the corrected pulse for the recording pulse is output as a pulse signal with a length of n'T having a top pulse length of m'T. If the corrected pulse is a single pulse, a PWD is defined within a part of the pulse indicated as (n−m)T, and if it is a multipulse, a Tmp is defined within a part of the pulse indicated as (n−m)T.

Since PWD and Tmp are the values obtained while a top pulse condition is fixed, these values are dependent on an optimum m'T/(n−m)T ratio based on an mT pulse condition. As a result, the nT pulse comprised of a top pulse and a succeeding pulse provides a preferable value for improving recording quality. However, since a phase condition is not yet defined at this point, a following procedure to determine a phase condition should be conducted to obtain an optimum strategy.

Correction of Phase Shift

Figure 34:
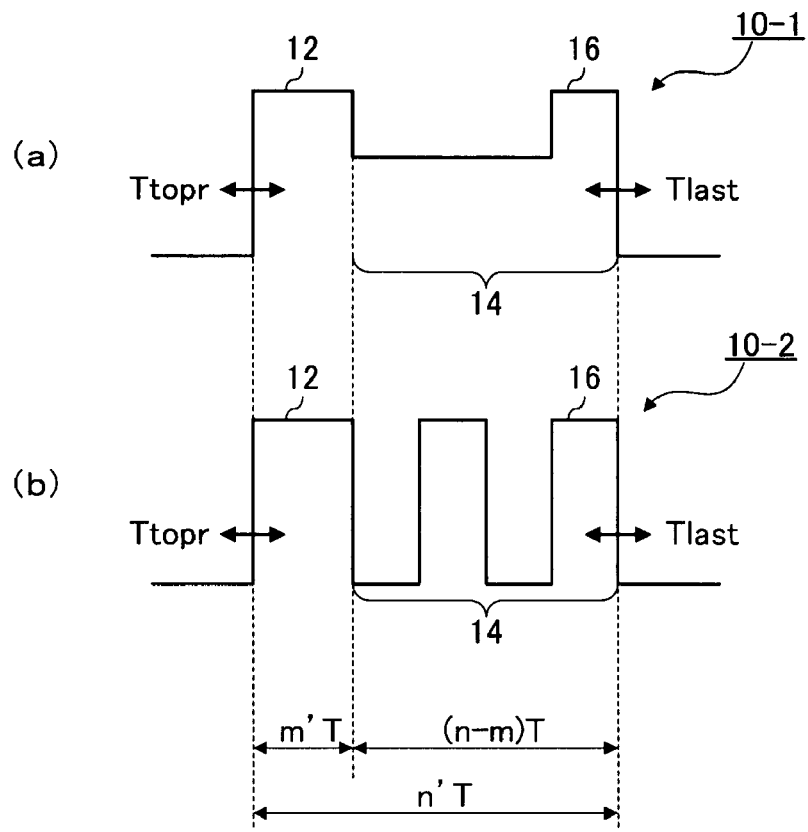
FIG. 34 is a schematic diagram showing an example of a test recording pulse that is used for the correction of phase shift in the step S400 in FIG. 1(b).

FIG. 34 is a schematic diagram showing an example of a test recording pulse that is used for the correction of phase shift in the step S400 in FIG. 1(b). FIG. 34(a) is an example of a case using a single pulse comprised of a single pulse pattern, and FIG. 34(b) a case using a multipulse comprised of a plurality of pulse patterns.

As shown in FIG. 34, in either case of the single pulse 10-1 or the multipulse 10-2, Ttopr that adjusts the start position of a top pulse 12 and Tlast that adjusts the rear position of a rear-end pulse 16 are defined as phase conditions for a recording pulse. A pit length after recording is further optimized by adjusting these values. In addition, these phase conditions are determined by conducting a test recording based on the top pulse condition and succeeding pulse condition determined with the above-described procedure.

Figure 35:
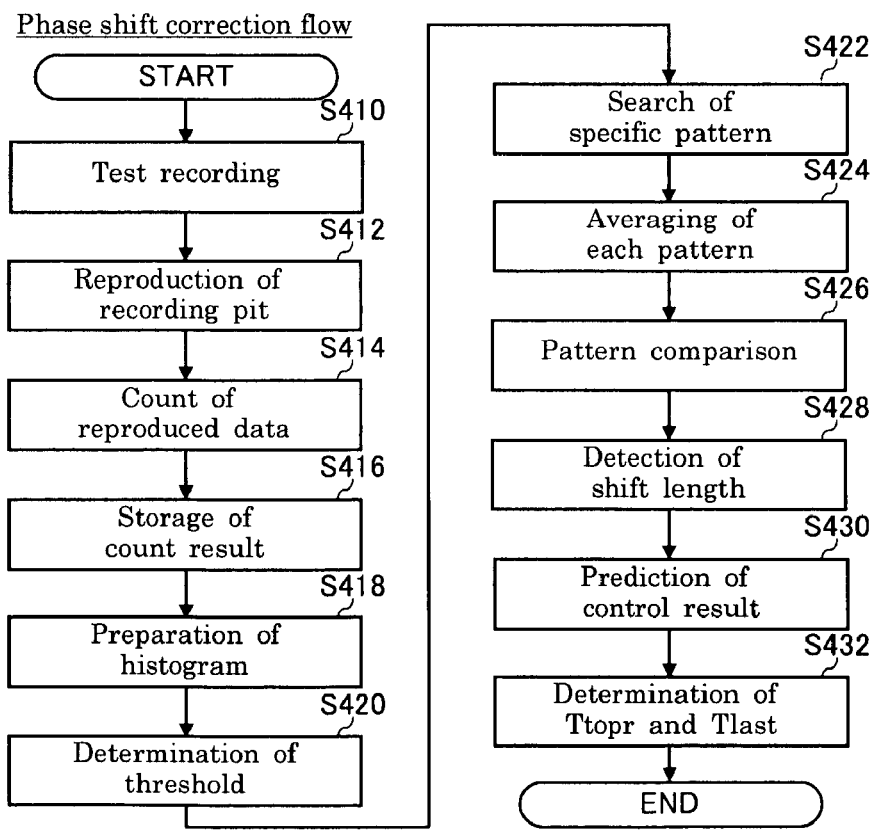
FIG. 35 is a flowchart showing an execution of a determination flow of a phase condition in the step S400 in FIG. 1(b).

FIG. 35 is a flowchart showing an execution of a determination flow of a phase condition in the step S400 in FIG. 1(b). As shown in FIG. 35, the drive shown in FIG. 2 conducts a test recording onto the medium 500 using various recording patterns obtained by varying the phase condition of nT pulse comprised of an mT pulse and (n−m)T pulse (step S410). In this step, the mT pulse condition and (n−m)T pulse condition are fixed at the values obtained with the above-described procedure. Then, after a recording pattern obtained by the test recording is reproduced (step S412), the recording shift detection part 1112 counts the binarized reproduction signal obtained through the binarization circuit 1100 using a counter synchronized with a predetermined clock (step S414), and lengths of pit and land included in the binarized reproduction signal are stored into the recording area 1115 as count data respectively (step S416).

Subsequently, the recording shift detection part 1112 generates a histogram showing an appearance rate of each of the count values using the count data stored in the recording area 1115 (step S418), and a threshold for the count data that provides a criterion for a pit or land length (step S420) is determined.

Subsequently, the recording shift detection part 1112 searches various types of specific patterns including a specific pit/land pattern from the count data stored in the recording area 1115 on the basis of the threshold (step S422), and average lengths of respective pits and respective lands comprising the specific patterns are calculated by averaging count results for the pits considered to have the same pit length included in the specific patterns as well as by averaging count results for the lands considered to have the same land length (step S424).

Subsequently, the recording shift detection part 1112 sets one of the extracted specific patterns to a reference pattern, and comparing the reference pattern with other patterns (step S426) allows the following shift lengths to be detected independently (step S428):

1) Front-side phase shift length of pit relative to the recording pulse
2) Back-side phase shift length of pit relative to the recording pulse
3) Shift length of pit relative to the recording pulse due to heat interference Then, an equation derivation part 1113 derives an equation for determining an optimum strategy based on the shift length detected by the recording shift detection part 112. A strategy determination part 1114 predicts a control result of various parameters using the equation derived by the equation derivation part 1113 (step S430), and then Ttopr and Tlast shown in FIG. 34 are determined according to the prediction and set for the strategy circuit 1102 (step S432).

Since the steps from test recording (S410) to averaging (S424) are conducted in the same manner as in FIGS. 20 to 24, the detailed description for these steps is omitted.

Figure 36:
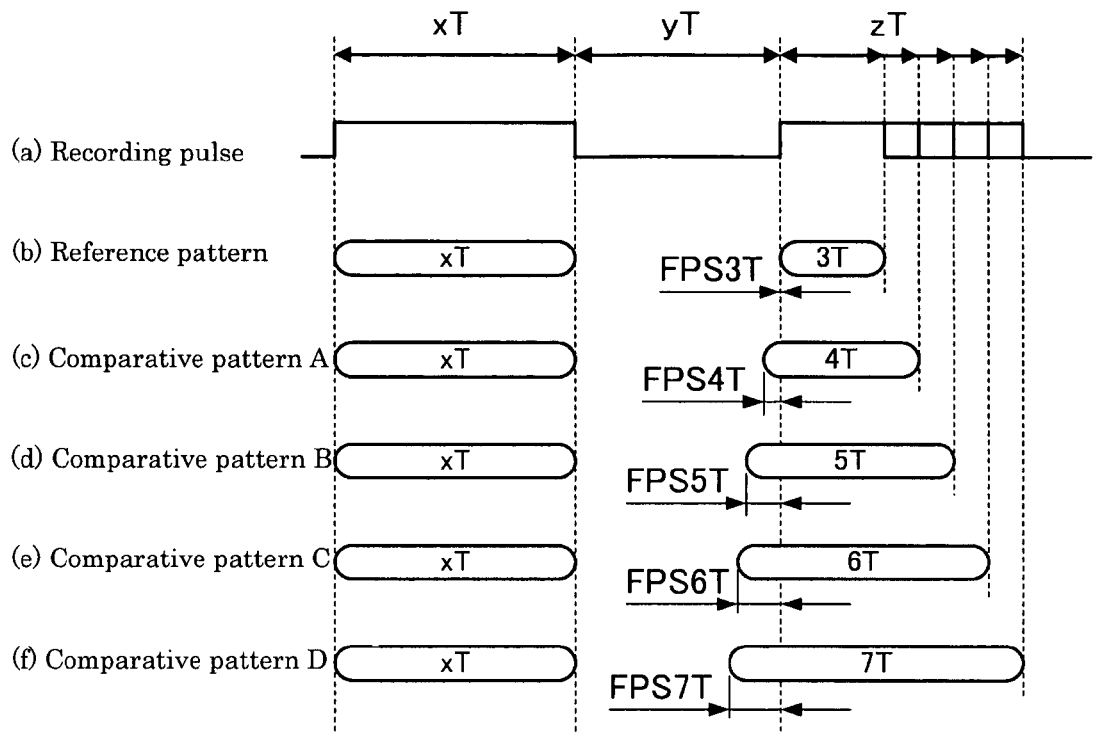
FIG. 36 is a schematic diagram showing an example of a recording pattern and reproduction pattern that are used for detecting a front-side phase shift length of each pit.

FIG. 36 is a schematic diagram showing an example of a recording pattern and reproduction pattern that are used for detecting a front-side phase shift length of each pit. As shown in FIG. 36, in the case of detecting a front-side phase shift length of each pit, test recording is conducted using the recording pulse shown in FIG. 36(a). The recording pulse includes a pattern having a fixed pit PxT, fixed land LyT, and variable pit PzT successively and is generated by, while fixing the lengths of fixed pit PxT and fixed land LyT, varying the pit length of a variable pit PzT from 3T, 4T, . . . 7T as shown in FIGS. 36(b) to (f). Although not shown in the figure, the length of variable pit PzT is varied up to 14T.

When the length of each fixed land LyT in a recording pattern is measured, the length of the fixed land LyT should be constant under the ideal recording condition. However, if the length of the fixed land LyT is shifted from the predetermined ideal length, since the lengths of the pit PxT is fixed, the shift length of each fixed land LyT, P3T, P4T, . . . or P14T, from the predetermined length corresponds to the front-side phase shift length relative to each unit length 3T, 4T, . . . or 14T of the recording pulse generated with a strategy during recording.

Accordingly, a pattern shown in FIG. 36(b), wherein a variable pit PzT has a length of 3T, is set as a reference pattern, and the rest of the patterns shown in FIGS. 36(c) to (f) as comparison patterns. Then, by comparing each of the comparison patterns with the reference pattern in terms of fixed land length LyT, a front-side phase shift length FPS4T to FPS7T relative to the reference pattern is obtained as shown in the figure.

Since it is only necessary to detect each of the shift lengths FPS3T to FPS7T as a value relative to any position, the front-side phase shift length FPS3T of the reference pattern may be defined as zero or a shift length from an ideal length. Also, instead of the pattern in FIG. 36(b), one of the patterns shown in FIGS. 36(c) to (f) may be set as a reference pattern.

Figure 37:
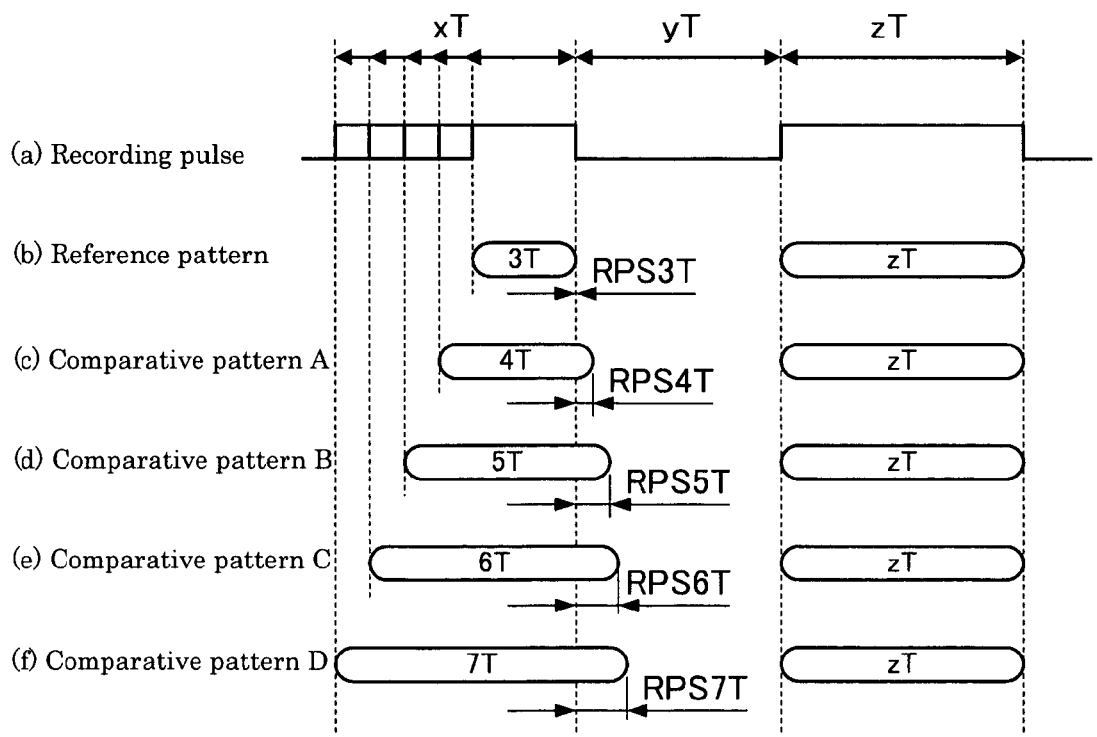
FIG. 37 is a schematic diagram showing an example of a recording pattern and reproduction pattern that are used for detecting a backside phase shift length of each pit.

FIG. 37 is a schematic diagram showing an example of a recording pattern and reproduction pattern that are used for detecting a backside phase shift length of each pit. As shown in FIG. 37, in the case of detecting a backside phase shift length of each pit, test recording is conducted using the recording pulse shown in FIG. 37(a). The recording pulse includes a pattern having a variable pit PxT, fixed land LyT, and fixed pit PzT successively and is generated by, while fixing the lengths of the fixed land LyT and fixed pit PzT, varying the pit length of a variable pit PxT from 3T, 4T, . . . to 7T as shown in FIGS. 37(b) to (f). Although not shown in the figure, the length of variable pit PxT is varied up to 14T.

When the length of the fixed land LyT in the recording pattern is measured, the length of the fixed land LyT should be constant under the ideal recording condition. However, if the length of the fixed land LyT is shifted from the predetermined ideal length, since the lengths of the pit PzT is fixed, the shift length of each fixed land LyT, P3T, P4T, . . . or P14T from the predetermined length corresponds to the back-side phase shift length relative to each unit length 3T, 4T, . . . or 14T of the recording pulse generated with a strategy during recording.

Accordingly, after a pattern shown in FIG. 37(b), wherein a variable pit PxT has a length of 3T, is set as a reference pattern and the rest of the patterns shown in FIGS. 37(c) to (f) as comparison patterns, comparing each of the comparison patterns with the reference pattern in terms of fixed land length LyT enables a back-side phase shift length RPS4T to RPS7T relative to the reference pattern to be obtained as shown in the figure.

Since it is only necessary to detect each of the shift length RPS3T to RPS7T as a value relative to any position, the backside phase shift length RPS3T of the reference pattern may be defined as zero or a shift length from an ideal length. Also, instead of the pattern in FIG. 37(b), one of the patterns shown in FIGS. 37(c) to (f) may be set as a reference pattern.

FIG. 38 is a schematic diagram showing an example of a recording pattern for detecting a shift length of each pit due to heat interference. As shown in FIG. 38, in the case of detecting a shift length of pit due to heat interference, test recording is conducted using the recording pulse shown in FIG. 38(a). The recording pulse includes a pattern having a land LxT, pit PyT, and land LzT successively and is generated by, while fixing the lengths of fixed pit PyT and fixed land LzT, varying the pit length of a variable land LxT from 3T, 4T, . . . or 7T as shown in FIGS. 38(b) to (f) in the figure. Although not shown in the figure, the length of variable land LxT is varied up to 14T.

When the length of the fixed pit PyT in the recording pattern is measured, it should be constant under the ideal recording condition. However, if the length of the fixed pit PyT is shifted from the predetermined ideal length, since the lengths of the land LzT is fixed, the shift length of the fixed pit LyT, P3T, P4T, . . . or 14T, from the predetermined length corresponds to the shift length due to heat interference arising from pit formed right before the variable land LxT.

Accordingly, after a pattern shown in FIG. 38(b), wherein a variable land LxT has a length of 3T, is set as a reference pattern and the rest of the patterns shown in FIGS. 38 (c) to (f) as comparison patterns, comparing each of the comparison patterns with the reference pattern in terms of fixed pit length PyT enables a front-side phase shift length HID3T to HID7T relative to the reference pattern to be obtained as shown in the figure.

Since it is only necessary to detect each of the shift lengths HID3T to HID7T as a value to any position, the front-side phase shift length HID3T of the reference pattern may be defined as zero or a shift length from an ideal length. Also, instead of the pattern in FIG. 38 (b), one of the patterns shown in FIGS. 38(c) to (f) may be set as a reference pattern.

FIG. 39 is a schematic diagram showing a table configuration for searching a specific pattern used in the detection of a front-side or backside phase shift length. In the case of detecting a front-side phase shift of a pit, the data stored in the storage area 1115 shown in FIG. 2 is searched according to the threshold range shown in FIG. 39(a) for a pit PxT, land LyT, or pit PzT defined for each specific pattern (step S422 in FIG. 35), and a data stream that satisfies the threshold range is extracted.

Subsequently, count results for each of the pit PxT, land LyT, and pit PzT are sorted and averaged (step S424 in FIG. 35). By conducting the above-described pattern comparison using the averages of the count results, a front-side phase shift length of each of the pits is obtained. FIG. 39(b) shows an example of a threshold in the case of detecting a backside phase shift of pit, and the concept and operations involved in the figure are the same as in the case of detecting a front-side phase shift of a pit.

Figure 40:
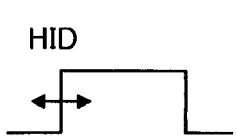
FIG. 40 is a schematic diagram showing a table configuration for searching a specific pattern used in the detection of a shift length of a pit due to heat interference.

FIG. 40 is a schematic diagram showing a table configuration for searching a specific pattern used in the detection of a shift length of a pit due to heat interference. As shown in FIG. 40, a detection of a shift due to the heat interference is conducted by the same procedures as in the case of detecting the front-side or backside phase shift of a pit described in FIG. 39.

Figure 41:
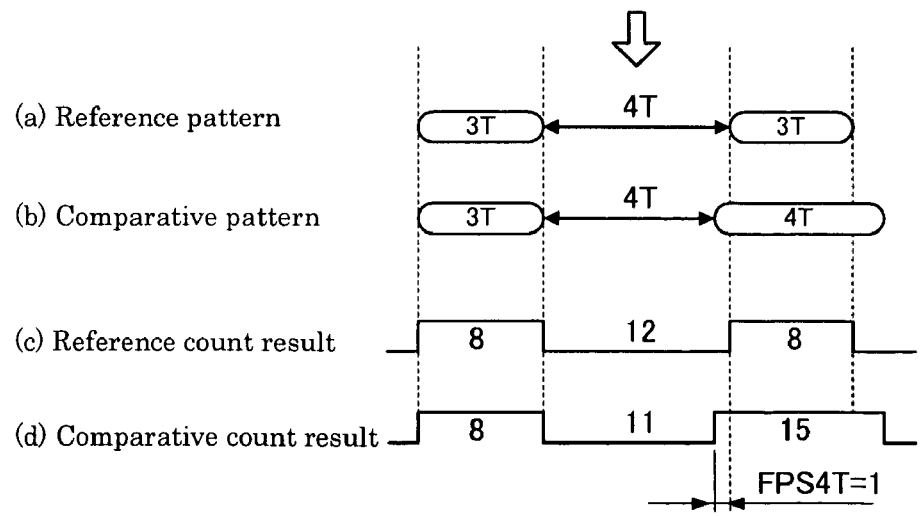
FIG. 41 is a schematic diagram showing a specific example of detecting a shift length by the comparison of count results.

FIG. 41 is a schematic diagram showing a specific example of detecting a shift length by the comparison of count results. The diagram shows an example of detecting a front-side phase shift of a pit, but the same method is also applied to the detection of other shift lengths. In the case of detecting a shift length by the comparison of count results, a reference pattern and a comparison pattern shown in FIGS. 41(a) and 41(b) respectively are searched in and extracted from the data stored in the storage area, and then count values for a part supposed to have a fixed length are compared. In the example shown in the figure, a land LyT is used as a reference length for a comparison. Thus, the count result of "12" shown in FIG. 41(c) for the reference pattern and that of "1" shown in FIG. 41(d) for the comparison pattern are compared with each other to obtain the difference, and the obtained difference of "1" is the value of a shift length FPS4T.

Figure 42:
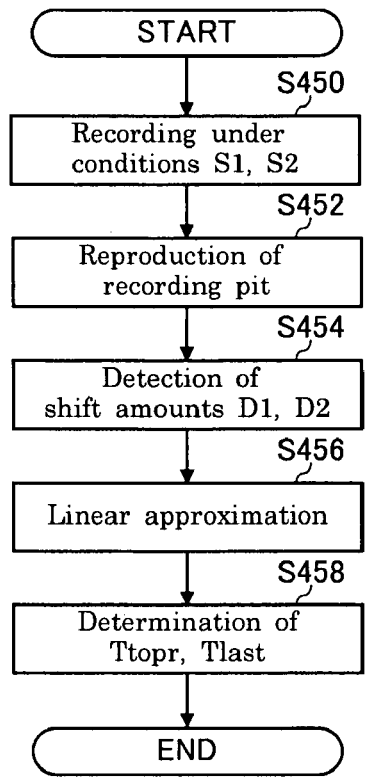
FIG. 42 is a flowchart showing an example of the determination of Ttopr and Tlast by predicting a control amount shown in FIG. 35.

FIG. 42 is a flowchart showing an example of the determination of Ttopr and Tlast by predicting a control amount shown in FIG. 35. As shown in FIG. 42, a control amount is predicted by implementing a series of steps of: conducting a test recording under two or more types of recording conditions including S1 and S2 (step S450); reproducing the recording pits obtained by the test recording (step S452); comparing the obtained reproduction patterns in order to find a shift length D1 under the condition of S1 and a shift length D2 under the condition of S2 (step S454); then linearly approximating the relationship between (S1, D1) and (S2, D2) (step S456); and finally determining an optimum Ttopr and Tlast using the linearly approximated line (step S458).

Figure 43:
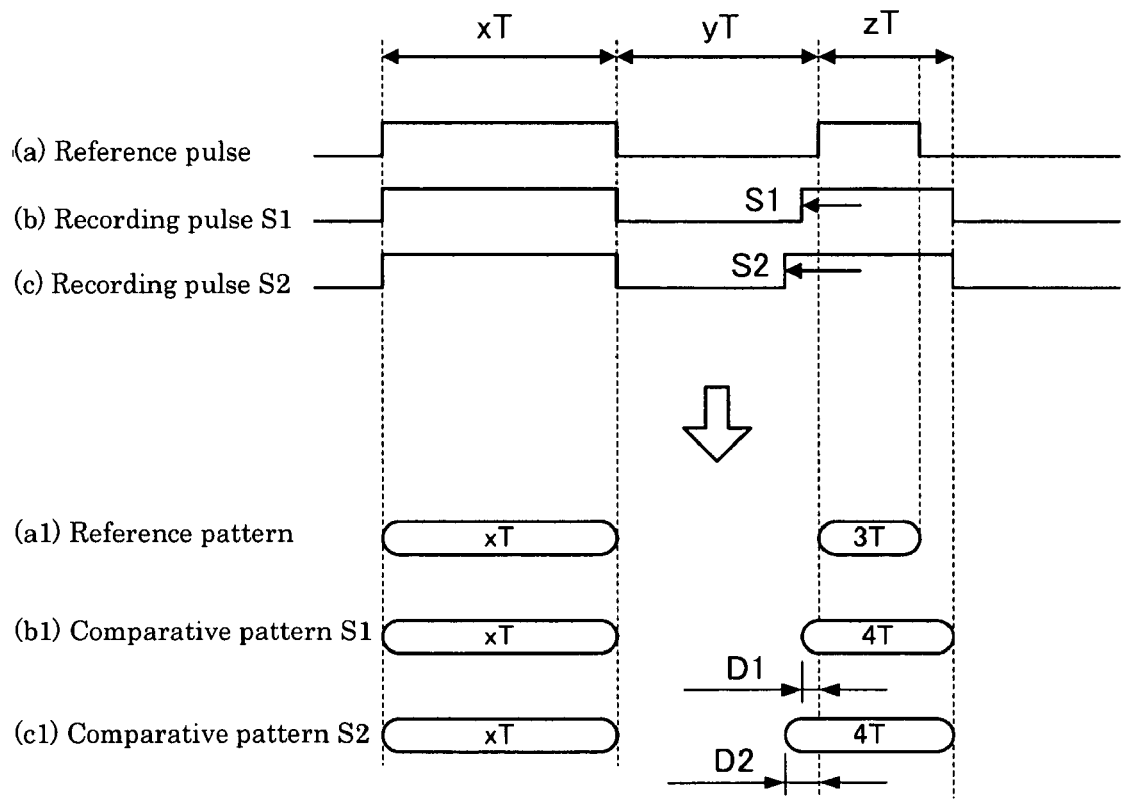
FIG. 43 is a schematic diagram showing a relationship between the variation in recording condition (S1 and S2) and the corresponding shift length (D1 and D2).

FIG. 43 is a schematic diagram showing a relationship between the variation in recording condition (S1 and S2) and the corresponding shift length (D1 and D2). A reference pulse having "PzT=3T" is used as a reference pulse, and two reference pulses of "PzT=4T," which are obtained by shifting front edges of PzTs by S1 and S2 respectively as shown in FIGS. 43(b) and 43(c), are used as recording pulses to be compared. Then, test recording is conducted using these recording pulses.

As a result, a reference pattern shown in the FIG. 43(a1) is obtained corresponding to a recording pulse shown in FIG. 43(a), and a comparison pattern S1 in FIG. 43(b1) corresponding to a recording pulse in FIG. 43(b), and a comparison pattern S2 in FIG. 43(c1) corresponding to a recording pulse in FIG. 43(c). A shift length. D1 is caused by the control amount S1 in the comparison pattern S1, and a shift length D2 by the control amount S2 in the comparison pattern S2.

When the shift lengths D1 and D2 corresponding to the control amounts S1 and S2 respectively are obtained, a shift length caused by applying a control amount to any of the parameters becomes predictable. Accordingly, a prediction of a control amount and determination of a correction value are conducted using the relationship between a control amount and a shift length.

Figure 44:
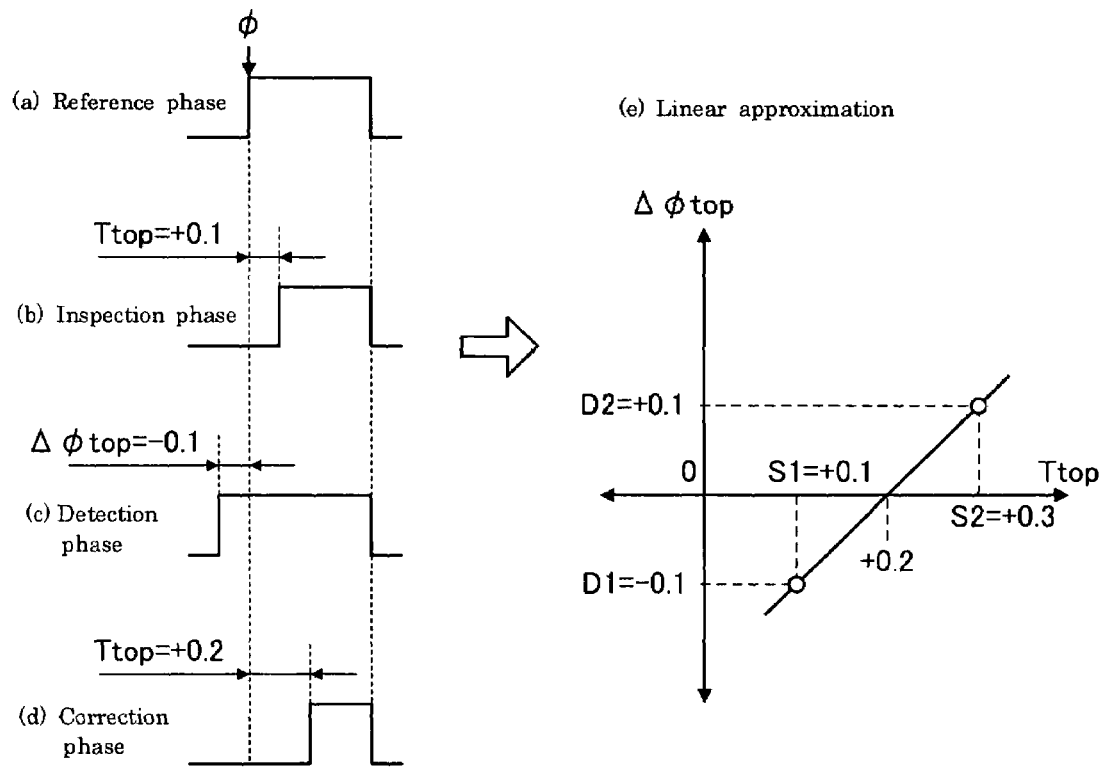
FIG. 44 is a schematic diagram showing an example of correcting a front-side phase shift using a linear approximation.

FIG. 44 is a schematic diagram showing an example of correcting a front-side phase shift using a linear approximation. In the case of determining a correction amount Ttop for a front-side phase shift, as shown in FIG. 44(a), test recording is conducted first with a pulse shape having a pulse position shifted relative to a reference phase Φ by an amount of Ttop as shown in FIG. 44(b) (recording condition S1 or S2). Consequently, as shown in FIG. 44(c), a phase sift ΔΦtop for the obtained reproduction signal is detected (shift length D1 or D2).

In the example shown in FIG. 44, varying the control amount Ttop from S1=+0.1 to S2=+0.3 results in the variation of a phase shift ΔΦtop as D1=−0.1 to D2=+0.1. Then, using the obtained (S1, D1) and (S2, D2), the relationship between a control amount Ttop and the resulting phase shift ΔΦtop is linearly approximated as shown in FIG. 44(e), and the approximated line is used to find the correction phase Ttop=+ 0.2 as an optimum correction amount, with which a phase shift is canceled.

As described above, a linear or curve approximation can be applied to the relationship between the variations in strategy (S1 and S2) and in shift length (D1 and D2) when at least two points for each of the variations are obtained, and the approximated line (curve) enables to find an optimum correction amount with which a shift length becomes zero.

Specifically, obtaining several shift lengths D by varying a strategy S; substituting several sets of the strategy S and the corresponding shift length D into a general expression of "D=a·S+b"; and solving simultaneous equations obtained by the substitution enable the constants a and b in the expression to be determined, resulting in the determination of a strategy S for an ideal shift length D. Applying the strategy S to the strategy circuit 1102 shown in FIG. 1 enables a recording pulse to be optimally corrected.

For instance, assuming that the recording shift detection part 1112 shown in FIG. 2 detects a shift length as D1 from a reproduction pattern of a test recording using a strategy S1 and that as D2 using the other strategy S2, the following simultaneous equations are obtained:

$$D1 = a \cdot S1 + b, \text{ and}$$

$$D2 = a \cdot S2 + b.$$

From the above equations, the constants a and b are deduced, whereby the following relationship between S and D is obtained:

$$S = (D - b)/a.$$

Substituting an output shift length D for improving recording quality, for instance, an output shift length for correcting an initial output shift length arising in an equalizer or the like, into the above relationship enables an optimum strategy S to be determined.

In addition, the relationship to determine an optimum strategy S may be obtained for each of the pits P3T, P4T, . . . and P14T having the length of 3T, 4T, . . . and 14T respectively. Further, it may also be obtained for each recording speed.

Figure 45:
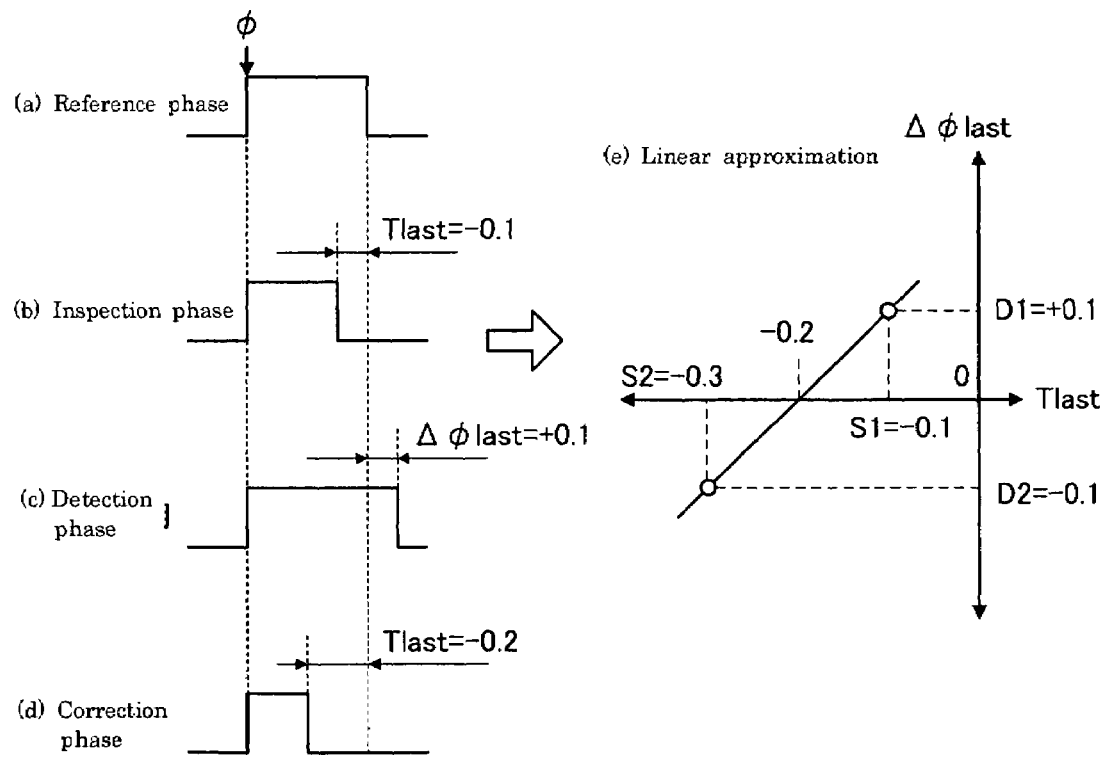
FIG. 45 is a schematic diagram showing an example of correcting a backside phase shift using a linear approximation.

FIG. 45 is a schematic diagram showing an example of correcting a backside phase shift using a linear approximation. In the case of determining a correction amount Tlast for a back-side phase shift, as shown in FIG. 45(a), test recording is conducted first with a pulse shape having a pulse position shifted relative to a reference phase Φ by an amount of Tlast as shown in FIG. 45(b). Consequently, as shown in FIG. 45(c), a phase shift ΔΦ last for the reproduction signal is detected.

In the example shown in FIG. 45, varying the correction amount Tlast from S1=−0.1 to S2=−0.3 results in the variation of a phase shift ΔΦ last as D1=+0.1 to D2=−0.1. Then, using the obtained (S1, D1) and (S2, D2), the relationship between a control amount Tlast and the resulting phase shift ΔΦ last is linearly approximated as shown in FIG. 45(e), and the approximated line is used to find the correction phase Tlast=−0.2 as an optimum correction amount, with which a phase shift is canceled.

FIG. 46 is a schematic diagram showing a table configuration for storing correction amounts Ttop and Tlast. As shown in FIG. 46(a), the correction amount Ttop is defined for each pit length to be corrected in combination with a land length located before the pit. For instance, when a pit to be corrected has a length of 3T and a land before the pit has a length of 3T, a correction amount is stored in an area indicated as "3-3" in FIG. 46(a). Similarly, when a pit to be corrected has a length of 4T and a land before the pit has a length of 3T, a correction amount is stored in an region indicated as "3-4" in the figure. In the same manner as the case of 3T or 4T, for each of the pit lengths 5T to 14T, correction amount Ttop is stored correspondingly to the land length located before the pit.

Further, as shown in FIG. 46(b), the correction amount Tlast is defined for each pit length to be corrected in combination with a land length located after the pit. For instance, when a pit to be corrected has a length of 3T and a land after the pit has a length of 3T, a correction amount is stored in an area indicated as "3-3" in FIG. 46(b). Similarly, when a pit to be corrected has a length of 4T and a land after the pit has a length of 3T, a correction amount is stored in an area indicated as "3-4" in FIG. 46(b). In the same manner as the case of 3T or 4T, for each pit length 5T to 14T, a correction amount Tlast is stored correspondingly to the land length after the pit.

FIG. 47 is a schematic diagram showing an example of a corrected single pulse. As shown in FIGS. 47(*a*) to (*f*), when recording data in FIG. 47(*a*) is recorded onto an optical disk, a strategy to which an optimum correction value is applied is set for each pit length. For instance, in the case of recording a 3T pit as shown in FIG. 47(*b*), a front correction value Ttop of the 3T pit is read out correspondingly to the length of a land before the pit as well as a rear correction value Tlast of the 3T pit is read out correspondingly to the length of the land after the pit, from the table shown in FIG. 46. Then, the front and rear ends of the recording pulse are corrected with the Ttop and Tlast respectively.

Also, in the case of correcting pits having a length of 4T or longer, as shown in FIGS. 47(*c*) to (*f*), a PWD correction value for each pit length is read out from the table shown in FIG. 32 in addition to the Ttop and Tlast, and the pulse shape is corrected correspondingly to the PWD value.

Figure 48:
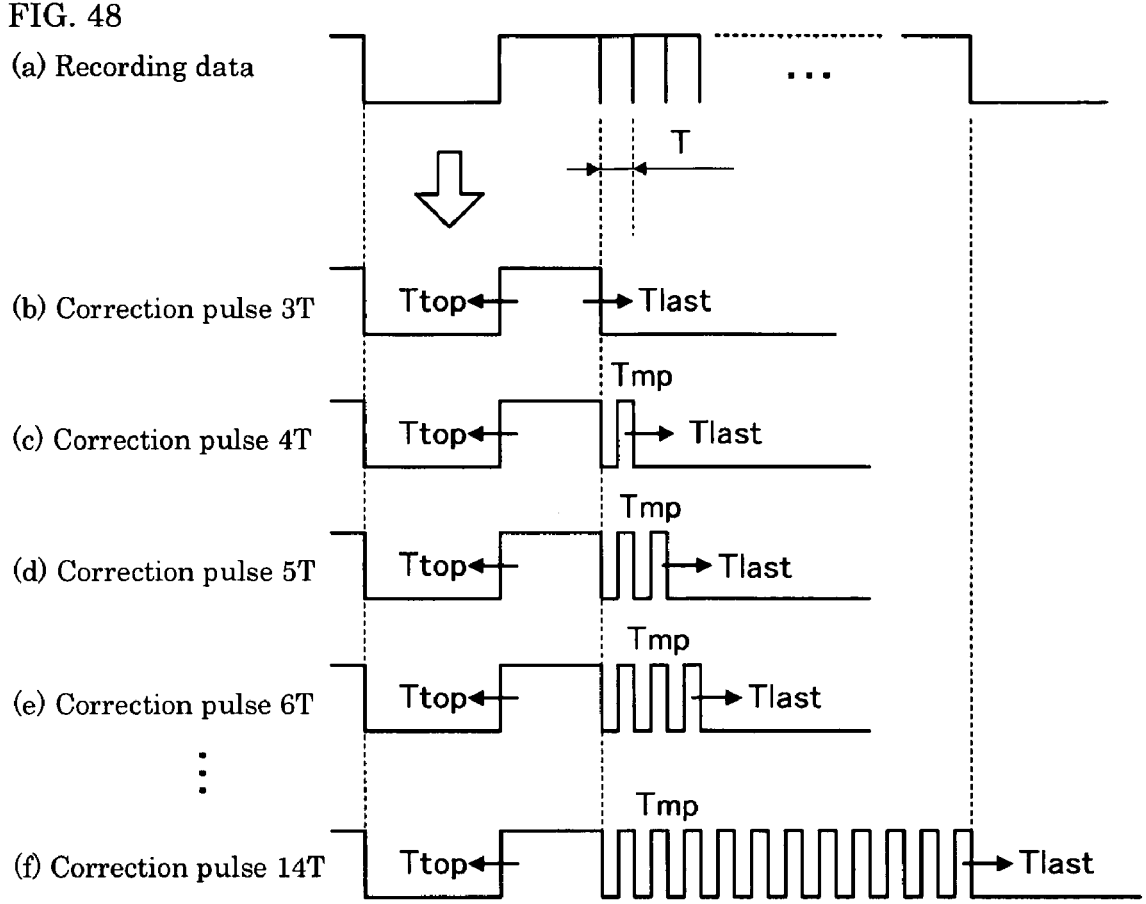
FIG. 48 is a schematic diagram showing an example of a corrected multipulse.

FIG. 48 is a schematic diagram showing an example of a corrected multipulse. In the case of correcting a multipulse as shown in FIG. 48, instead of the PWD correction value used for correcting a single pulse as described above, a Tmp correction value is read out from the table shown in FIG. 32, and the pulse shape is corrected correspondingly to the Tmp value. Other steps are the same as the single pulse case.

In addition, the above-described embodiment shows the case wherein an optimum strategy S is determined by substituting the shift length D into the relationship to find an optimum strategy, however, an optimum strategy S may be determined by using a correction table preliminary obtained with the relationship.

Further, the above-described procedure of setting an optimum strategy may be conducted every time the type of optical disk is changed, or as a recording speed is changed. Also, under the condition that optimum strategy conditions for various types of optical disks or recording speeds, which are determined by the above-described procedure of setting an optimum strategy, are preliminarily stored into a memory, when recording onto one of the optical disk types or at one of the recording speeds stored in the memory, the corresponding optimum strategy stored in the memory may be read out and used.

Figure 49:
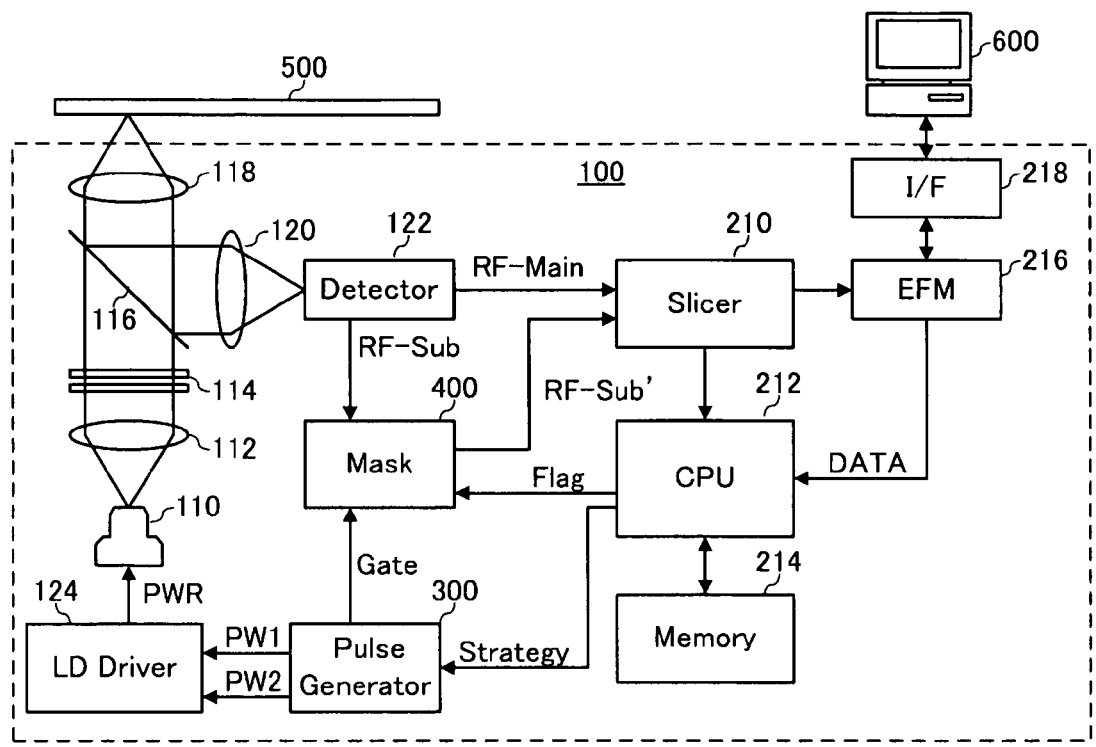
FIG. 49 is a block diagram showing an internal configuration of a drive of the present invention.

FIG. 49 is a block diagram showing an internal configuration of a drive of the present invention. As shown in FIG. 49, the drive 100 uses a laser beam output from a laser diode 110 to record/reproduce information onto/from an optical disk 500 and transmits/receives data to/from external devices such as a personal computer 600.

In the case of recording information onto the optical disk 500, recording data received from the personal computer 600 through an interface circuit 218 is encoded with an EFM encoder/decoder 216. By processing the encoded recording data with a CPU 212, a strategy to be a recording condition for the optical disk 500 is determined and converted into recording pulses in a pulse generator 300, which are then output to an LD driver 124.

The LD driver 124 drives the laser diode 110 based on the input recording pulses, and the laser diode 110 controls an output laser beam correspondingly to the recording pulses. The controlled laser beam is then irradiated to the optical disk 500 rotating at a constant linear velocity or a constant rotation speed through a collimator lens 112, diffraction grating 114, half mirror 116, and objective lens 118, whereby a recording pattern comprised of a pit/land stream corresponding to the desired recording data is recorded onto the optical disk 500.

On the other hand, in the case of reproducing the information recorded onto the optical disk 500, a reproduction laser beam output from the laser diode 110 is irradiated onto the optical disk 500 through the collimator lens 112, diffraction grating 114, half mirror 116, and objective lens 118.

The reproduction laser beam has an intensity lower than the recording laser beam, and a reflected light beam of the reproduction laser beam from the optical disk 500 is received at a detector 122 through the objective lens 118, half mirror 116, and a photo receiving lens 120, which is then converted into an electronic signal.

The electronic signal output from the detector 122 corresponding to the recording pattern comprised of pits and spaces recorded onto the optical disk 500 is then binarized with a slicer 210, decoded with the EFM encoder/decoder 216, and finally output as a reproduction signal.

Figure 50:
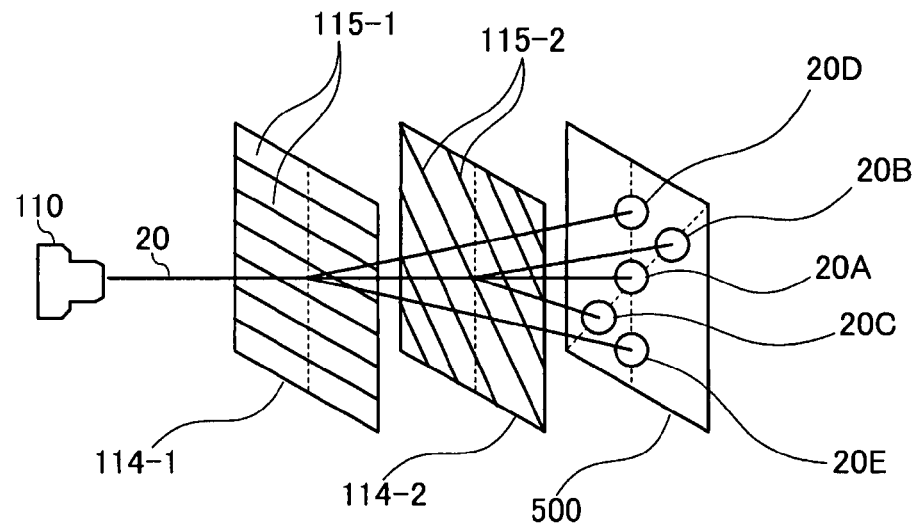
FIG. 50 is an exploded perspective view showing a configuration of a pickup device incorporated in the drive shown in FIG. 49.

FIG. 50 is an exploded perspective view showing a configuration of a pickup device incorporated in the drive shown in FIG. 49. As shown in FIG. 50, a diffraction grating arranged between the laser diode 110 and the front surface of the optical disk 500 is comprised of two pieces of diffraction gratings 114-1 and 114-2, onto which grooves 115-1 and 115-2 extending respectively in different direction are formed.

When a laser beam 20 enters into the diffraction grating with the above-described configuration, the laser beam 20 is branched into three laser beams at the first diffraction grating 115-1, and one of the three laser beams is branched further into three laser beams at the second diffraction grating 115-2. Consequently, five spots 20A to 20E are irradiated onto the surface of the optical disk.

Figure 51:
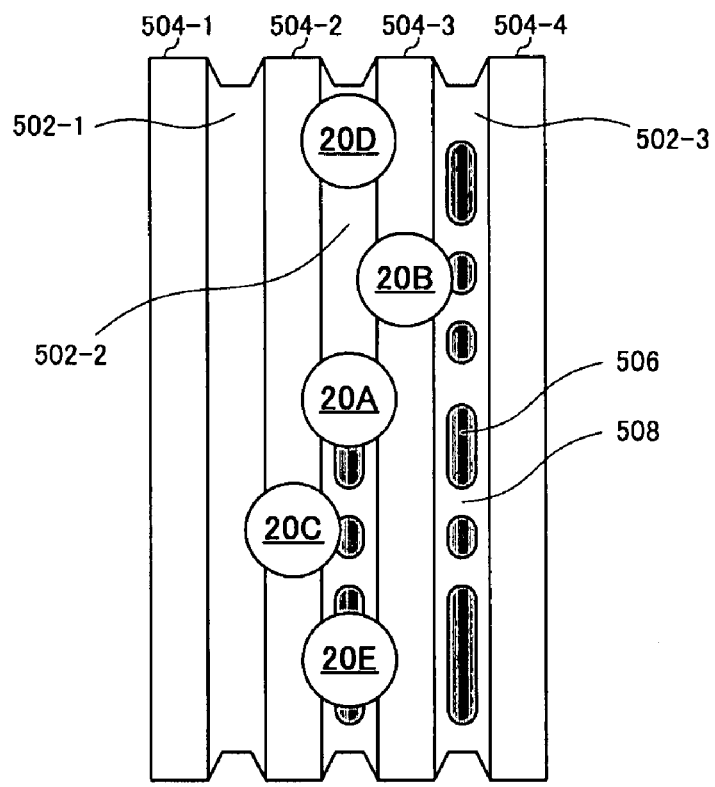
FIG. 51 is a plain view showing an arrangement of spots irradiated on the surface of an optical disk.

FIG. 51 is a plain view showing an arrangement of spots irradiated on the surface of an optical disk. As shown in FIG. 51, five beams: a recording main beam 20A; a first tracking sub beam 20B; a second tracking sub beam 20C; a first reproduction sub beam 20D; and a second reproduction sub beam 20E, are irradiated onto the surface of the optical disk 500.

The recording main beam 20A is irradiated onto a groove 502-2 formed on the optical disk 500, whereby a pit 506 is formed within the groove 502-2. The recording main beam 20A is adapted to have the highest emission intensity among the five beams so that pits can be formed in a heat mode.

The first tracking sub beam 20B is irradiated onto a land 504-3 which is on an adjacent side of the groove 502-2 where the main beam 20A is irradiated, and the second tracking sub beam 20C is irradiated onto a land 504-2 which is on the other adjacent side of the groove 502-2.

The first reproduction sub beam 20D is irradiated onto the position on the groove 502-2 that precedes the main beam spot 20A, and the second reproduction sub beam 20E onto a position succeeding the main beam spot 20A.

By arranging these spots as described above, a recording pattern formed by the main beam 20A, i.e., a recording pattern comprised of a combination of pits 506 and spaces 508 can be detected by the second reproduction sub beam 20E.

Figure 52:
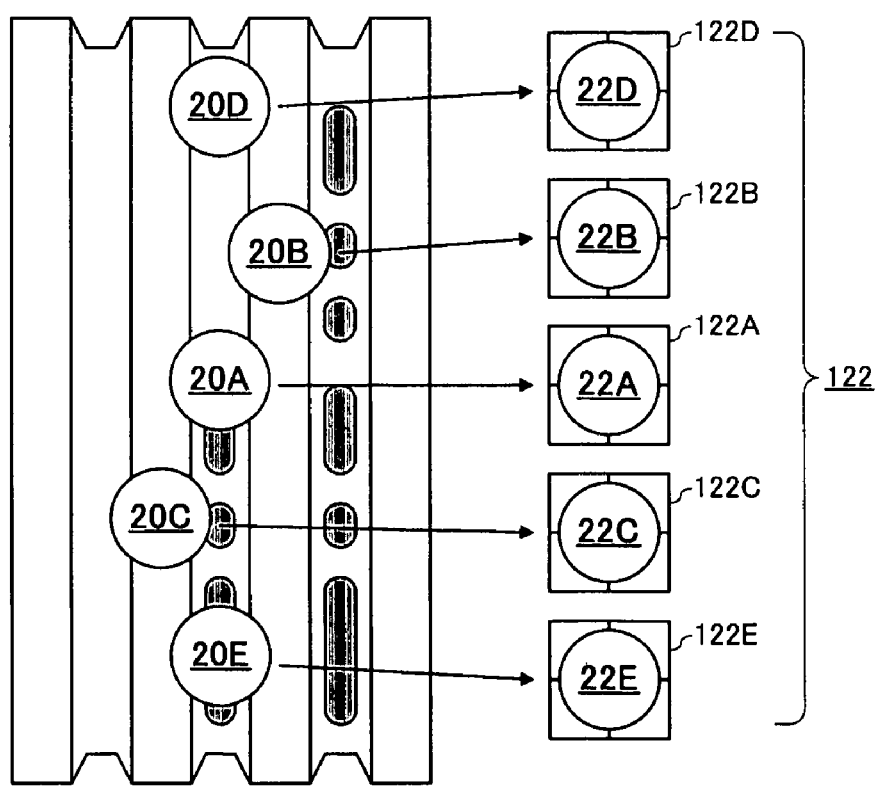
FIG. 52 is a schematic diagram showing the relationship between each spot irradiated onto the surface of an optical disk and a detector.

FIG. 52 is a schematic diagram showing a relationship between each spot irradiated onto the surface of an optical disk and a detector. As shown in FIG. 52, the detector 122 shown in FIG. 49 is comprised of five photo-receiving parts 122A to 122E, and each of these photo-receiving parts respectively receives reflected light beams 22A to 22E corresponding to spots 20A to 20E, which are then converted into electronic signals.

Figure 53:
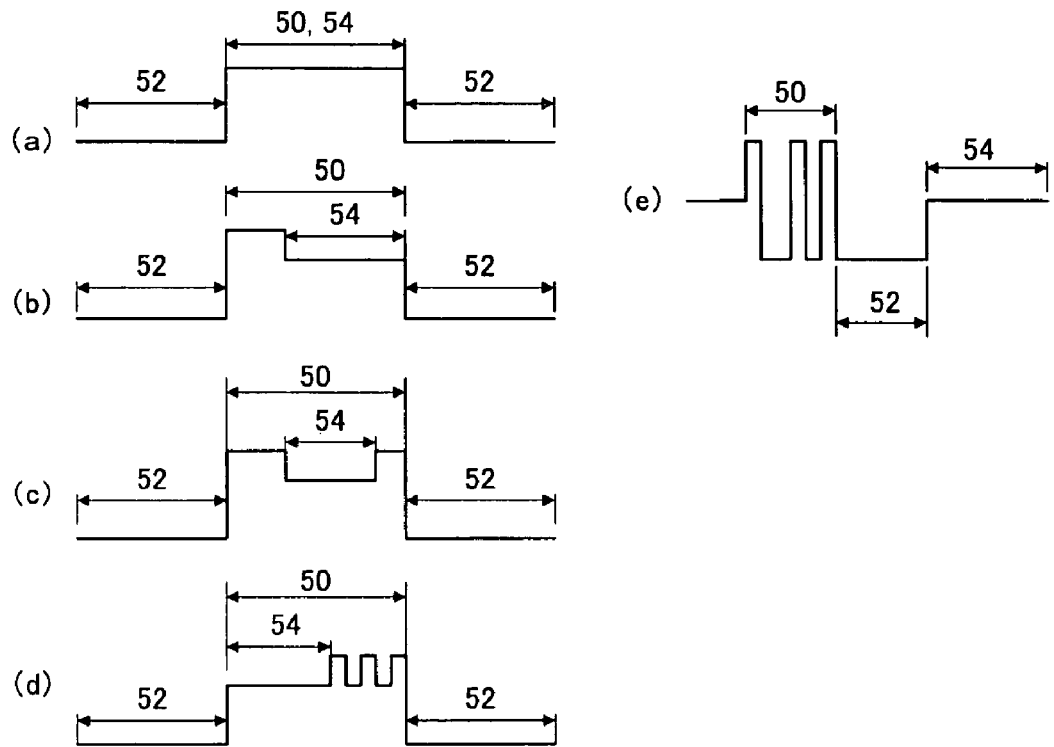
FIG. 53 is schematic diagram showing a relationship between a recording pulse shape and a constant area.

FIG. 53 is a schematic diagram showing a relationship between a recording pulse shape and a constant area. As shown in FIG. 53, recording pulses output from the LD driver 124 shown in FIG. 49 may have various shapes, but each of the recording pulses includes a high-output area 50 where the recording pulse is in ON-state, a low-output area 52 where the recording pulse is in OFF-state, and a constant output area 54 where the modulation is small and the recording pulse is in On-state.

More specifically, FIG. 53(a) shows a recording pulse of which the output is constant during ON-state, FIG. 53(b) a recording pulse of which the output is varied between the front and rear sections, FIG. 53(c) a recording pulse of which the output is varied between the front, middle, and rear sections, and FIG. 53(d) a recording pulse of which the output is comprised of a front constant pulse and a succeeding pulse having several output variations.

Since the present invention is adapted to retrieve a reproduction signal while the recording pulse is in ON-state, a gate signal described below is preferably generated correspondingly to a high-output area 50, and more preferably, correspondingly to the constant output area 54 that is less affected by modulations. For convenience, the constant output area 54 is defined as the longest stable section within the high-output area 50, however, even a stable section shorter than the longest stable section may be defined as a constant output area. In addition, the following description exemplifies a pulse shape called a "castle shape" shown in FIG. 53(c), but the present invention is applicable to recording pulses with other pulse shapes.

For instance, in the case of applying the present invention to a recording power used for phase change type optical media as shown in FIG. 53(e), the following configuration may be used. A recording pulse is comprised of a high-output area 50 wherein the phase change material is rapidly cooled down to become an amorphous (non-crystalline) state as a high output and a low output are alternatively repeated; a low-output area 52 wherein a servo-controllable main beam power is about 0.7 to 1 mW; and a constant output area 54 wherein the phase change material is gradually cooled down to become an crystalline state. Among the high-output, low-output, and constant output areas, the constant output area 54 corresponding to an elimination power is selected to generate a gate signal and retrieve a signal reproduced by a sub beam.

Figure 54:
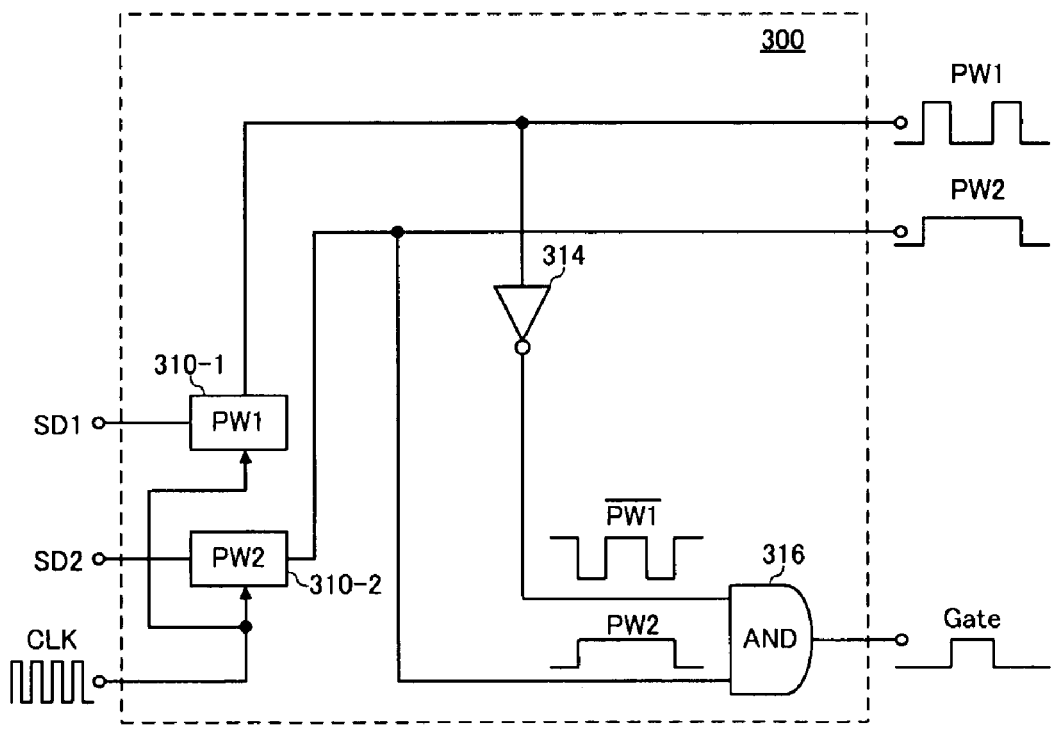
FIG. 54 is a circuit block diagram showing an internal configuration of a pulse generator shown in FIG. 49.

FIG. 54 is a circuit block diagram showing an internal configuration of a pulse generator shown in FIG. 49. As shown in FIG. 54, pulse unit generators 310-1 and 310-2 in the pulse generator 300 receive the strategy conditions SD1 and SD2 transmitted from the CPU 212 shown in FIG. 49 respectively, and generate pulse signals PW1 and PW2 synchronized with a clock signal CLK.

The strategy conditions SD1 and SD2 are defined as numeric data represented by clock counts corresponding to the pulse periods of ON-state and OFF-state respectively. Upon receipt of the data, the pulse unit generators 310-1 and 310-2 generate pulse signals corresponding to the strategy conditions SD1 and SD2 respectively by using the clock signal CLK generated within the drive.

These pulse signals PW1 and PW2 are output to the LD driver 124 shown in FIG. 49 as well as a gate signal Gate generated by executing AND operation of an inversion signal of pulse signal PW1 and a pulse signal PW2 in an AND operator 316 is output to a mask circuit shown in FIG. 49. In addition, the inversion signal of the pulse signal PW1 is generated in an inversion circuit 314.

Figure 55:
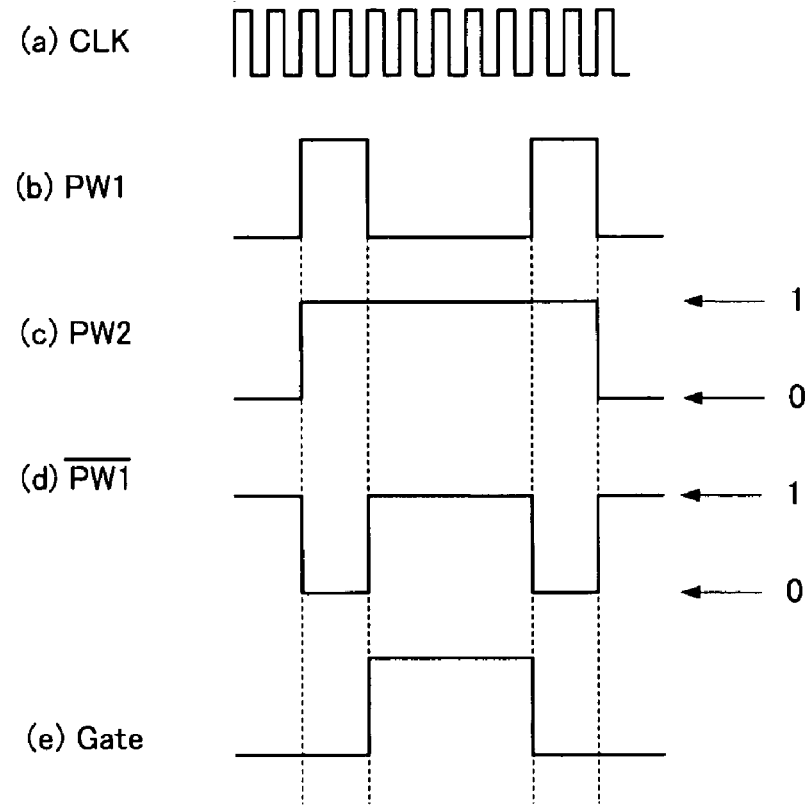
FIG. 55 is a timing diagram showing a concept of generating a gate signal shown in FIG. 54.

FIG. 55 is a timing diagram showing a concept of generating a gate signal shown in FIG. 54. As shown in FIG. 55, a gate signal corresponding to the constant output area of a recording pulse is generated using pulse signals PW1 and PW2 that are the components of the recording pulse. That is, as shown in FIGS. 55(b) and 55(c), the pulse signals PW1 and PW2 are generated in synchronization with the clock signal CLK shown in FIG. 55(a), and the inversion signal shown in FIG. 55(d) is generated from the pulse signal PW1.

Further, executing an AND operation of the pulse signal PW2 shown in FIG. 55(c) and the inversion signal shown in FIG. 55(d) of which signal levels are defined as shown in the figures results in the generation of the gate signal shown in FIG. 55(e). As a result, the gate signal obtained in this manner corresponds to the constant output area of the recording pulse.

Figure 56:
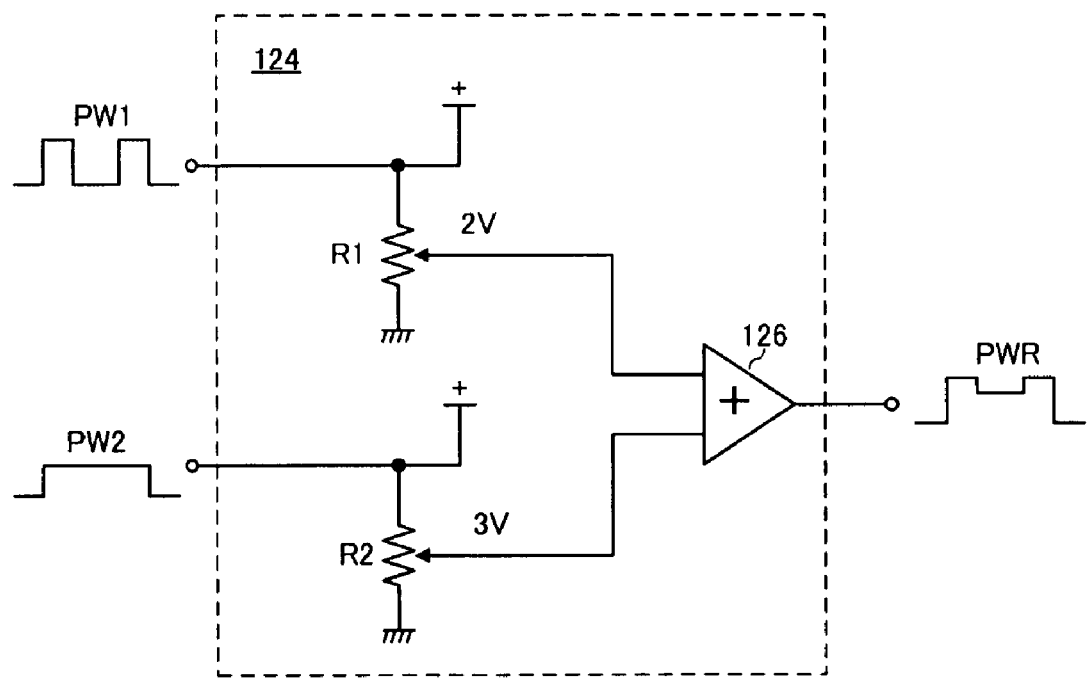
FIG. 56 is a circuit diagram showing an internal configuration of the LD driver shown in FIG. 49.

FIG. 56 is a circuit diagram showing an internal configuration of the LD driver shown in FIG. 49. As shown in FIG. 56, the LD driver 124 is composed of two voltage dividing circuits using resistors R1 and R2 respectively and a synthesizer 126 that synthesizes output voltages from these circuits. The pulse signals PW1 and PW2 generated in the pulse generation circuit 300 are amplified to a predetermined output level through the resistors R1 and R2 respectively, and then ORed in the synthesizer 126, resulting in the generation of a recording pulse PWR, which is output to the laser diode 110 in FIG. 49.

Figure 57:
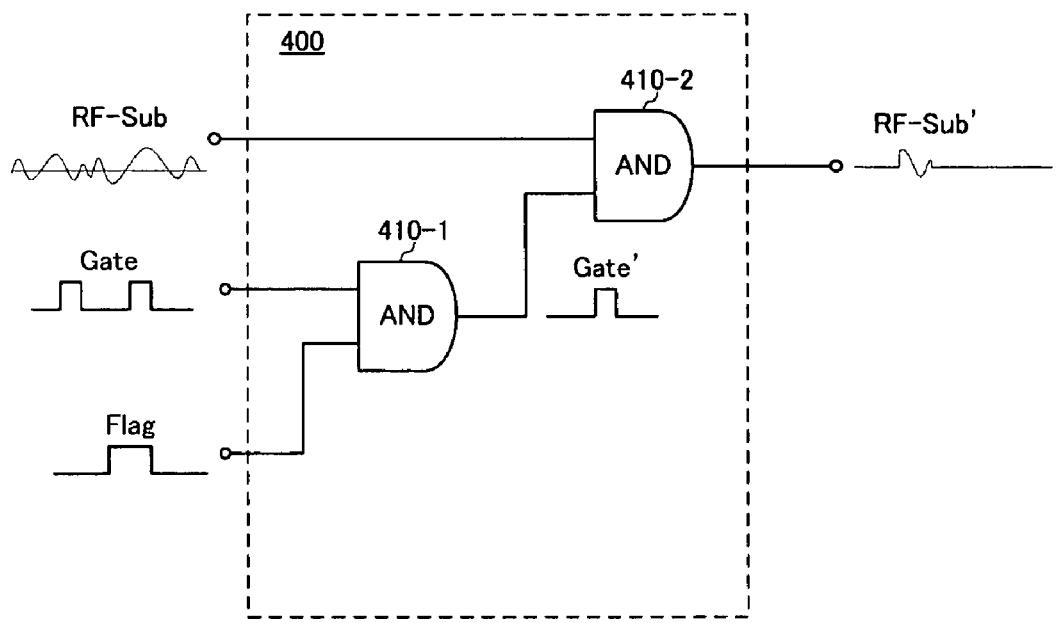
FIG. 57 is a circuit block diagram showing an internal configuration of a mask circuit shown in FIG. 49.

FIG. 57 is a circuit block diagram showing an internal configuration of a mask circuit shown in FIG. 49. As shown in FIG. 57, the mask circuit 400 is comprised of two AND operators 410-1 and 410-2, wherein the first AND operator 410-1 receives a gate signal Gate generated in the pulse generator 300 shown in FIG. 49 and a flag signal Flag generated in the CPU 212 shown in FIG. 49. Subsequently, a gate signal Gate', which is obtained by the AND operation of the gate signal and flag signal, is output into the second AND operator 410-2.

The AND operator 410-2 uses the gate signal Gate' to mask the RF signal RF-Sub reproduced by the second reproduction sub beam 20E output by the detector 122E in FIG. 52, extracts an RF signal RF-Sub' that corresponds to the gate signal Gate', and output the RF signal RF-Sub' to the slicer 210 in FIG. 49. As a result, since the RF signal RF-Sub' reproduced in the constant output area of a recording pulse is selectively extracted, a pit detection with high precision can be conducted.

Then, according to the detected pit length and phase information, the CPU 212 in FIG. 49 determines correction conditions for a strategy and corrects strategy conditions output to the pulse generator 300. As a result, a realtime correction with which recording conditions are corrected during data recording is made.

Figure 58:
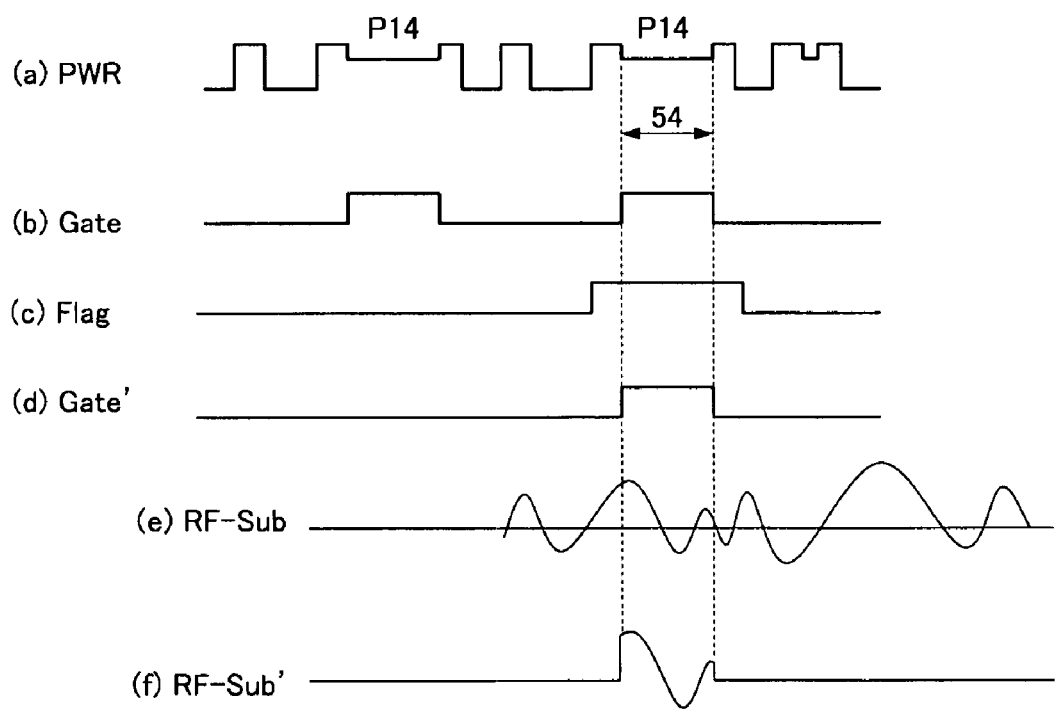
FIG. 58 is a timing diagram showing a relationship between recording pulses, gate pulses, and a reproduction signal.

FIG. 58 is a timing diagram showing a relationship between recording pulses, gate pulses, and a reproduction signal. As shown in FIG. 58(a), the recording pulse PWR shows a pulse pattern wherein ON/OFF states are altered according to the predetermined data pattern. Assuming that the constant output area 54 corresponding to data for a 14T pit that has the longest unmodulation area is used as a gate signal, the gate signal Gate generated in the pulse generator 300 in FIG. 49 is output on the timing shown in FIG. 58(b), the flag signal Flag generated in the CPU 212 shown in FIG. 49 is output on the timing shown in FIG. 58(c), and the gate signal Gate' generated in the mask circuit 400 shown in FIG. 57 is output on the timing shown in FIG. 58(d). Extracting the RF signal in FIG. 58(e) using the gate signal Gate' results in the generation of the RF-Sub' signal in FIG. 58(f).

As described, since the consequently extracted reproduction signal RF-Sub' is a signal reproduced in the constant output area 54 of the recording pulse PWR, accurate detection of pits is possible by using this signal, and thus, a strategy can be corrected more precisely.

Figures 59, 60:
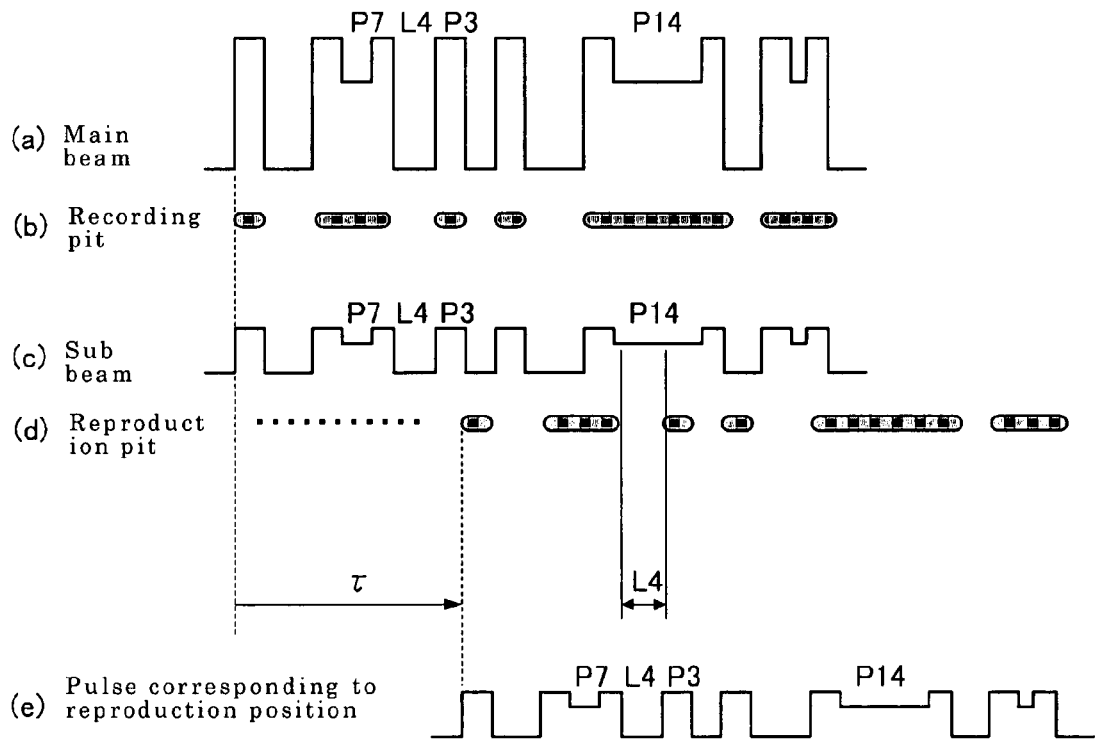
FIG. 59 is a schematic diagram showing a procedure for the flag signal generation executed in the CPU shown in FIG. 49.
FIG. 60 is a timing diagram showing a relationship between a recording main beam and a reproduction sub beam.

FIG. 59 is a schematic diagram showing a procedure for the flag signal generation executed in the CPU shown in FIG. 49.

The example shown in the figure presents the case of selectively detecting a 4T space present in the constant output area 54 corresponding to data for a 14T pit. As shown in the figure, CPU 212 sequentially accumulates numeric values corresponding to the data lengths of recording pulses into a memory 214, specifies data wherein a 4T space (indicated as "L4" in the figure) is present in the constant output area 54 corresponding to the data for a 14T pit (indicated as "P14" in the figure), and flags the data for the specified 14T pit.

When the time difference between a recording main beam and a reproduction sub beam is defined as □, the CPU 212 converts the time difference □ into clock counts and compares the data length existing between the 14T pit and 4T space with the time difference □. As a result, if 4T space data is present in an area apart from the 14T pit by the time difference □ and within an area corresponding to the constant output area for the 14T pit, the 14T pit is flagged, and the flag signal Flag is output on the timing shown in FIG. 58.

FIG. 60 is a timing diagram showing a relationship between a recording main beam and a reproduction sub beam. As shown in FIG. 60(a), the output of the recording main beam forms a high-output pulse pattern necessary for forming pits. Consequently, a pit pattern formed on an optical disk by the pulse irradiation is in the shape just as shown in FIG. 60(b).

On the other hand, as shown in FIG. 60(c), the reproduction sub beam is output on the same timing as the output of the recording main beam and forms a pulse pattern of which an output is smaller than that of recording main beam by the amount of a branching ratio. The pit pattern reproduced by the reproduction sub beam forms, as shown in FIG. 60(d), a pattern delayed in terms of time from the pit pattern being recorded by the time difference τ.

Consequently, in the case of detecting a 4T space reproduced while recording a 14T pit, as shown in FIG. 60(e), it is only necessary to detect a position, at which a 4T space in the pulse pattern obtained by delaying the recording pulse pattern by the time difference τ overlaps with the constant output area for a 14T pit in the recording pulse. That is, a first gate signal is generated from the constant output area for a longer pit within the recording pulse as well as generating a second gate signal from the pulse for a short pit or space to be detected in the pulse pattern obtained by delaying the recording pulse pattern by the time difference □. Configuring to mask an RF signal obtained from the reproduction sub beam using these first and second gate signals is useful.

Figure 61:
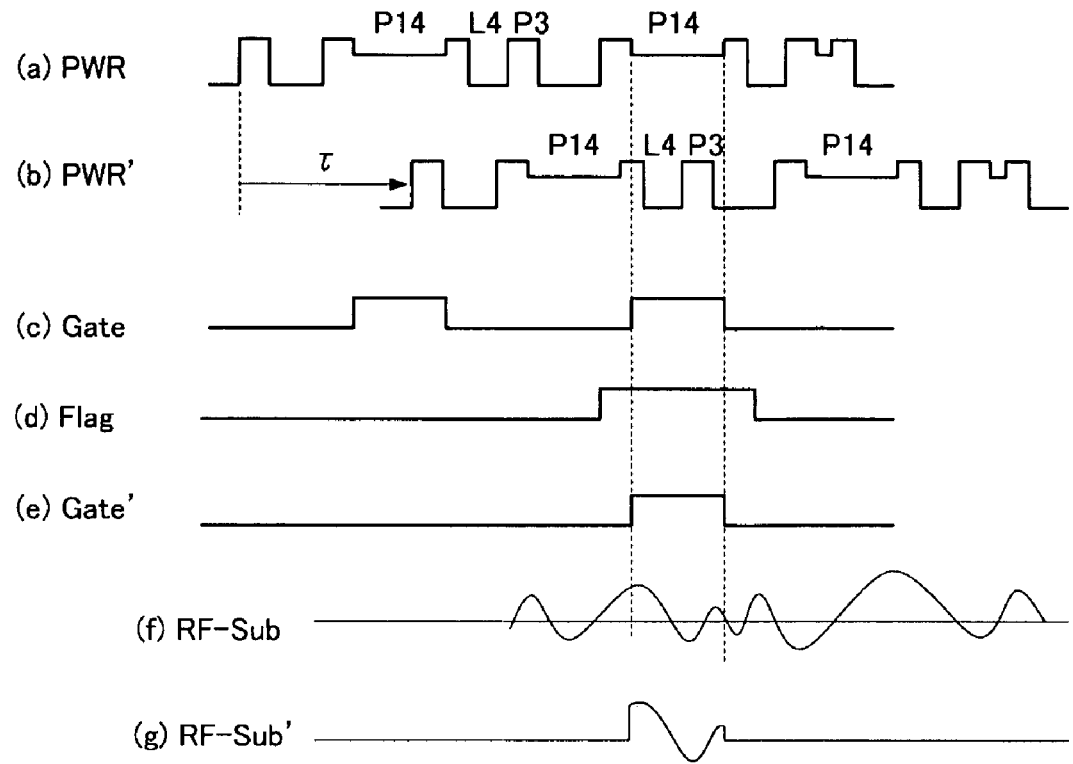
FIG. 61 is a timing diagram showing a relationship between a recording pulse pattern, a pulse pattern obtained by delaying the recording pulse pattern, and an RF signal.

FIG. 61 is a timing diagram showing a relationship between a recording pulse pattern, a pulse pattern obtained by delaying the recording pulse pattern, and an RF signal. As shown in FIG. 61, a pulse pattern PWR' is generated by delaying the recording pulse pattern PWR by the amount of time □. Defining a section at which the space 4T of the delayed pulse PWR' falls within the constant output area for a 14T pit in the recording pulse pattern PWR as a gate signal Gate' enables a short pit or space to be selectively detected while recording a long pit. Consequently, shifts in pit length or phases can be precisely detected.

Figure 62:
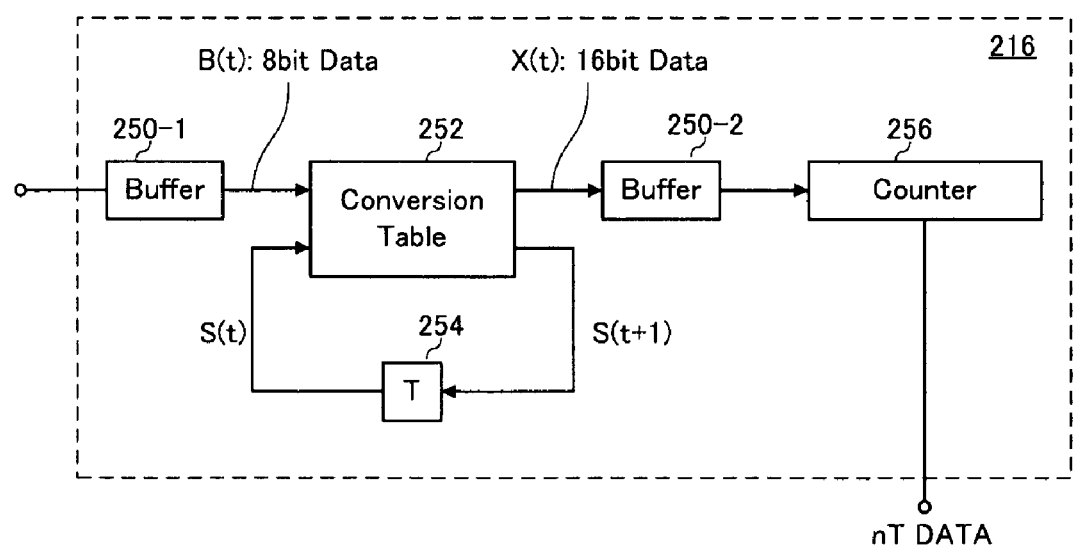
FIG. 62 is a block diagram showing an example of a method for detecting a shorter pit or space while recording a longer pit.

FIG. 62 is a block diagram showing an example of a method for detecting a shorter pit or space while recording a longer pit. The diagram shows a sample configuration for the case of detecting, by using the EFM encoder/decoder 216 shown in FIG. 49, a 4T space that is present under the sub beam while the main beam is recording 14T pit.

In the above-described configuration, as shown in FIG. 62, the EFM encoder/decoder 216 temporarily accumulates an 8-bit binarized signal received from the slicer 210 in FIG. 49 into a buffer 250-1 and then converts the 8-bit data into 16-bit data according to the conversion table 252 to output into a buffer 250-2. In this process, a delay unit 254 conducts a delay operation by time T for each of the conversions.

The data accumulated in the buffer 250-2 are output into a counter 256, which are then output into the pulse generator 300 through the CPU 212 shown in FIG. 49 as the data indicating a pulse length nT (n: 3 to 14), resulting in the generation of a recording pulse pattern corresponding to the data.

Figure 63:
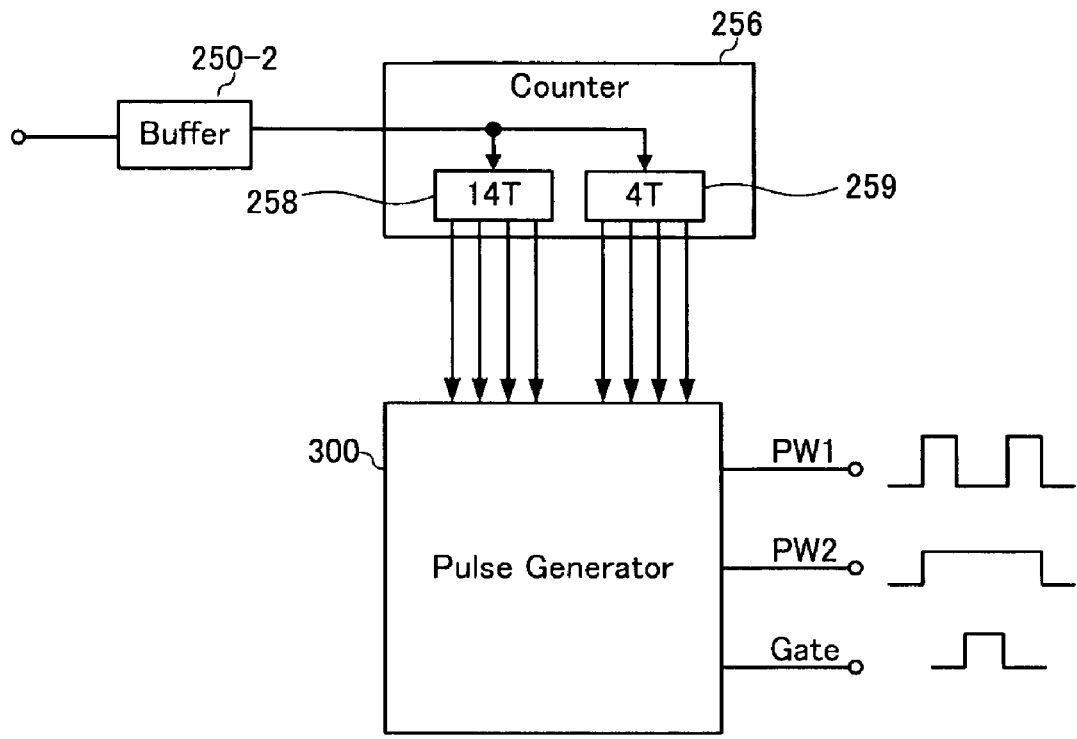
FIG. 63 is a block diagram showing a relationship between the counter 256 shown in FIG. 62 and the pulse generation circuit 300 shown in FIG. 49.

FIG. 63 is a block diagram showing a positional relationship between the counter 256 shown in FIG. 62 and the pulse generator 300 shown in FIG. 49. As shown in FIG. 63, the counter 256 comprises a 14T decoder 258 and a 4T decoder 259 that specify bit streams respectively corresponding to a 14 pit and a 4T space in a data stream flowing from the buffer 250-2 to the pulse generator 300.

Figure 64:
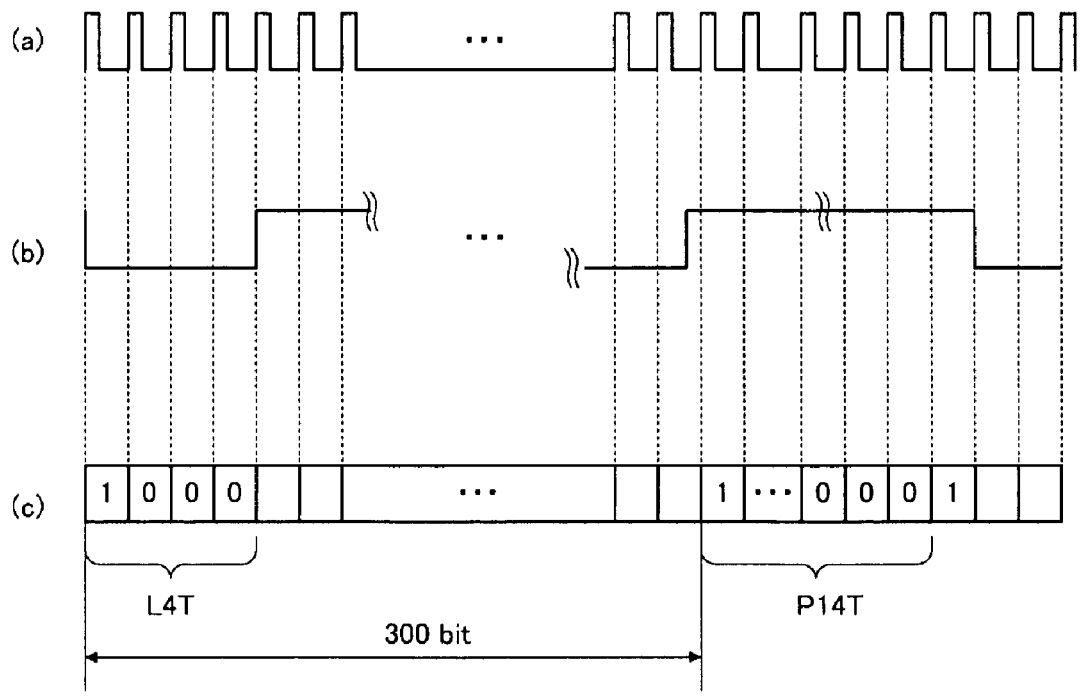
FIG. 64 is a schematic diagram showing an example of the case wherein the buffer 250-2 shown in FIG. 62 accumulates bit streams.

FIG. 64 is a schematic diagram showing an example of the case wherein the buffer 250-2 shown in FIG. 62 accumulates bit streams. As shown in FIG. 64(c), the buffer 250-2 stores data indicating pit or space lengths in synchronization with a clock signal shown in FIG. 64(a).

For instance, a length of 3T is represented as "100," that of 4T as "1000," that of 5T as "10000," and that of 14T as "10000000000000."

Accordingly, when pulses just as shown in FIG. 64(b) are input, bit streams to be stored for a 4T space and a 14 pit into the buffer 250-2 are, as shown in FIG. 64(c), "1000"and "10000000000000" respectively, and thus, each of the pulse widths is accumulated in the form of the number of bits.

If the interval between the recording main beam and the reproduction sub beam corresponds to 300 bits, as shown in FIG. 64(c), the position of a 14T pit currently being recorded is specified in a bit stream accumulated in the buffer 250-2, whereby it is determined whether or not a bit stream for a 4T space is present at the position separate from the 14T pit by the 300 bits.

As a result, if a bit stream for the 4T space is present, it is considered that this timing allows the sub beam to detect a 4T space while the main beam is recording the 14T pit, and a signal obtained with the timing is used to determine conditions of realtime correction.

Figure 65:
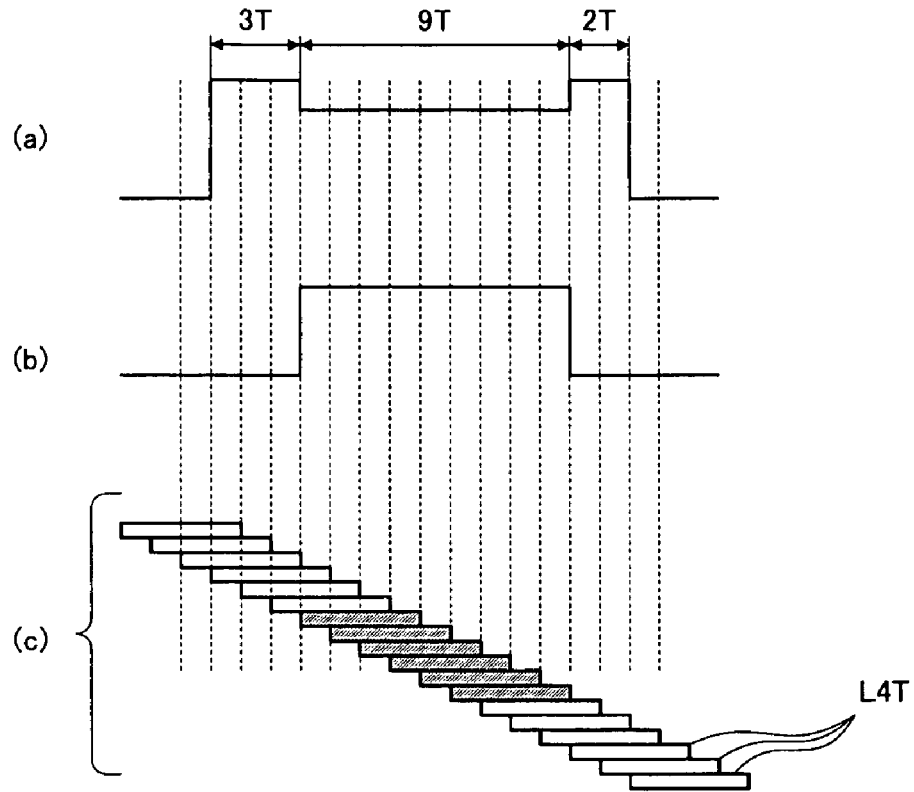
FIG. 65 is a schematic diagram showing variable possibilities for the presence of a 4T space to be detected while recording a 14T pit.

FIG. 65 is a schematic diagram showing variable possibilities for the presence of a 4T space to be detected while recording a 14T pit. As shown in FIG. 65(a), a 4T space within a constant output area is to be detected when the recording pulse for a 14T pit is comprised of a high-output 3T pulse, constant-output 9T pulse, and high-output 2T pulse.

Thus, it is most preferable to extract the 4T space that appears at the center part of the 14T pulse. However, since the appearance rate of the 4T space is low, a counter circuit is configured to extract a 4T space of which either side is within the constant output area for the 14T pit.

For instance, after a gate signal shown in FIG. 65(b) is generated from a 14T pit pulse shown in FIG. 65(a) and a data pattern that can specify a 4T space within the gate signal (hatched area shown in FIG. 65(c)) is prepared, a bit stream that matches the data pattern is extracted.

Figure 66:
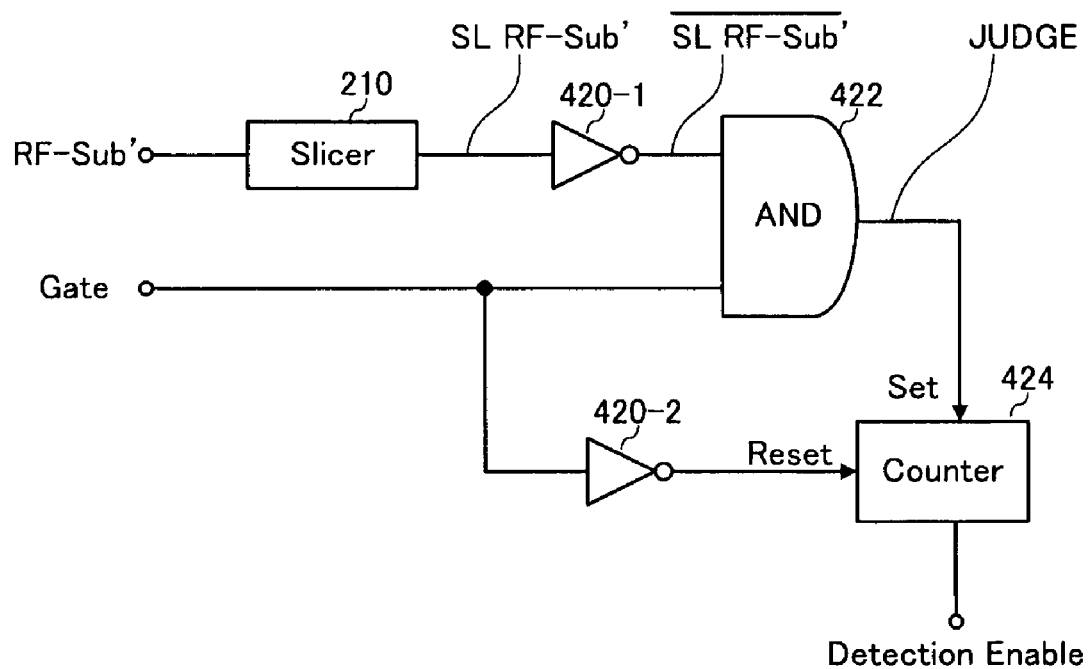
FIG. 66 is a block diagram showing another example of a method for detecting a short pit or space while recording a long pit.

FIG. 66 is a block diagram showing another example of a method for detecting a short pit or space while recording a long pit. FIG. 66 shows an example where it is determined based on the number of pulses generated within certain period of time whether or not a short pit or space is present while recording a longer pit.

In the circuit block diagram shown in FIG. 66, a binarized signal SL RF-Sub' output from the slicer 210 is input into an AND operator 422 via an inversion circuit 420-1 as well as inputting a gate signal Gate output from the pulse generator 300 in FIG. 49 into the AND operator 422.

The AND operator 422 then outputs the AND of the received signals to a set terminal of a counter 424, and upon receipt of the signal, the counter 424 counts the number of pulses generated within an interval indicated by a gate signal inverted in an inversion circuit 420-2. Subsequently, the count result is output into the CPU 212 shown in FIG. 49 as a determination signal of "Detection Enable." In addition, the gate signal inverted in the inversion circuit 420-2 is used as a reset signal for the counter 424.

The CPU 212 determines the presence or absence of 4T space while recording a 14T pit, based on whether or not the number of pulses suggested by the determination signal exceeds the predetermined value, e.g., 2 or more. When a 4T space is determined to be present, a signal obtained from the 4T space is retrieved.

Figure 67:
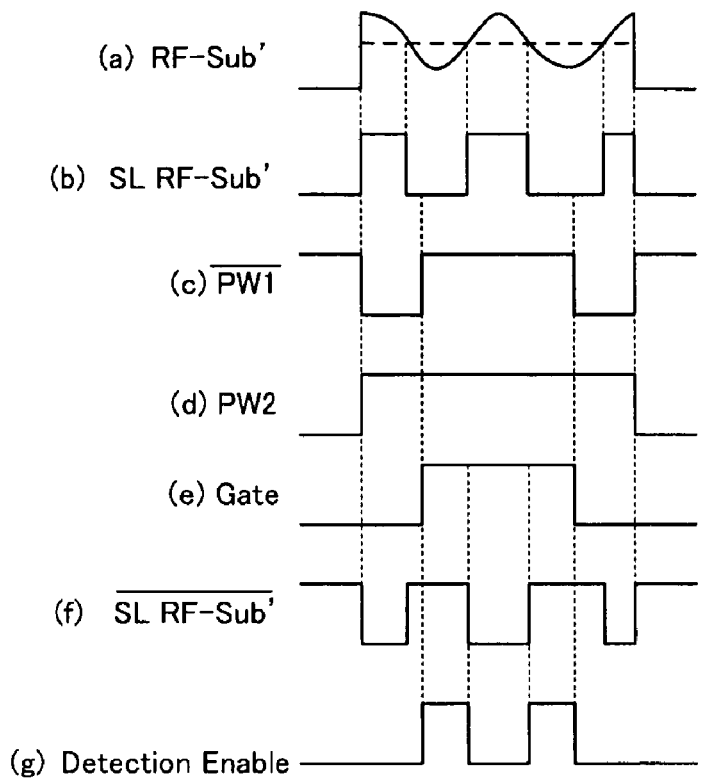
FIG. 67 is a timing diagram showing an exemplary process in a circuit block shown in FIG. 66.

FIG. 67 is a timing diagram showing an exemplary process in a circuit block shown in FIG. 66. As shown in FIG. 67(a), a signal RF-Sub' input to the slicer 210 is binarized at a certain level, resulting in the generation of a pulse signal SL RF-Sub' just as shown in FIG. 67(b).

Then, ANDing the gate signal Gate shown in FIG. 67(e) by the inversion signal shown in FIG. 67(f) results in the generation of a determination signal of "Detection Enable" shown in FIG. 6, wherein the gate signal Gate is generated in the pulse generation circuit 300 shown in FIG. 49 using the signals shown in FIGS. 67(c) and (d); and the inversion signal is generated in the inversion circuit 420-1.

Figure 68:
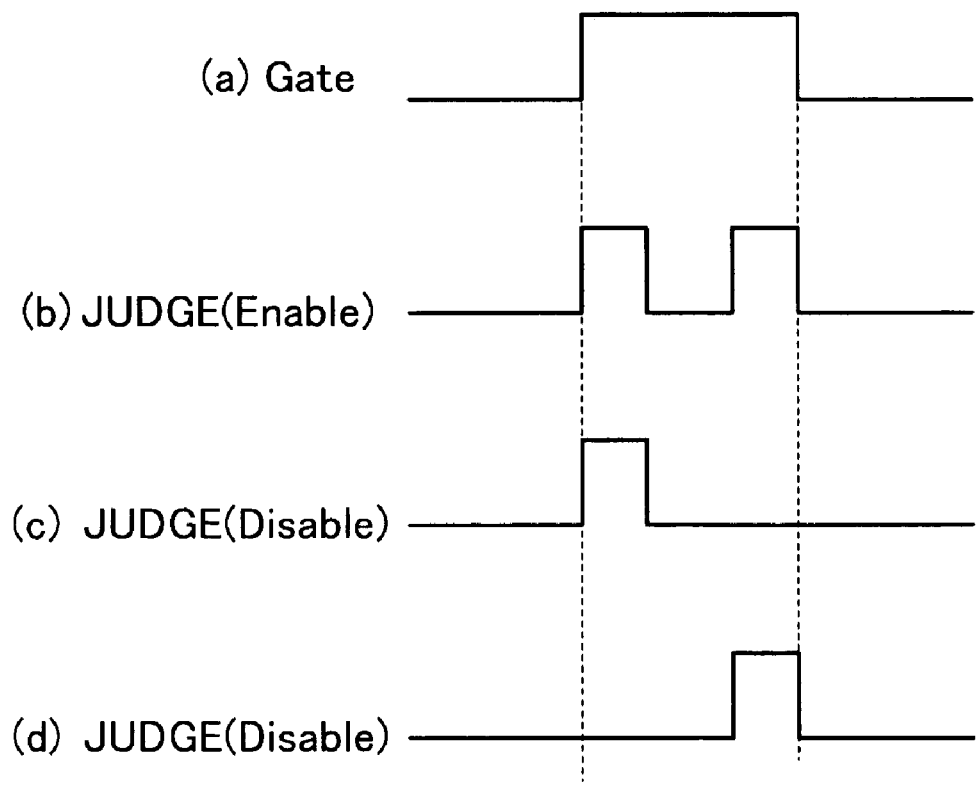
FIG. 68 is a schematic diagram showing the criteria in a determination signal generated in the circuit block shown in FIG. 66.

FIG. 68 is a schematic diagram showing a criterion in a determination signal generated in the circuit block shown in FIG. 66. As shown in the example of FIG. 68, when two or more pulses are counted within the section shown in FIG. 68(a), one of the 3T to 7T spaces, for instance, falling within the pulse length of the gate signal Gate that represents the constant area having 14T is determined to be present while recording a 14T pit, resulting in retrieving a signal obtained from the 4T space.

Thus, as shown in FIG. 68(b), when a pulse is counted twice within the gate signal, one of the 3T to 7T spaces, for instance, falling within the pulse length of the gate signal Gate that represents the constant area having 14T is determined to be present while recording a 14T pit, resulting in retrieving a signal obtained from the 4T space. On the contrary, when a pulse is counted only one time as shown in FIGS. 68(c) and (d), a 4T space is determined not to be present while recording a 14T pit, and thus, no signal is retrieved.

Figure 69:
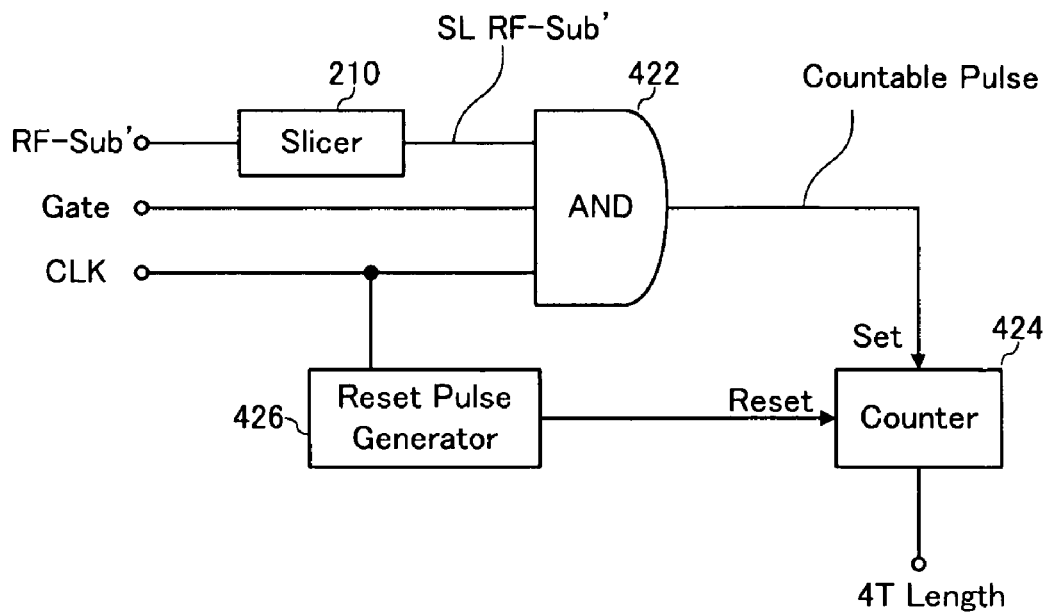
FIG. 69 is a block diagram showing still another example of a method for detecting a short pit or space while recording a long pit.

FIG. 69 is a block diagram showing still another example of a method for detecting a short pit or space while recording a long pit. In the example shown in FIG. 69, a length of pulse generated in a gate signal is measured to determine whether or not a short pit or space is present while recording a long pit.

In the circuit block shown in FIG. 69, the AND operator 422 obtains the AND of a binarized signal SL RF-Sub' output from the slicer 210, a gate signal Gate output from the pulse generation circuit shown in FIG. 49, and a clock signal CLK. Then, the obtained AND is transmitted to the set terminal of the counter 424 as a countable signal of "Countable Pulse," and the counter 424 counts the length of the signal. In addition, the counter 424 also receives a reset pulse generated in a reset pulse generator 426.

Figure 70:
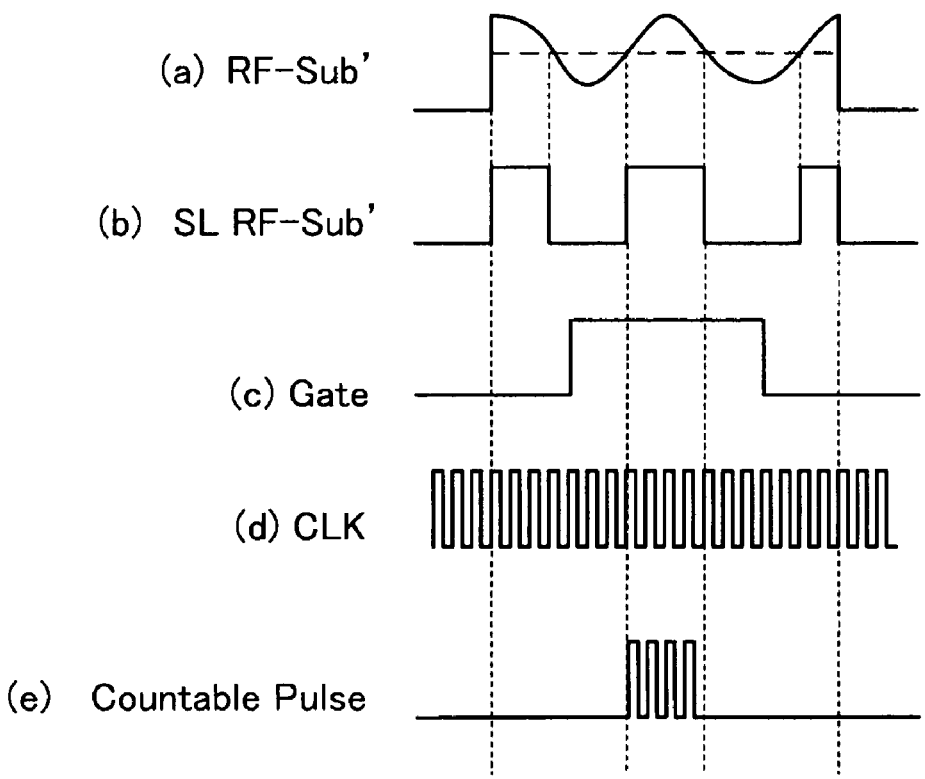
FIG. 70 is a timing diagram showing an exemplary process in the circuit block shown in FIG. 69.

FIG. 70 is a timing diagram showing an exemplary process in the circuit block shown in FIG. 69. As shown in FIG. 70(a), a signal RF-Sub' input to the slicer 210 is binarized at a certain level, and a pulse signal SL RF-Sub' shown in FIG. 70(b) is generated.

Then, ANDing a logical product of a gate signal Gate shown in FIG. 70(c) generated from the pulse generation circuit 300 shown in FIG. 49 by a clock signal CLK shown in FIG. 70(d) results in the generation of a countable signal of "Countable Pulse" shown in FIG. 70(e). In addition, the clock signal exemplifies the case of "1T=1cycle"; however, a clock signal with higher speed, "1T=40 cycles" clock for instance, may be used to improve the resolution in detecting lengths.

Figure 71:
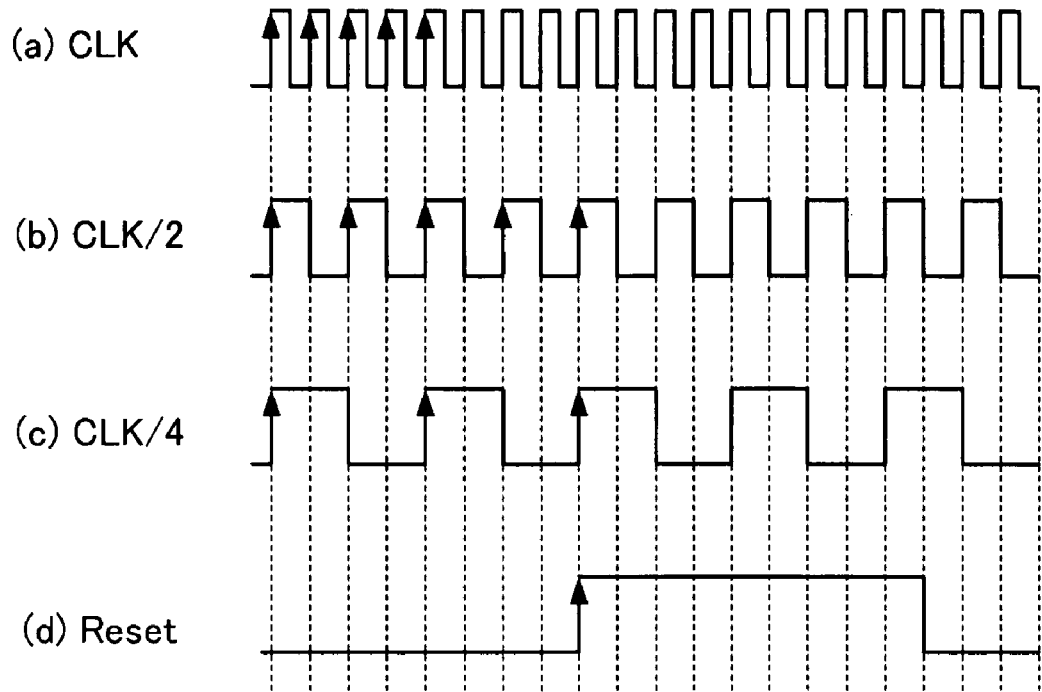
FIG. 71 is a timing diagram showing an exemplary process in the reset pulse generator 426 shown in FIG. 69.

FIG. 71 is a timing diagram showing an exemplary process in the reset pulse generator 426 shown in FIG. 69. As shown in FIG. 71, the reset pulse generator 426 generates an intermediate signal CLK/2 shown in FIG. 71(b) by counting every other pulse in a clock signal CLK as shown in FIG. 71(a). Further, by counting every other pulse in the intermediate signal CLK/2, an intermediate signal CLK/4 shown in FIG. 71(c) is generated.

Subsequently, as shown in FIG. 71(c), a reset signal Reset is generated, wherein the pulse in the reset signal Reset rises in synchronization with the rise time of the third pulse in the intermediate signal CLK/4 as shown in FIG. 71(c) and falls at the time when the time duration corresponding to a pulse length of the gate signal Gate elapses after the pulse in the reset signal Reset rises. When the reset signal enters into the reset terminal of the counter 424 shown in FIG. 69, the count results in the counter are reset.

For instance, when using a signal having "1T=40 cycles" as the clock signal shown in FIG. 71(a) and having a pulse width of 9T in a gate signal Gate, the reset signal Reset shown in FIG. 71(d) falls after 360 clocks are counted, resulting in the reset of the counter 424.

In the same manner, when a signal having "1T=2.5 cycles" is used as the clock signal shown in FIG. 71(a) and the gate signal Gate has a pulse width of 9T, the reset signal Reset shown in FIG. 71(d) falls after 22.5 clocks are counted, resulting in the reset of the counter 424. However, when the cycle of the clock signal is not an integral multiple of the unit length T, such as "1T=2.5 cycles," the cycle is treated as an integral multiple by applying integers such as "2T=5 cycles."

Figure 72:
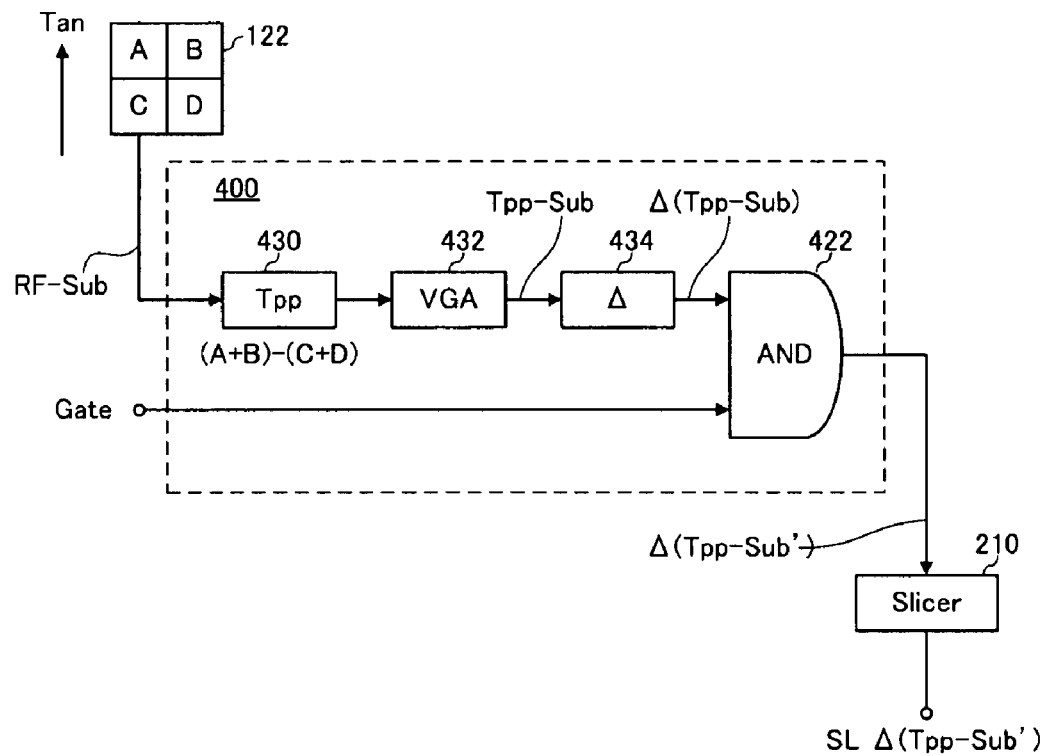
FIG. 72 is a circuit block diagram showing another example of configuring the mask circuit shown in FIG. 49.

FIG. 72 is a circuit block diagram showing another example of configuring the mask circuit shown in FIG. 49. A mask circuit shown in FIG. 72 exemplifies the detection of lengths using a tangential push-pull signal Tpp.

As shown in FIG. 72, the mask circuit 400 is comprised of: a tangential push-pull signal generator 430 that generates a tangential push-pull signal Tpp using a signal received from the detector 122 having four divisions; a VGA (Volume Gain Amp) circuit 432 that adjust the amplitude of the tangential push-pull signal Tpp to be constant; a differentiating circuit 434 that differentiates the tangential push-pull signal Tpp; and an AND operator 422 that obtains the AND of the derivative value of the tangential push-pull signal Tpp and the gate signal Gate.

When the four divisions of the detector 122 are defined as A, B, C, and D relative to the tangential direction Tan of rotation of an optical disk as shown in the figure, the tangential push-pull signal generator 430 determines the difference between the sum of the signals obtained from the divisions A and B that are on the front side of the rotational direction and the sum of the signals obtained from the divisions C and D that are on the rear side of the rotational direction, and outputs the determined differential signal as a tangential push-pull signal Tpp. An equation showing the relationship is expressed by "Tpp=(A+B)−(C+D)" as shown in the figure.

The VGA circuit 432 generates a signal Tpp-Sub wherein the amplitude of the tangential push-pull signal Tpp is adjusted to be constant. Then the differentiating circuit 434 receives and differentiates the signal Tpp-Sub to generate a signal Δ(Tpp-Sub).

ANDing the signal Δ(Tpp-Sub) by a gate signal Gate in the AND operator 422 results in the extraction of a signal Δ(Tpp-Sub') which corresponds to a stable optical output area of a recording pulse. Then, the slicer 210 slices the signal Δ(Tpp-Sub') at a zero level and generates a signal SL Δ(Tpp-Sub').

Figure 73:
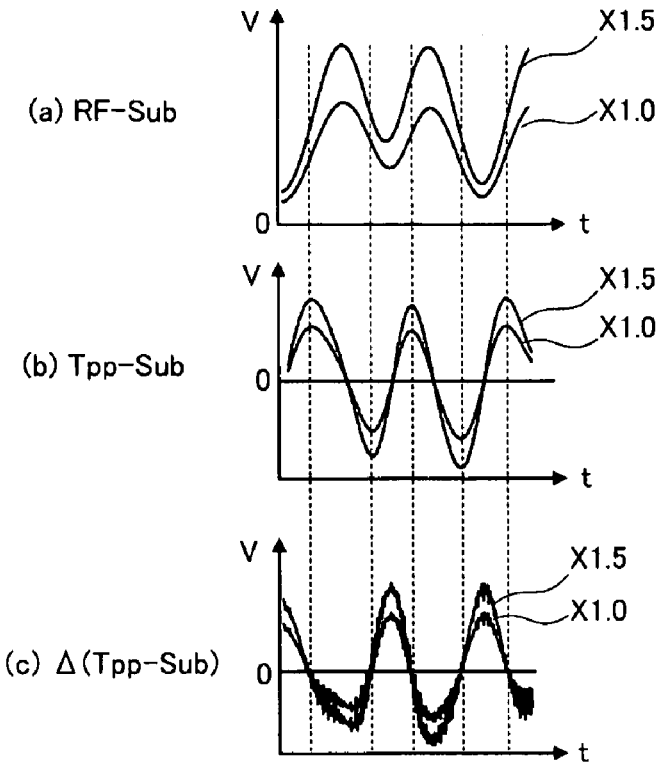
FIG. 73 is a first timing diagram showing the operation of the circuit shown in FIG. 72.

FIG. 73 is a first timing diagram showing the operation of the circuit shown in FIG. 72. As shown in FIG. 73(*a*), RF signals detected by the detector shown in FIG. 72 form different waveforms with different amplitudes and zero points for a signal at ×1 recording speed (indicated as "×1.0" in the figure) and a signal at ×1.5 recording speed (indicated as "×1.5" in the figure) respectively.

Also, the tangential push-pull signals Tpp-Sub output from the VGA circuit 432 shown in FIG. 72 form different waveforms, as shown in FIG. 73(*b*), with different amplitudes but same zero point for a signal at ×1 recording speed (indicated as "×1.0" in the figure) and a signal at ×1.5 recording speed (indicated as "×1.5" in the figure) respectively. The zero points of the tangential push-pull signals Tpp-Sub corresponds to the peak positions of the RF signals RF-Sub shown in FIG. 73(*a*).

Also, the derivative values Δ(Tpp-Sub) of the tangential push-pull signals output from the differentiating circuit 434 shown in FIG. 72 form different waveforms, as shown in FIG. 73(*c*), with different amplitudes but same zero point for a signal at ×1 recording speed (indicated as "×1.0" in the figure) and a signal at ×1.5 recording speed (indicated as "×1.5" in the figure) respectively. The zero point of the derivative value Δ(Tpp-Sub) of the tangential push-pull signals corresponds to the peak positions of the tangential push-pull signals Tpp-Sub shown in FIG. 73(*b*) and to the positions at which the gradients of the RF signals RF-Sub shown in FIG. 73(*a*) are maximum.

Figure 74:
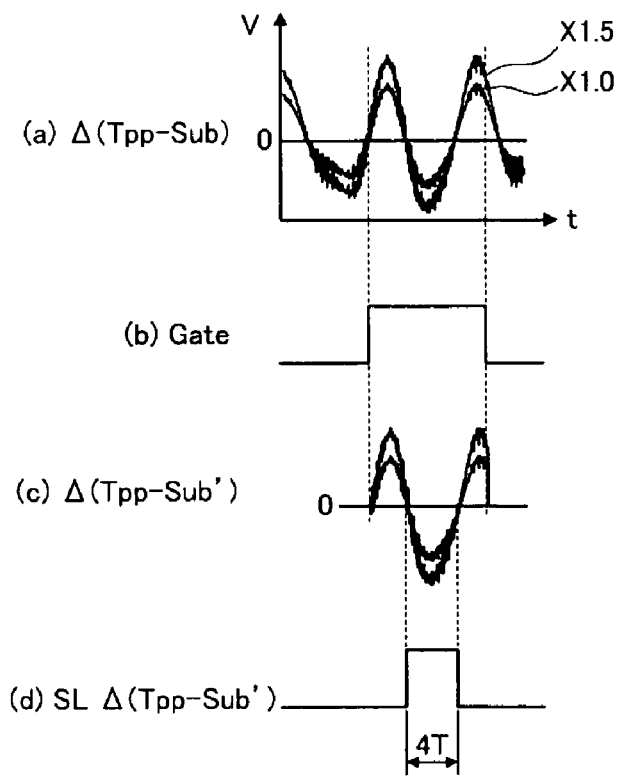
FIG. 74 is a second timing diagram showing the operation of the circuit shown in FIG. 72.

FIG. 74 is a second timing diagram showing the operation of the circuit shown in FIG. 72. FIG. 74(*a*) is a diagram showing the derivative values Δ(Tpp-Sub) of the tangential push-pull signals output from the differentiating circuit 434 shown in FIG. 72, and the derivative values are masked by the gate signal Gate shown in FIG. 74(*b*). Then, as shown in FIG. 74(*c*), masking the derivative values Δ(Tpp-Sub) of the tangential push-pull signals results in the extraction of a signals Δ(Tpp-Sub') by the gate signal Gate.

Subsequently, the slicer 210 shown in FIG. 72 extracts a zero crossing point of the signals Δ(Tpp-Sub') and a pulse signal SL Δ(Tpp-Sub') just as shown in FIG. 74(*d*) is generated. This pulse signal is used as the short pit or space signal present in the constant high-output area of the above-described recording pulse, and in the above example, it is used as the detection signal having a 4T space.

With a configuration wherein a pit or space length is detected using the derivative value of a tangential push-pull signal as described above, a shift length is detected in realtime and corrected during recording.

The use of the derivative value of a tangential push-pull signal alone as described above is not satisfactory for detecting an accurate length because of the interference of short signals such as 3T and 4T.

Thus, the present embodiment is configured to have the steps of: preliminarily obtaining a derivative value of a tangential push-pull signal as a reference correction value by test recording onto a test area; reproducing with a reproduction laser beam a pit or space recorded with a recording laser beam when conducting an actual recording onto a recording area; obtaining a derivative value of a tangential push-pull signal from the reproduced signal; considering the difference between the derivative values obtained in the recording area and in the test area respectively as a shift length; and setting a recording condition appropriate for correcting the shift length.

Figure 75:
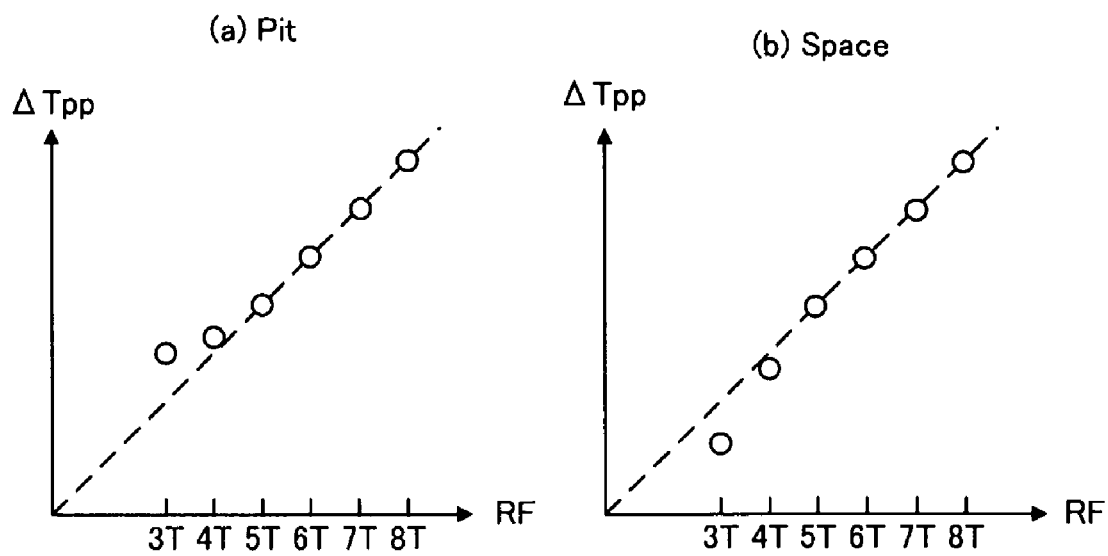
FIG. 75 is a graph showing the relationship between the derivative value of a tangential push-pull signal and an actual physical length, in terms of a pit or space obtained in a test area.

FIG. 75 is a graph showing the relationship between the derivative value of a tangential push-pull signal and an actual physical length, in terms of a pit or space obtained in a test area. As shown in FIG. 75(*a*), when a pit having a length of 3T to 8T is formed in a test area by a test recording for instance, the derivative value of a tangential push-pull signal corresponding to each pit length can be obtained, with which a prediction of the length of each pit is possible. For relatively longer pits having 5T to 8T, lengths corresponding to proper physical lengths illustrated by the dotted line in FIG. 75(*a*) are obtained. However, for shorter 3T and 4T pits that are easily interfered, lengths different from the corresponding proper physical lengths are detected.

Similarly, as shown in FIG. 75(*b*), when a space having 3T to 8T is formed by a test recording for instance, the derivative value of a tangential push-pull signal corresponding to each pit length can be obtained, which enables to predict the length of each pit. For relatively longer pits having 5T to 8T, lengths corresponding to proper physical lengths illustrated by the dotted line in FIG. 75(*a*) are obtained. However, for shorter pits having 3T and 4T that are easily interfered, lengths different from the corresponding proper physical lengths are detected.

Accordingly, using a slope obtained from the derivative value of a tangential push-pull signal corresponding to each pit length or that corresponding to each space length as a correction reference enables the effect of interference to be prevented.

Figure 76:
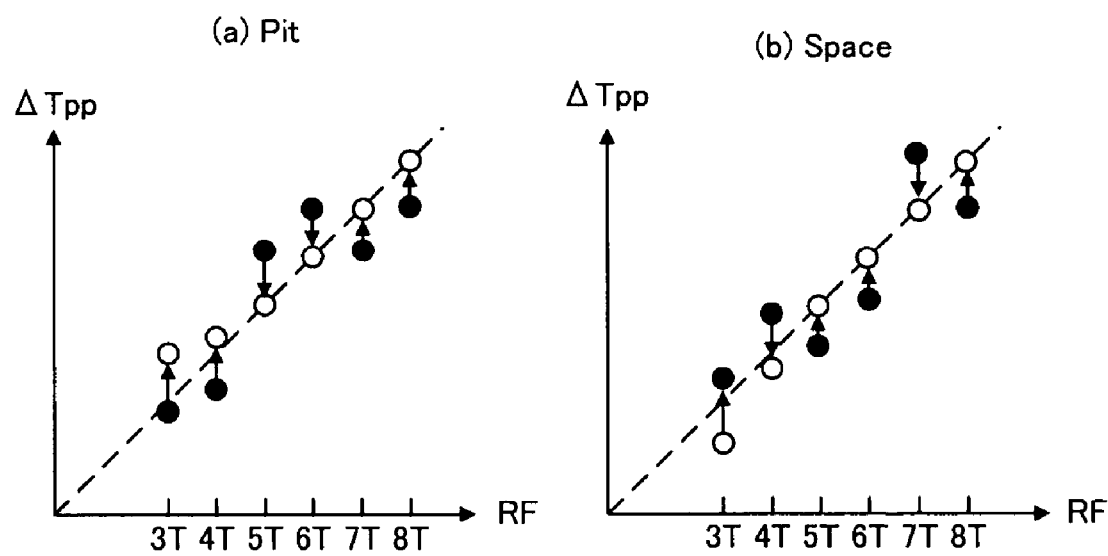
FIG. 76 is a graph showing the relationship between two derivative values of tangential push-pull signals obtained in a recording area and a test area respectively in terms of a pit and space length.

FIG. 76 is a graph showing the relationship between two derivative values of tangential push-pull signals obtained in a recording area and a test area respectively in terms of a pit and space length. As shown in FIG. 76(*a*), when a pit pattern having 3T to 8T is reproduced while recording it onto a recording area by a recording laser beam, the derivative values of tangential push-pull signals corresponding to respective pit lengths indicated by solid circles in FIG. 76(*a*) are obtained. Correcting these derivative values by matching them to the corresponding derivative values obtained in a test area (indicated by blank circles in the figure) enables the formation of a recording pattern comprised of pits and spaces having respective proper physical lengths.

Similarly, as shown in FIG. 76(*b*), when a space pattern having 3T to 8T is reproduced while recording it onto a recording area by a recording laser beam, the derivative values of tangential push-pull signals corresponding to respective space lengths indicated by solid circles in FIG. 76(*b*) are obtained. Correcting these derivative values by matching them to the derivative values obtained in a test area (indicated by blank circles in the figure) enables the formation of a recording pattern comprised of pits and spaces having respective proper physical lengths.

FIG. 77 is a schematic diagram showing an example of test recording to obtain the derivative value of a tangential push-pull signal in a test area. As shown in FIG. 77, by conducting the test recording with a detection pattern that can detect a front-side phase shift, a back-side phase shift, or a shift due to heat interference of recording pulses, a RF length a01 to a15 and the derivative value of a tangential push-pull signal b01 to b15 are obtained for each pit or space length, and the obtained lengths and values are then stored into a predetermined recording area.

FIG. 78 is a schematic diagram showing an example of test recording to obtain the derivative value of a tangential push-pull signal in a recording area. As shown in FIG. 78, by extracting a pattern that can detect a front-side phase shift, a back-side phase shift, or a shift due to heat interference of recording pulses from the pit and space patterns formed on a recording area, the derivative value c01 to c15 of a tangential push-pull signal and that d01 to d15 obtained by the test recording shown in FIG. 77 for each pit or space length are determined and then stored into a predetermined storage area.

Figure 79:
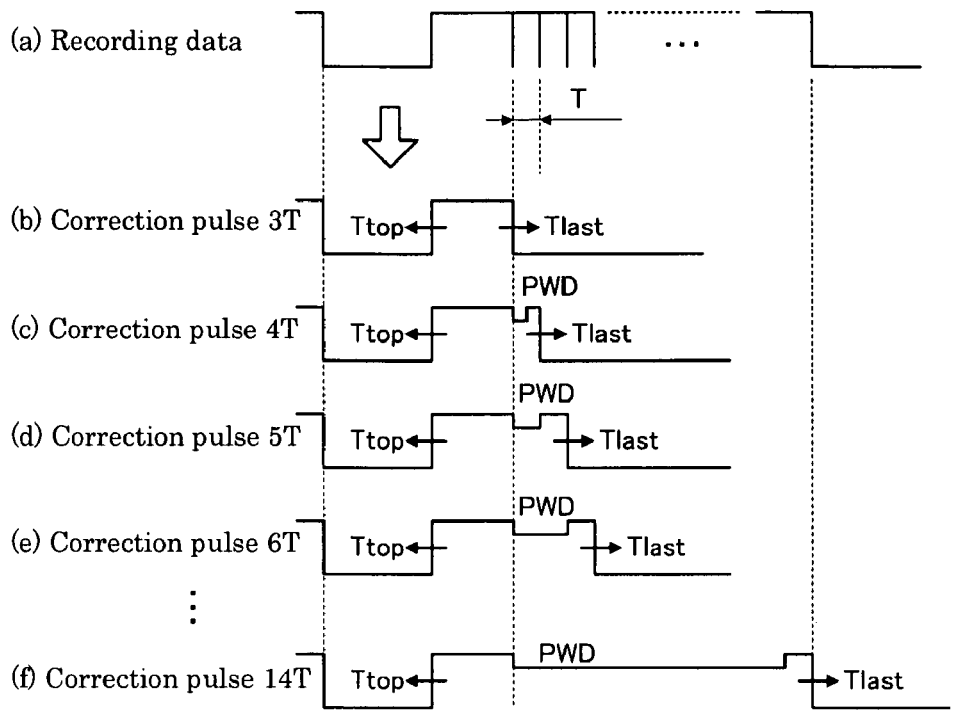
FIG. 79 is a schematic diagram showing an example of correcting a recording pulse using each of the differences in tangential push-pull signals shown in FIG. 78.

FIG. 79 is a schematic diagram showing an example of correcting a recording pulse using each of the derivative values of the tangential push-pull signals shown in FIG. 78. As shown in FIG. 79(a) to (f), in the case of recording data shown in FIG. 79(a) onto an optical disk, a strategy applied with an optimum correction value is set for each pit length. For instance, when a 3T pit is recorded as shown in FIG. 79(b), a front-side correction value Ttop for the front-side phase shift of a 3T pit in the stored data shown in FIG. 78 is read out as well as reading out a back-side correction value Tlast for the back-side phase shift of a 3T pit in the data, and both sides of the recording pulse are corrected with the Ttop and Tlast respectively.

Also, in the case of correcting a shift length of a 4T or longer pit, besides the Ttop and Tlast, a pulse height PWD in a constant area of a corresponding pit is used to correct a pulse shape as shown in FIGS. 79(c) to (f).

Figure 80:
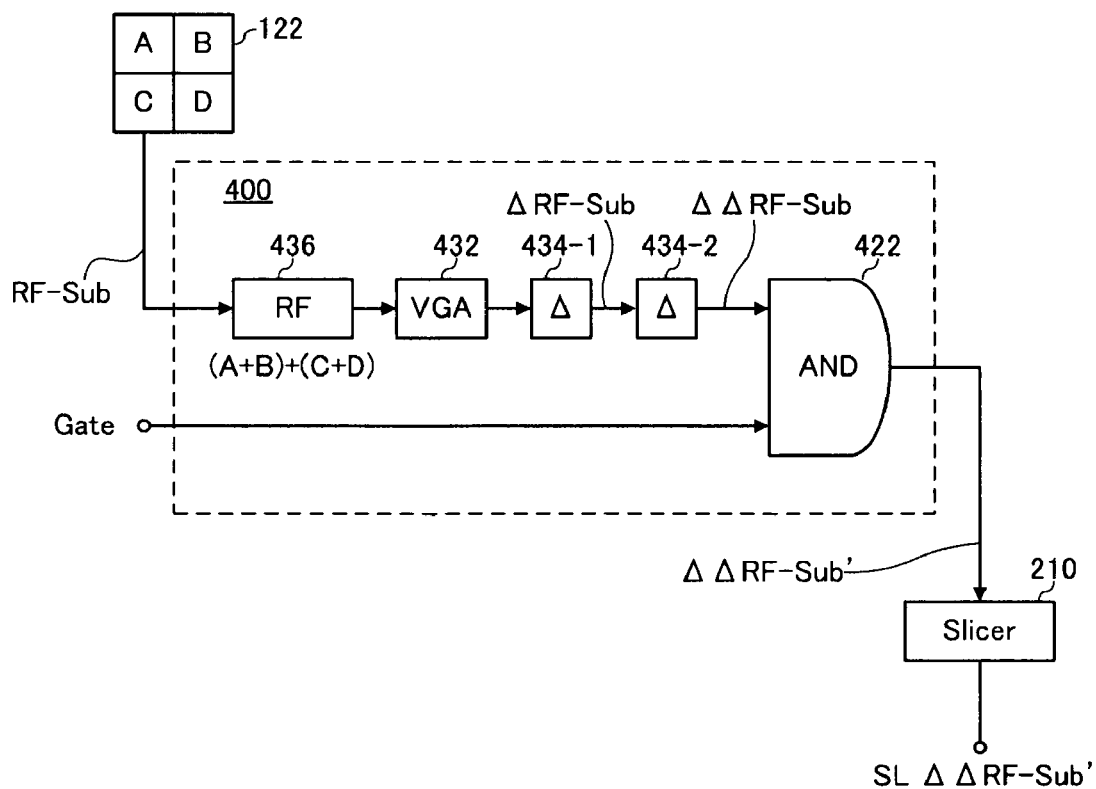
FIG. 80 is a circuit block diagram showing another sample configuration of the mask circuit shown in FIG. 49.

FIG. 80 is a circuit block diagram showing another sample configuration of the mask circuit shown in FIG. 49. The mask circuit shown in FIG. 80 is an example of a case wherein detection of a length is conducted using the 2nd derivative value of an RF signal.

As shown in FIG. 80, the mask circuit 400 is comprise of an RF signal generator 436 that generates an RF signal using a signal received from the detector 122 having four divisions, a VGA circuit 432 that adjusts the amplitude of the RF signal to be constant, differentiating circuits 434-1 and 434-2 that differentiate the RF signal twice, and an AND operator 422 that ANDs the 2nd derivative value by a gate signal Gate.

The RF signal generator 436 outputs the sum of signals obtained from each of the divisions A, B, C, and D of the detector 122 as an RF signal Tpp. An equation expressing the relationship is "RF=(A+B)+(C+D)" as shown in the figure.

The VGA circuit 432 generates a signal RF-Sub wherein the amplitude of the RF signal is adjusted to be constant. Then the differentiating circuit 434-1 receives and differentiates the signal RF-Sub to generate a signal ΔRF-Sub, and subsequently, the differentiating circuit 434-2 differentiates the signal ΔRF-Sub to obtain ΔΔRF-Sub.

ANDing the signal ΔΔRF-Sub by a gate signal Gate in the operator 422 results in the extraction of a signal ΔΔRF-Sub' which corresponds to a stable optical output area of a recording pulse. Then, the slicer 210 slices the signal ΔΔRF-Sub' at a zero level, resulting in the generation of a signal SLΔΔRF-Sub'.

Figure 81:
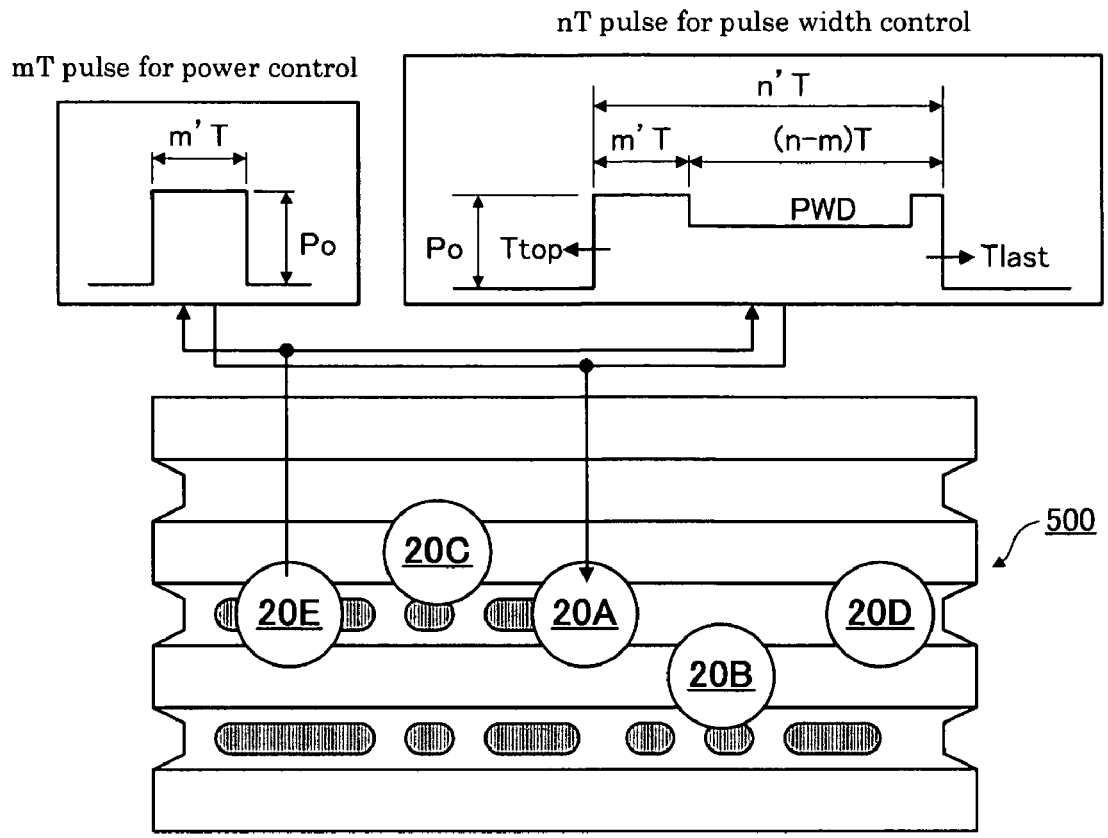
FIG. 81 is a schematic diagram showing a concept of the realtime power and pulse width control of the present invention.

FIG. 81 is a schematic diagram showing a concept of the realtime power and pulse width control of the present invention. As shown in FIG. 81, in the present embodiment, an mT pulse having a length of m'T is used as a pulse for power control, and an nT pulse having a length of n'T is used as a pulse for pulse width control, enabling a detection and correction of the power and those of the pulse width independently from each other in terms of their control factors. The configurations of the mT and nT pulses are same as the foregoing.

A recording pulse stream including these mT and nT pulses is irradiated onto the medium 500 using a recording laser beam 20A as well as reproducing pits and spaces formed by the irradiation of the recording pulse stream using a reproduction laser beam 20E, whereby the effects of power and pulse width are independently detected. Consequently, power correction for the mT pulse and pulse width correction for the nT pulse are conducted in realtime.

As shown in FIG. 81, the power correction for the mT pulse is conducted by adjusting the height of the mT pulse, and the optimum height Po of the pulse is set based on the detection result obtained with the reproduction laser beam. For the width of the mT pulse, for instance, a condition optimized by the test recording conducted for a 3T pulse that has the highest appearance rate as described above is used.

As described, the width correction for an nT pulse is conducted by adjusting the front-side and backside phases of the pulse independently, and the front-side correction amount Ttop and back-side correction amount Tlast for the pulse are set based on the detection result obtained with the reproduction laser beam. The height of the nT pulse is set to Po just as for the mT pulse, and the height of an intermediate part PWD is set by the method described above.

Figure 82:
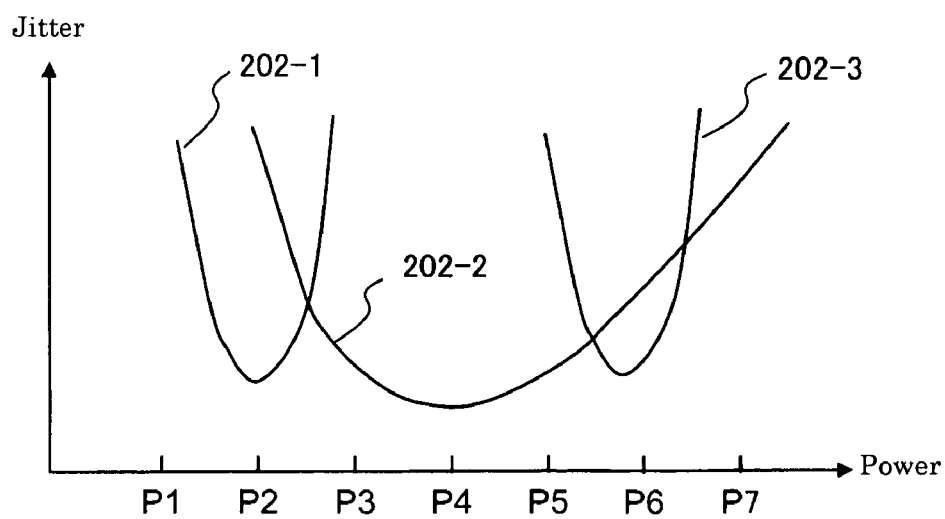
FIG. 82 is a schematic diagram showing an enlarged image of recording quality obtained by independently correcting power and pulse width.

FIG. 82 is a schematic diagram showing an enlarged image of recording quality obtained by independently correcting power and pulse width. As shown in the diagram, when the phase condition is adjusted by varying an nT pulse width while fixing the width of an mT pulse that has a high appearance rate, a characteristic wherein an area to assure a low jitter against the variation in power is wider, i.e., a reproduction characteristic 202-2 with a larger margin is obtained, whereas by a method wherein all the pulse widths are varied or power alone is adjusted, a resulting characteristic has a smaller margin just like a reproduction characteristic 202-1 or 202-3.

Figure 83:
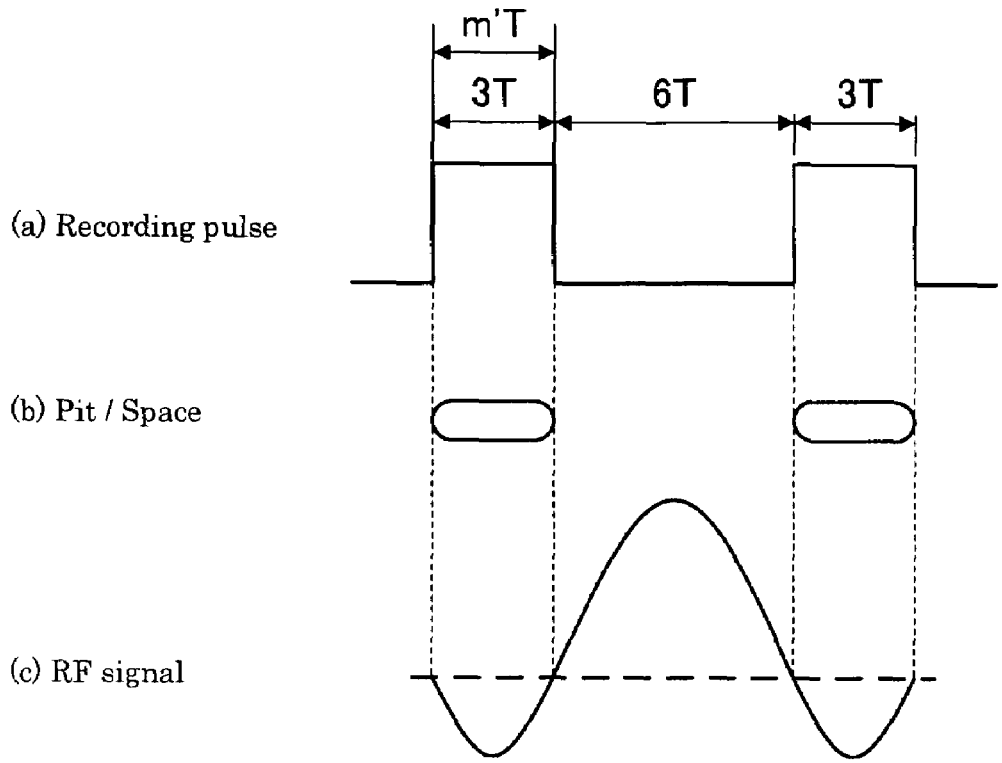
FIG. 83 is a schematic diagram showing a concept of a method for ensuring an amount of a signal detected for an mT pit.

FIG. 83 is a schematic diagram showing a concept of a method for ensuring an amount of a signal detected for an mT pit. As shown in FIG. 83(a), when an mT pulse is set to 3T for instance, a pit shape recorded by the 3T pulse is small as shown in FIG. 83(b). Thus, since the RF signal obtained from the pit shape has small amplitude as shown in FIG. 83(c), the detection of the 3T pit is difficult especially in high-speed recording.

Accordingly, the present embodiment is configured to arrange two mT pulses to be detected with an interval longer than the length of the mT pulse therebetween; and detect the pit length formed by the mT pulse by detecting a signal corresponding to the interval. For instance, as shown in FIG. 83(b), when a 3T pit, a 6T space, and a 3T pit are sequentially formed, the 3T pits on both sides affect the 6T space. Consequently, a shift length of each of the 3T pits is indirectly detected by detecting a signal with large amplitude corresponding to the 6T space.

Figure 84:
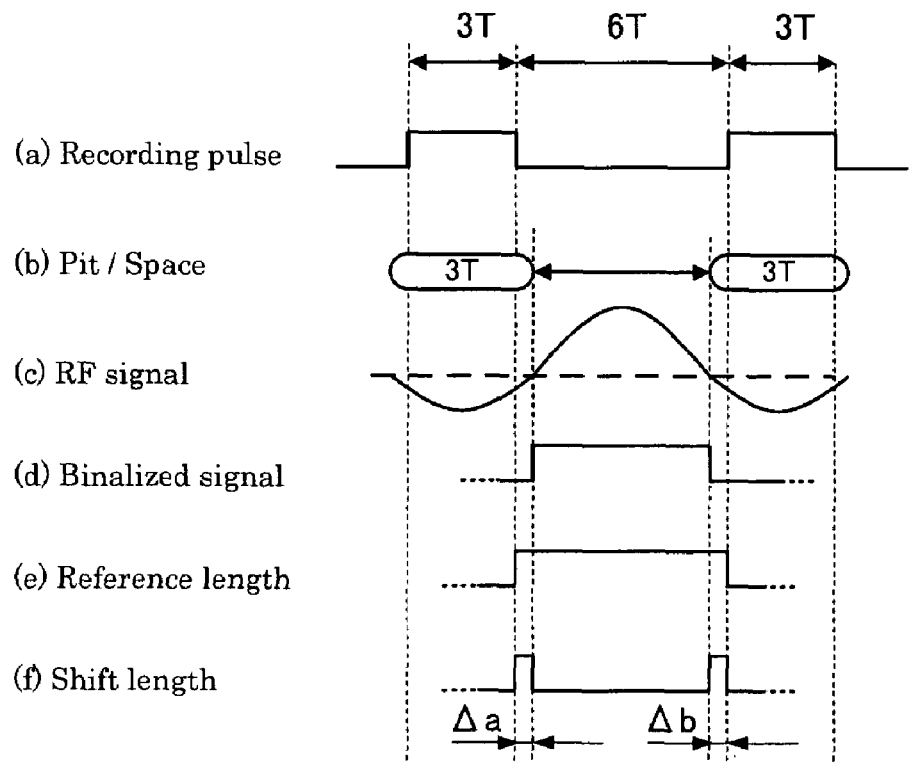
FIG. 84 is a timing diagram showing an example of detecting a shift length of a 3T pit using a signal of a 6T space.

FIG. 84 is a timing diagram showing an example of detecting a shift length of a 3T pit using a signal of a 6T space. As a result of irradiating recording pulses in the order of 3T, 6T, and 3T as shown in FIG. 84(a), when 3T pits that are longer than the reference length are formed as shown in FIG. 84(b), a binarized signal obtained from an RF signal for the 6T space is detected as a signal shorter than the reference length as shown in FIGS. 84(c) to (e). Consequently, shift lengths Δa and Δb as shown in FIG. 84(f) are detected, and a shift length Δ of each of the 3T pits is determined by adding the shift lengths Δa and Δb.

Figure 85:
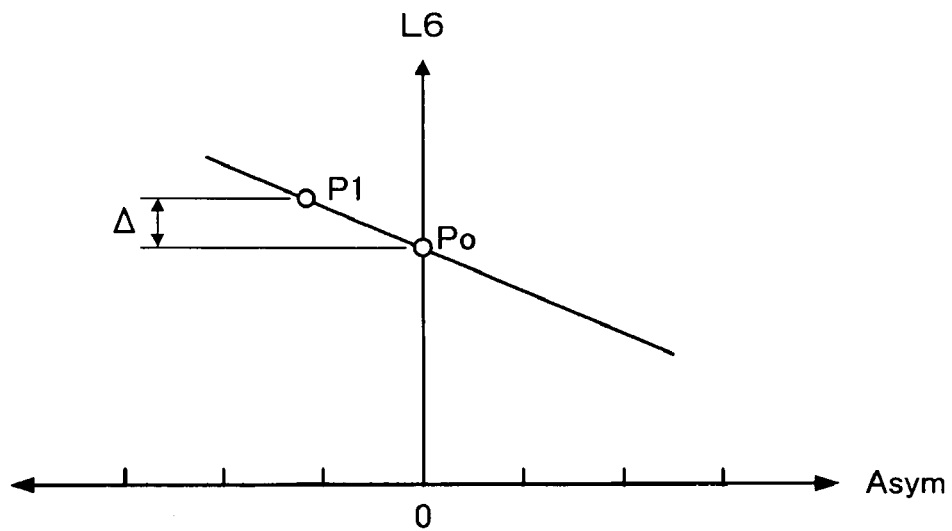
FIG. 85 is a schematic diagram showing a concept of a power correction based on a shift length.

FIG. 85 is a schematic diagram showing a concept of a power correction based on a shift length. As shown in FIG. 85, an asymmetry characteristic obtained from a test recording forms a linear characteristic, and a zero point of the asymmetry characteristic provides an optimum power Po. When a shift length Δ is applied to the line obtained for the asymmetry characteristic, it is clear that a power shift of "P1-Po" arises.

Thus, a power is corrected based on the power shift length relative to the optimum power, and accordingly, the recording is continued under the optimum condition.

Figure 86:
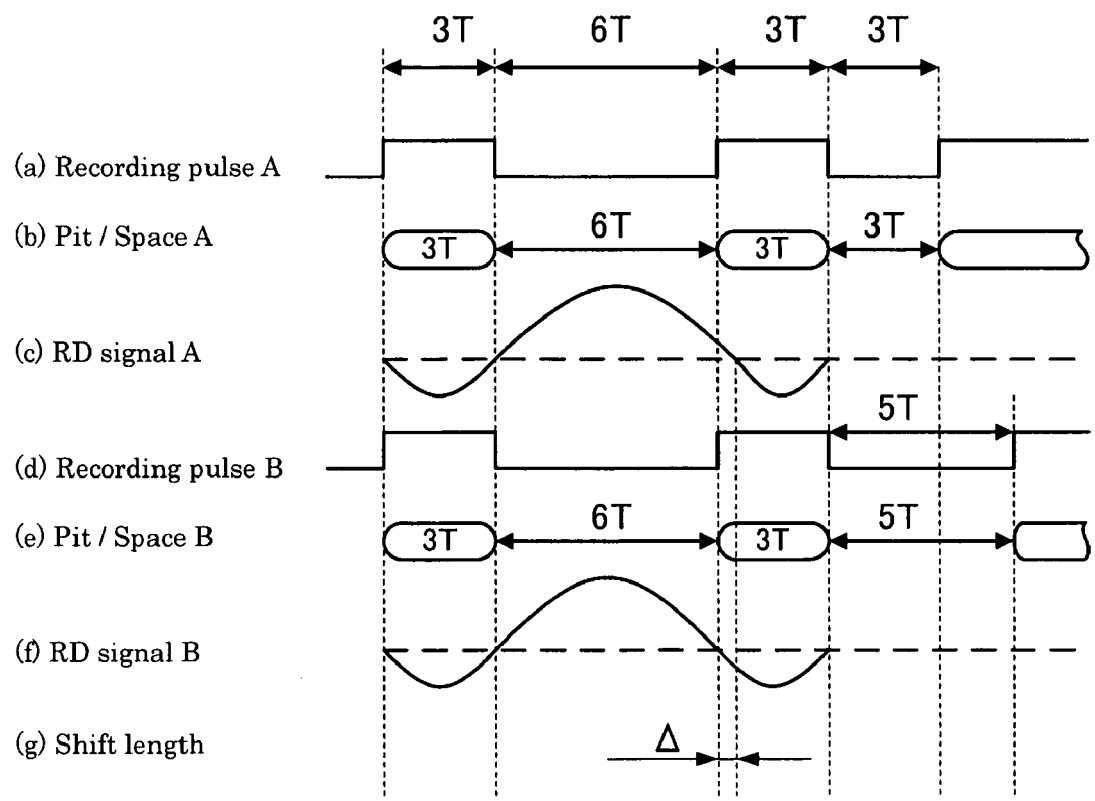
FIG. 86 is a timing diagram showing an example of detecting an effect of distortion due to a 3T space using an RF signal.

FIG. 86 is a timing diagram showing an example of detecting an effect of distortion due to a 3T space using an RF signal. As shown in FIGS. 86(a) and 86(b), when a recording pulse pattern A sequentially having a 3T pit, 6T space, 3T pit, and 3T space is irradiated, the 3T space at the end of the pulse pattern may cause a distortion in the 3T pit immediately before the space.

When such a distortion arises, even in the case that a 3T pit without any shift from the reference length is formed, a zero crossing point of an RF signal may appear at a position after a proper position as shown in FIG. 85(c), resulting in the generation of a binarized signal having a wider pulse width.

Thus, as shown in FIGS. 85(d) to (g), a recording pulse pattern B is first configured so that a 5T space having a longer length than a 3T space is set at the end of the pulse pattern to prevent a distortion. Then, reproducing a pit/space stream formed by the recording pulse pattern B determines the length of an 6T space formed by the pulse pattern B, whereby a shift length Δ, which is the difference in 6T space length between the recording pulse patterns A and B, is determined.

As described above, when a shift length Δ is found between the results arising from the recording pulse patterns A and B, the result arising from the recording pulse A can be considered as an error, and thus, configuring not to use the result enables a detection error to be prevented.

Figure 87:
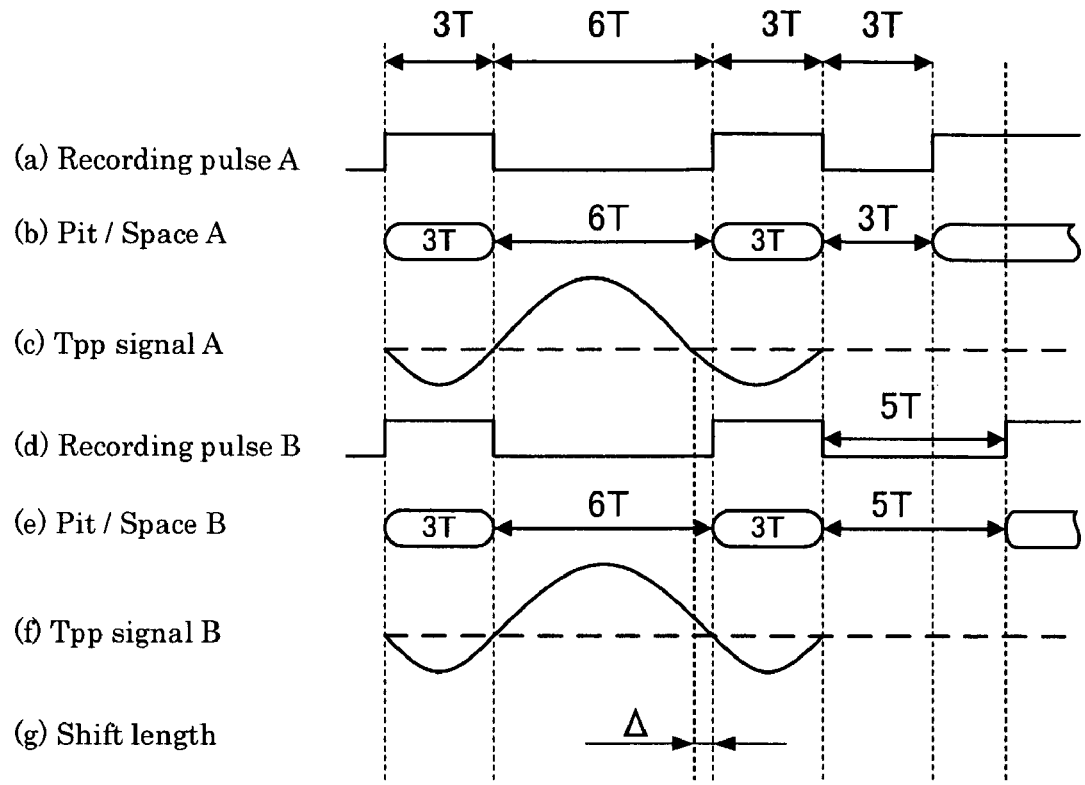
FIG. 87 is a timing diagram showing an example of detecting an effect of distortion due to a 3T space using a tangential push-pull signal.

FIG. 87 is a timing diagram showing an example of detecting an effect of distortion due to a 3T space using a tangential push-pull signal. The distortion due to the 3T space described above can be detected not only by an RF signal but also by a tangential push-pull signal. An example of using a tangential push-pull signal is described below in the same manner as the example of using an RF signal.

As shown in FIG. 87(a) and (b), when a recording pulse pattern A sequentially having a 3T pit, 6T space, 3T pit, and 3T space is irradiated, even in the case that a 3T pit without any shift from the reference length is formed, a zero crossing point of a tangential push-pull signal Tpp may appear at a position before an proper position as shown in FIG. 87(c), resulting in a binarized signal having a narrower pulse width.

Thus, as shown in FIGS. 87(d) to (g), a recording pulse pattern B is first configured so that a 5T space having a longer length than a 3T space is set at the end of the pulse pattern to prevent a distortion. Then, reproducing a pit/space stream formed by the recording pulse pattern B determines the length of an 6T space formed by the pulse pattern B, whereby a shift length Δ, which is the difference in 6T space length between the recording pulse patterns A and B, is determined.

As described above, when a shift length Δ is found between the results arising from the recording pulse patterns A and B, the result arising from the recording pulse A can be considered as an error, and thus, configuring not to use the result enables a detection error to be prevented.

Figure 88:
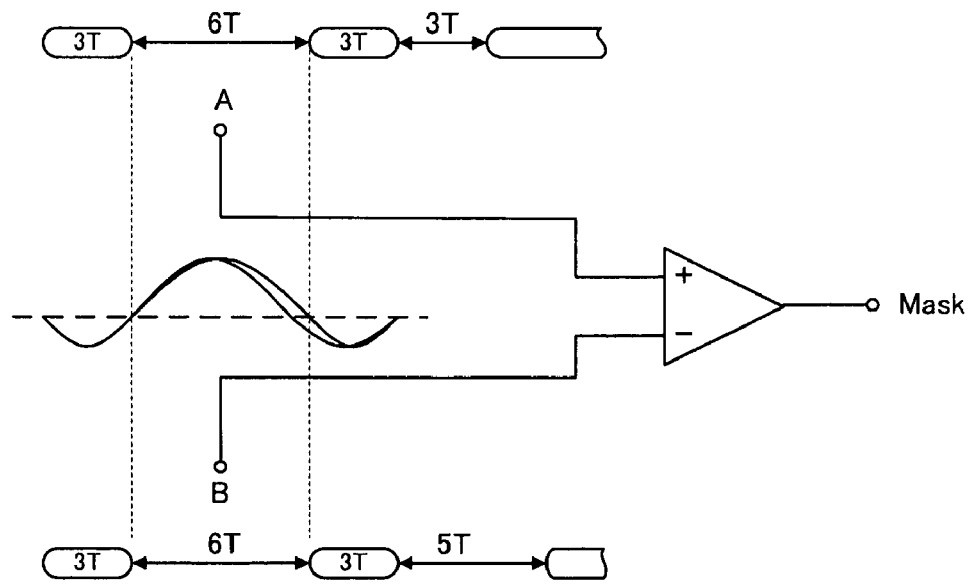
FIG. 88 is a schematic diagram showing a sample configuration to prevent an effect of distortion due to a 3T space.

FIG. 88 is a schematic diagram showing a sample configuration to prevent an effect of distortion due to a 3T space. As described above, in order to prevent an effect of distortion, a configuration to compare a reproduction result of a pattern vulnerable to the distortion with that invulnerable to the distortion is effective. Thus, as shown in FIG. 88, RF signals or tangential push-pull signals for such two patterns are compared, and then when a difference is found between them, a reproduction result arising from a pattern sequentially comprised of a 3T pit, 6T space, 3T pit, and 3T space should be masked.

The present invention enables a realtime correction by an optimum possible recording condition, and thus could be applied to media having different recording characteristics for their inner and outer circumferences or to severe environments such as high-speed recording.

What is claimed is:

1. An optical information recording device for forming pits and/or spaces on an optical recording medium by irradiating a laser beam based on a recording pulse stream having a first recording pulse comprising a top pulse alone and a second recording pulse comprising the top pulse and a succeeding pulse, the optical information recording device comprising:
    a first optical mechanism and a reproduction circuit for reproducing pits and/or spaces formed on the optical recording medium, wherein said first optical mechanism is further configured for irradiating a first recording pulse stream having two first recording pulses followed by an interval corresponding to a width of the first recording pulse and a second recording pulse stream having two first recording pulses followed by an interval having a length longer than the width of the first recording pulse;
    a strategy circuit for varying power of the first recording pulse based on said reproduced pits and/or spaces and for varying a width of the second recording pulse based on said reproduced pits and/or spaces; and
    a strategy determination circuit for comparing a signal obtained by reproducing the pits and/or spaces formed by irradiating the first recording pulse stream with a signal obtained by reproducing the pits and/or spaces formed by irradiating the second recording pulse stream and for determining whether or not a reproduction result is correct based on the comparison result.

2. The optical information recording device according to claim 1, further comprising:
    a shift detection circuit for detecting a shift length from a reference length from said reproduced pits and/or spaces; and
    wherein the strategy determination circuit is further configured for power of the first recording pulse based on the shift length and for determining the width of the second recording pulse based on the shift length.

3. The optical information recording device according to claim 1, further comprising:
    a shift detection circuit for determining reference recording conditions of the first and the second recording pulses from said reproduced pits and/or spaces and for detecting a shift length from a reference length from said reproduced pits and/or spaces,
    wherein said strategy circuit is further configured for setting a width of the first recording pulse to the same condition as the reference recording condition as well as adjusting power of the first recording pulse based on the shift length and for setting power of the second recording pulse to the same condition as the first recording pulse as well as adjusting a width of the second recording pulse based on the shift length.

4. The optical information recording device according to claim 3, wherein pits and/or spaces are formed on an optical recording medium by pulse irradiation of a recording laser beam and detected by irradiation of a reproduction laser beam,
    and wherein said shift detection circuit determines reference recording conditions of the first recording pulse and the second recording pulse from reproduced pits and/or spaces formed on a test area of the optical recording medium and detects a shift length from a reference length from reproduced pits and/or spaces, which are formed on a recording area of the optical recording medium by the recording laser beam, with the reproduction laser beam.

5. An optical information recording device for forming pits and/or spaces on an optical recording medium by irradiating a laser beam based on a recording pulse stream having a first recording pulse comprising of a top pulse alone and a second recording pulse comprising of the top pulse and a succeeding pulse, the optical information recording device comprising:
a first optical mechanism for irradiating a recording pulse stream having two first recording pulses arranged with an interval corresponding to a width of the second recording pulse therebetween on the optical recording medium, wherein said first optical mechanism is further configured for irradiating a first recording pulse stream having two first recording pulses followed by an interval corresponding to a width of the first recording pulse and a second recording pulse stream having two first recording pulses followed by an interval having a length longer than the width of the first recording pulse;
a second optical mechanism and a reproduction circuit for obtaining a pit and/or space signal corresponding to the interval between the two first recording pulses by reproducing the pits and/or spaces formed by irradiating the recording pulse stream;
a shift detection circuit for detecting a pit length and/or a space length corresponding to the first recording pulse based on the pit and/or space signal corresponding to the interval between the two first recording pulses;
a strategy circuit for adjusting power of the first recording pulse based on the detected pit length and/or the detected space length corresponding to the first recording pulse; and
a strategy determination circuit for comparing a signal obtained by reproducing the pits and/or spaces formed by irradiating the first recording pulse stream with a signal obtained by reproducing the pits and/or spaces formed by irradiating the second recording pulse stream and for determining whether or not a reproduction result is correct based on the comparison result.

6. The optical information recording device according to claim 5, wherein pits and/or spaces are formed on an optical recording medium by pulse irradiation of a recording laser beam and detected by irradiation of a reproduction laser beam:
wherein said shift detection circuit is further configured for determining recording conditions of a first recording pulse and a second recording pulse that is longer than the first recording pulse by reproducing pits and/or spaces formed on a test area of the optical recording medium,
wherein said first optical mechanism is further configured for irradiating a third recording pulse stream having two first recording pulses arranged with an interval corresponding to a width of the second recording pulse therebetween onto a recording area of the optical recording medium using the recording laser beam, and
wherein said second optical mechanism and said reproduction circuit is further configured for obtaining a pit and/or space signal that corresponds to the interval between the two first recording pulses of the third recording pulse stream by reproducing pits and/or spaces formed by irradiating the third recording pulse stream using the reproduction laser beam.

7. An optical information recording method for forming pits and/or spaces on an optical recording medium by irradiating a laser beam based on a recording pulse stream having a first recording pulse comprising a top pulse alone and a second recording pulse comprising the top pulse and a succeeding pulse, the optical information recording method comprising the steps of:
irradiating a first recording pulse stream having two first recording pulses followed by an interval corresponding to a width of the first recording pulse and a second recording pulse stream having two first recording pulses followed by an interval having a length longer than the width of the first recording pulse;
reproducing pits and/or spaces formed on the optical recording medium;
comparing a signal obtained by reproducing the pits and/or spaces formed by irradiating the first recording pulse stream with a signal obtained by reproducing the pits and/or spaces formed by irradiating the second recording pulse stream;
determining whether or not a reproduction result is correct based on the comparison result;
varying power of the first recording pulse based on the reproduction result by the reproduction step; and
varying a width of the second recording pulse based on the reproduction result by the reproduction step.

8. The optical information recording method according to claim 7, further comprising the steps of:
irradiating a third recording pulse stream having two first recording pulses arranged with an interval corresponding to a width of the second recording pulse therebetween on the optical recording medium;
obtaining a pit and/or space signal corresponding to the interval between the two first recording pulses of the third recording pulse stream by reproducing pits and/or spaces formed by irradiating the third recording pulse stream;
detecting a pit length and/or a space length corresponding to the first recording pulse based on the pit and/or space signal corresponding to the interval between the two first recording pulses of the third recording pulse stream; and
adjusting power of the first recording pulse based on the detected pit length and/or the detected space length corresponding to the first recording pulse.

9. A signal processing circuit incorporated into an optical information recording device for forming pits and/or spaces on an optical recording medium by irradiating a laser beam based on a recording pulse stream having a first recording pulse comprising a top pulse alone and a second recording pulse comprising the top pulse and a succeeding pulse, the signal processing circuit comprising:
a first control and reproduction circuit for reproducing pits and/or spaces formed on the optical recording medium, the pits and/or spaces formed by irradiating a first recording pulse stream having two first recording pulses followed by an interval corresponding to a width of the first recording pulse and a second recording pulse stream having two first recording pulses followed by an interval having a length longer than the width of the first recording pulse;
a strategy circuit for varying power of the first recording pulse based on said reproduced pits and/or spaces and for varying a width of the second recording pulse based on a reproduction result by the first control and reproduction circuit; and
a strategy determination circuit for comparing a signal obtained by reproducing the pits and/or spaces formed by irradiating the first recording pulse stream with a signal obtained by reproducing the pits and/or spaces formed by irradiating the second recording pulse stream and for determining whether or not the reproduction result is correct based on the comparison result.

10. The signal processing circuit according to claim 9, said signal processing circuit further comprising:
- a second control and reproduction circuit for irradiating a third recording pulse stream having two first recording pulses arranged with an interval corresponding to a width of the second recording pulse therebetween on the optical recording medium; and
- a shift detection circuit for detecting a pit length and/or a space length corresponding to the first recording pulse based on the pit and/or space signal corresponding to the interval between the two first recording pulses of the third recording pulse stream, wherein said first control and reproduction circuit is also configured to obtain a pit and/or space signal corresponding to the interval between the two first recording pulses of the third recording pulse stream by reproducing pits and/or spaces formed by irradiating the third recording pulse stream, and wherein said strategy circuit is also configured for adjusting power of the first recording pulse based on the detected pit length and/or the detected space length corresponding to the first recording pulse.

* * * * *

UNITED STATES PATENT AND TRADEMARK OFFICE
CERTIFICATE OF CORRECTION

PATENT NO. : 7,693,015 B2
APPLICATION NO. : 11/283265
DATED : April 6, 2010
INVENTOR(S) : Miyazawa et al.

It is certified that error appears in the above-identified patent and that said Letters Patent is hereby corrected as shown below:

Column 18, line 55, which reads, "coefficient a", should read -- coefficient $\alpha$ --

Column 36, line 60, which reads, ""1" shown", should read -- "11" shown --

Signed and Sealed this

Seventh Day of September, 2010

David J. Kappos
*Director of the United States Patent and Trademark Office*